(12) United States Patent
Deneka et al.

(10) Patent No.: US 12,344,544 B2
(45) Date of Patent: Jul. 1, 2025

(54) GLASS ARTICLES MADE FROM LAMINATED GLASS TUBING AND SYSTEMS AND METHODS FOR CONVERTING LAMINATED GLASS TUBING INTO THE GLASS ARTICLES

(71) Applicant: CORNING INCORPORATED, Corning, NY (US)

(72) Inventors: David Alan Deneka, Corning, NY (US); Allan Mark Fredholm, Vulaines sur Seine (FR); Laurent Joubaud, Paris (FR); Joseph Michael Matusick, Corning, NY (US); Aniello Mario Palumbo, Painted Post, NY (US); Christophe Pierron, Avon (FR)

(73) Assignee: CORNING INCORPORATED, Corning, NY (US)

( * ) Notice: Subject to any disclaimer, the term of this patent is extended or adjusted under 35 U.S.C. 154(b) by 472 days.

(21) Appl. No.: 17/677,488

(22) Filed: Feb. 22, 2022

(65) Prior Publication Data
US 2022/0177347 A1 Jun. 9, 2022

Related U.S. Application Data

(62) Division of application No. 16/201,497, filed on Nov. 27, 2018, now Pat. No. 11,279,647.
(Continued)

(51) Int. Cl.
*B32B 15/04* (2006.01)
*A61J 1/06* (2006.01)
(Continued)

(52) U.S. Cl.
CPC ............. *C03B 23/099* (2013.01); *A61J 1/065* (2013.01); *A61J 1/1468* (2015.05); *B32B 1/08* (2013.01);
(Continued)

(58) Field of Classification Search
CPC .................................. B32B 1/08; B32B 17/06
(Continued)

(56) References Cited

U.S. PATENT DOCUMENTS 3,211,541 A * 10/1965 Leonard ................ C03B 23/095
65/156
3,287,200 A * 11/1966 Hess ...................... C03C 21/002
65/30.14
(Continued)

FOREIGN PATENT DOCUMENTS

JP 49-108118 A 10/1974
JP 11-157856 A 6/1999
(Continued)

OTHER PUBLICATIONS

Encyclopedia Britannica.*
(Continued)

*Primary Examiner* — Lauren R Colgan
(74) *Attorney, Agent, or Firm* — Chandra J. Duncan

(57) ABSTRACT

Methods for producing glass articles from laminated glass tubing include introducing the glass tubing to a converter. The glass tubing includes a core layer under tensile stress, an outer clad layer under, and an inner clad layer. The methods include forming a feature the glass article at a working end of the laminated glass tubing and separating a glass article from the working end of the laminated glass tubing, which may expose the core layer under tensile stress at the working end of the glass tubing. The method further comprises remediating the exposed portion of the core layer by completely enclosing the core layer in a clad layer. Systems for re-cladding the exposed portion of the core layer as well as glass articles made using the systems and methods are also disclosed.

17 Claims, 21 Drawing Sheets

Related U.S. Application Data

(60) Provisional application No. 62/592,725, filed on Nov. 30, 2017.

(51) Int. Cl.

| | | |
|---|---|---|
| *A61J 1/14* | (2023.01) | |
| *B32B 1/08* | (2006.01) | |
| *B32B 17/06* | (2006.01) | |
| *B65D 1/02* | (2006.01) | |
| *C03B 17/02* | (2006.01) | |
| *C03B 23/09* | (2006.01) | |
| *C03B 23/11* | (2006.01) | |
| *C03B 23/207* | (2006.01) | |
| *C03B 29/00* | (2006.01) | |
| *C03B 29/02* | (2006.01) | |
| *C03B 33/06* | (2006.01) | |
| *C03B 33/07* | (2006.01) | |
| *C03B 33/085* | (2006.01) | |
| *C03C 3/04* | (2006.01) | |
| *C03C 4/18* | (2006.01) | |
| *C03C 4/20* | (2006.01) | |

(52) U.S. Cl.
CPC ............ *B32B 17/06* (2013.01); *B65D 1/0215* (2013.01); *C03B 17/025* (2013.01); *C03B 23/092* (2013.01); *C03B 23/11* (2013.01); *C03B 23/207* (2013.01); *C03B 29/00* (2013.01); *C03B 29/025* (2013.01); *C03B 33/06* (2013.01); *C03B 33/076* (2013.01); *C03B 33/085* (2013.01); *C03C 3/04* (2013.01); *C03C 4/18* (2013.01); *C03C 4/20* (2013.01); *B32B 2439/00* (2013.01); *B32B 2439/70* (2013.01); *B32B 2439/80* (2013.01); *C03C 2204/00* (2013.01)

(58) Field of Classification Search
USPC ......................................................... 428/428
See application file for complete search history.

(56) References Cited

U.S. PATENT DOCUMENTS

| | | | | |
|---|---|---|---|---|
| 3,627,505 | A | | 12/1971 | Engel |
| 3,673,049 | A | * | 6/1972 | Giffen .................... C03C 17/02 65/53 |
| 3,849,097 | A | * | 11/1974 | Giffen .................... C03C 17/02 65/121 |
| 4,023,953 | A | * | 5/1977 | Megles, Jr. ........... C03B 17/025 65/121 |
| 4,130,680 | A | * | 12/1978 | Ference ................. C03B 17/02 428/428 |
| 4,214,886 | A | * | 7/1980 | Shay ..................... B32B 17/06 65/121 |
| 4,390,593 | A | * | 6/1983 | Olson ................... C03B 17/025 428/428 |
| 6,652,935 | B1 | * | 11/2003 | Cirincione ............. C03C 3/091 65/121 |
| 7,201,965 | B2 | * | 4/2007 | Gulati ..................... C03B 17/02 428/1.52 |
| 8,561,429 | B2 | * | 10/2013 | Allan ..................... C03C 3/093 65/400 |
| 9,034,442 | B2 | | 5/2015 | Chang et al. |
| 9,346,699 | B2 | * | 5/2016 | Amosov ................ C03B 17/064 |
| 9,346,705 | B2 | * | 5/2016 | Kiczenski .............. C03C 3/091 |
| 9,434,633 | B2 | * | 9/2016 | Bookbinder ............ C03B 17/02 |
| 9,522,836 | B2 | * | 12/2016 | Gulati .................... C03C 21/002 |
| 9,850,162 | B2 | * | 12/2017 | DeMartino ............... B65D 1/40 |
| 10,112,862 | B2 | * | 10/2018 | Tarcza .................. C03B 17/064 |
| 10,117,806 | B2 | * | 11/2018 | Chang ................ B65D 23/0835 |
| 10,307,334 | B2 | * | 6/2019 | Chang ................... C03C 17/005 |
| 10,786,431 | B2 | * | 9/2020 | Chang ................ B65D 23/0814 |
| 10,813,835 | B2 | * | 10/2020 | Chang ..................... A61J 1/065 |
| 11,078,103 | B2 | * | 8/2021 | Deneka ................. C03B 23/099 |
| 11,279,647 | B2 | * | 3/2022 | Deneka ................ B65D 1/0215 |
| 11,530,155 | B2 | * | 12/2022 | Higginbottom Dahlman .............. B65D 1/0215 |
| 2010/0035038 | A1 | * | 2/2010 | Barefoot ................ C03C 3/085 428/220 |
| 2014/0034544 | A1 | * | 2/2014 | Chang .................... B65D 25/14 428/34.4 |
| 2014/0065401 | A1 | * | 3/2014 | Donovan ................ C03C 3/093 428/220 |
| 2014/0120279 | A1 | * | 5/2014 | DeMartino ........... C03C 21/007 428/428 |
| 2014/0138420 | A1 | * | 5/2014 | Peng ..................... C03B 33/07 225/2 |
| 2014/0141217 | A1 | * | 5/2014 | Gulati .................... C03C 3/087 428/375 |
| 2014/0151320 | A1 | * | 6/2014 | Chang .................... C03C 15/02 428/34.4 |
| 2016/0107918 | A1 | | 4/2016 | Delgado Carranza |
| 2016/0130170 | A1 | | 5/2016 | Maennl et al. |
| 2016/0236972 | A1 | | 8/2016 | Kiczenski et al. |
| 2016/0244354 | A1 | | 8/2016 | Segner |
| 2016/0250825 | A1 | | 9/2016 | Cleary et al. |
| 2016/0251256 | A1 | * | 9/2016 | Comte .................... C03C 3/093 428/34.4 |
| 2016/0297705 | A1 | | 10/2016 | Demartino et al. |
| 2017/0210662 | A1 | * | 7/2017 | Wagner .................... C03C 1/004 |
| 2017/0297308 | A1 | * | 10/2017 | Golyatin ................. C03B 17/02 |
| 2017/0305788 | A1 | * | 10/2017 | Nikulin ................. C03B 17/064 |
| 2017/0355632 | A1 | * | 12/2017 | McEnroe ................. B32B 1/08 |
| 2018/0327298 | A1 | * | 11/2018 | Coppola ............... C03B 17/064 |
| 2019/0126594 | A1 | | 5/2019 | Boek et al. |
| 2019/0127261 | A1 | | 5/2019 | Hart et al. |
| 2019/0161383 | A1 | * | 5/2019 | Deneka ................. C03B 29/025 |

FOREIGN PATENT DOCUMENTS

| | | |
|---|---|---|
| JP | 2016-506348 A | 3/2016 |
| JP | 2016-521676 A | 7/2016 |
| JP | 2016-534013 A | 11/2016 |
| WO | 2014/201318 A1 | 12/2014 |
| WO | 2015/084668 A1 | 6/2015 |
| WO | 2016/069824 A1 | 5/2016 |
| WO | 2016/138329 A1 | 9/2016 |

OTHER PUBLICATIONS

European Patent Application No. 18819505.1 Communication pursuant to Article 94(3) EPC dated Jun. 3, 2024; 7 Pages; European Patent Office.

* cited by examiner

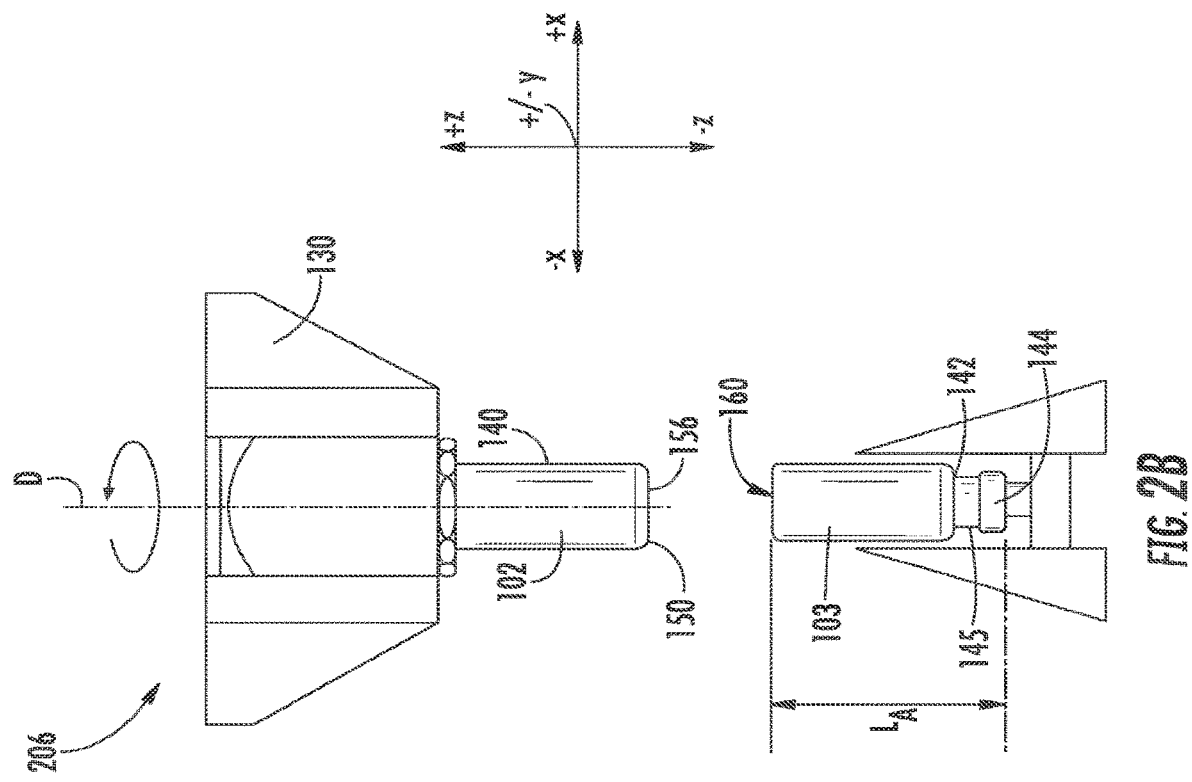

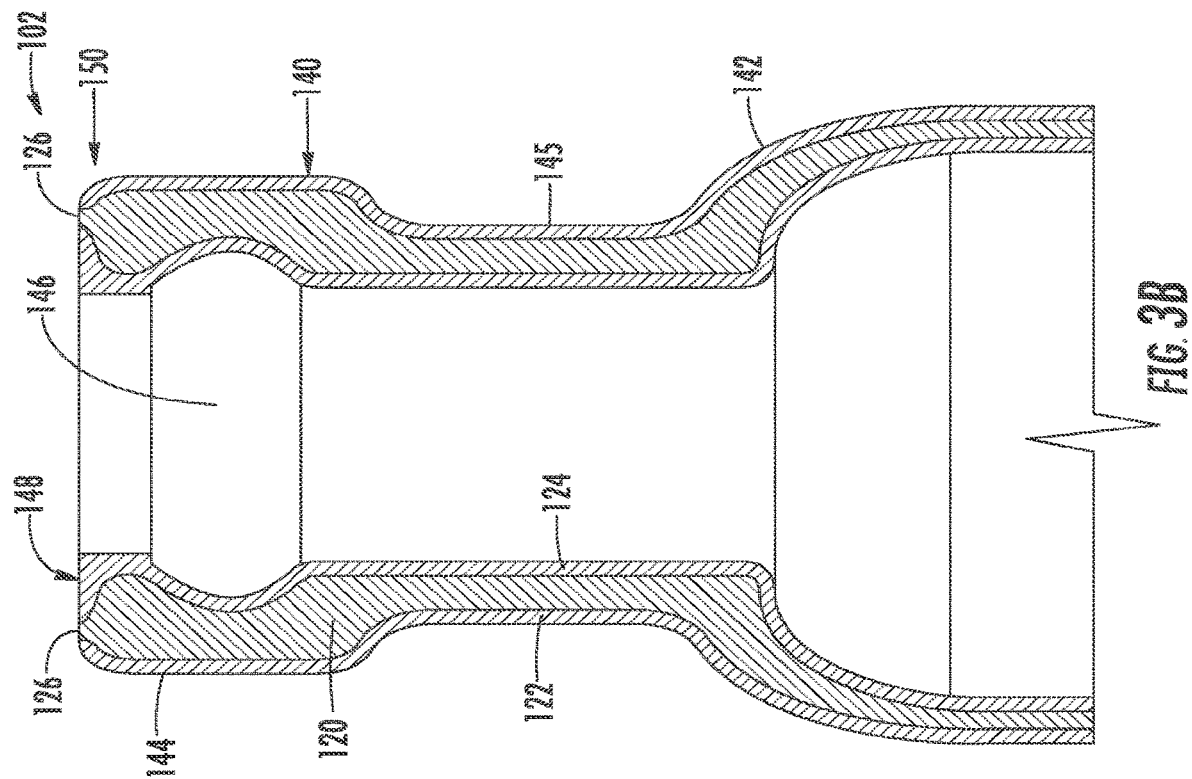
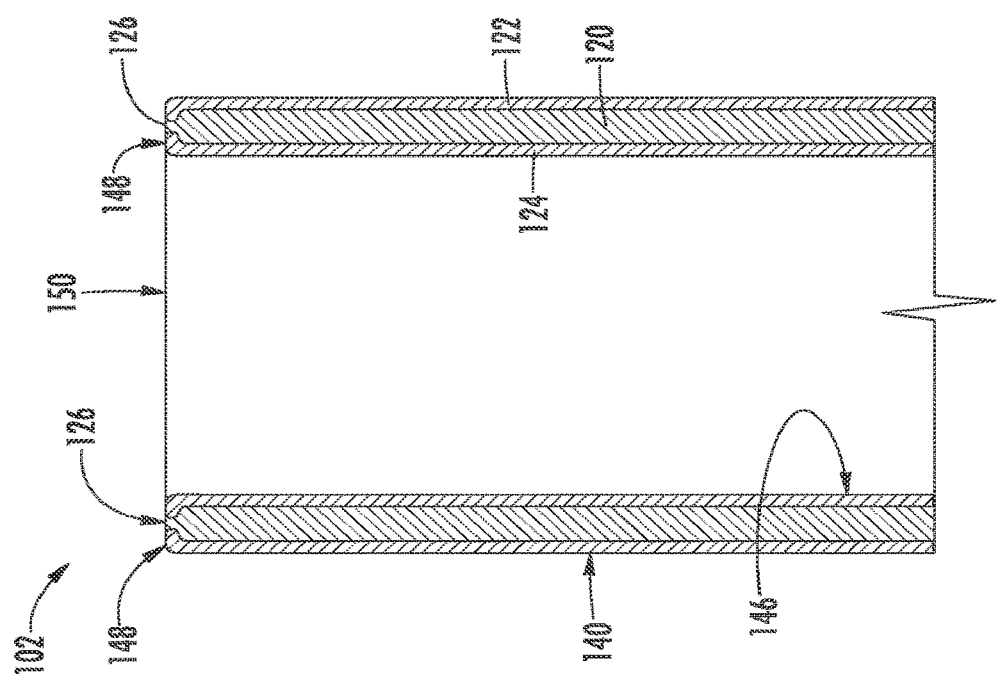

GLASS ARTICLES MADE FROM LAMINATED GLASS TUBING AND SYSTEMS AND METHODS FOR CONVERTING LAMINATED GLASS TUBING INTO THE GLASS ARTICLES

CROSS-REFERENCE TO RELATED APPLICATIONS

This application is a divisional application of U.S. patent application Ser. No. 16/201,497 filed on Nov. 27, 2018, which claims the benefit of priority under 35 U.S.C. § 120 of U.S. Provisional Application No. 62/592,725 filed Nov. 30, 2017, and entitled "Glass Articles made from Laminated Glass Tubing and Systems and Methods for Converting Laminated Glass Tubing Into the Glass Articles," the entire contents of which are hereby incorporated by reference.

BACKGROUND

Field

The present specification generally relates to glass articles, in particular glass articles made from laminated glass tubing and systems and methods for producing the glass articles from laminated glass tubing.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard 'Type IA' and 'Type IB' glass compositions, which have a proven history of chemical durability. A variety of glass containers are used in the pharmaceutical industry, such as vials, cartridges, syringes, ampoules, bottles, jars, and other glass containers or glass articles.

Glass tubing may be converted into glass articles, such as the glass containers for pharmaceutical applications, in "converting machines," for example. Converting machines have been used for over 75 years, and are currently made by various commercial and internal equipment suppliers. These converting machines typically reform long lengths of glass tubing into a plurality of glass articles using steps which include flame working, rotating and stationary tool forming, thermal separation, and/or score and shock cutoff steps.

One of the main drawbacks of using glass containers for pharmaceutical packaging and other applications is the mechanical fragility of the glass. A breakage of such a glass container can be costly because of the loss of the drug but also can raise safety concerns, such as the presence of glass particles inside the container, spoliation of compositions contained within the container, or other safety concerns. One option to enhance the mechanical performance of the glass is to strengthen the glass through a thermal or chemical tempering process. However, some glass compositions, such as borosilicate glass compositions, are not able to be strengthened through chemical tempering processes, such as ion exchange.

SUMMARY

Accordingly, a need exists for glass articles produced from laminated glass tubing and having improved mechanical durability, and systems and methods for converting laminated glass tubing into glass articles while maintaining a core layer of the laminated glass tube enclosed in one or more clad layers.

In a first aspect of the present disclosure, a glass article includes a laminated glass that includes a core layer under a tensile stress and at least one clad layer. At least one of the at least one clad layer is under a compressive stress. The core layer is completely enclosed within the at least one clad layer. The glass article may further include at least one feature formed in the laminated glass.

A second aspect of the present disclosure may include the first aspect, wherein the core layer may be completely isolated from the atmosphere by the at least one clad layer.

A third aspect of the present disclosure may include the first or second aspects, wherein the at least one clad layer may include an inner clad layer and an outer clad layer and the inner clad layer and the outer clad layer cooperate to enclose the core layer.

A fourth aspect of the present disclosure may include the third aspect, wherein the inner clad layer, the outer clad layer, or both are under compressive stress.

A fifth aspect of the present disclosure may include the third aspect, wherein the inner clad layer may include an inner glass composition that is classified as a Type I glass under United States Pharmacopoeia (USP) <660>.

A sixth aspect of the present disclosure may include the third aspect, wherein the inner clad layer may include a borosilicate glass.

A seventh aspect of the present disclosure may include any of the first through sixth aspects, wherein the glass article may be a pharmaceutical container.

An eighth aspect of the present disclosure may include any of the first through seventh aspects, wherein the glass article may include one of a bottle, vial, ampoule, syringe, or cartridge.

A ninth aspect of the present disclosure may include any of the first through eighth aspects, wherein the glass article may include a container adapted to hold a pharmaceutical product, a vaccine, a biologic, a foodstuff, or a solution.

A tenth aspect of the present disclosure may include any of the first through ninth aspects, wherein the compressive stress in the at least one clad layer may be greater than or equal to 50 MPa.

An eleventh aspect of the present disclosure may include any of the first through tenth aspects, wherein the tensile stress in the core layer may be greater than or equal to 10 MPa.

A twelfth aspect of the present disclosure may include any of the first through eleventh aspects, wherein the glass article may be free from exposed portions of the core layer.

A thirteenth aspect of the present disclosure may include any of the first through twelfth aspects, wherein the laminated glass tubing may include a borosilicate glass.

A fourteenth aspect of the present disclosure may include any of the first through thirteenth aspects, wherein a thickness of the at least one clad layer may be at least about 30 µm.

A fifteenth aspect of the present disclosure may include any of the first through fourteenth aspects, wherein a thickness of the at least one clad layer may be from 15% to 25% of an overall thickness of the laminated glass.

A sixteenth aspect of the present disclosure may include any of the first through fifteenth aspects, wherein an overall thickness of the laminated glass may be less than or equal to 6 mm.

A seventeenth aspect of the present disclosure may include any of the first through sixteenth aspects, wherein an overall thickness of the laminated glass may be from 0.3 mm to 1.5 mm.

An eighteenth aspect of the present disclosure may include any of the first through seventeenth aspects, wherein the core layer may include a core glass composition different than a glass composition of the at least one clad layer.

In a nineteenth aspect of the present disclosure, a product may include a glass article of any of the first through eighteenth aspects and a composition or article contained within the glass article.

In a twentieth aspect of the present disclosure, a product includes a glass container that includes a laminated glass defining an internal volume, the laminated glass having a core layer under a tensile stress and at least one clad layer under a compressive stress. The at least one clad layer may completely enclose the core layer and isolates the core layer from the atmosphere. The product may further include a composition or article disposed within the internal volume of the glass container.

A twenty-first aspect of the present disclosure may include the twentieth aspect, wherein the at least one clad layer may include an inner clad layer and an outer clad layer and the inner clad layer and the outer clad layer may cooperate to completely enclose the core layer.

A twenty-second aspect of the present disclosure may include the twenty-first aspect, wherein the inner clad layer and the outer clad layer may be under a compressive stress.

A twenty-third aspect of the present disclosure may include the twenty-first or twenty-second aspects, wherein the inner clad layer may include an inner glass composition that is classified as a Type I glass under United States Pharmacopoeia (USP) <660>.

A twenty-fourth aspect of the present disclosure may include any of the twenty-first through twenty-third aspects, wherein the inner clad layer may include a borosilicate glass.

A twenty-fifth aspect of the present disclosure may include any of the twentieth through twenty-fourth aspects, comprising a composition disposed within the internal volume of the glass container.

A twenty-sixth aspect of the present disclosure may include the twenty-fifth aspect, wherein the composition may be a pharmaceutical product, a vaccine, a biologic, a foodstuff, or a solution.

A twenty-seventh aspect of the present disclosure may include any of the twentieth through twenty-sixth aspects, wherein the glass container may include a bottle, vial, ampoule, syringe, or cartridge.

In a twenty-eighth aspect of the present disclosure, a method for producing glass articles from glass tubing may include introducing the glass tubing to a converter that includes at least one forming station and a separating station. The glass tubing may be laminated glass tubing having a core layer comprising a core glass composition, an outer clad layer comprising an outer glass composition, and an inner clad layer comprising an inner glass composition. The core layer may be under tensile stress and at least one of the inner clad layer or the outer clad layer may be under compressive stress. The method may further include forming at least one feature of the glass article at a working end of the laminated glass tubing and separating a glass article from the working end of the laminated glass tubing. Separating the glass article from the laminated glass tubing may expose a portion of the core layer at the working end of the laminated glass tubing. The method may further include remediating the exposed portion of the core layer by completely enclosing the core layer in a clad layer.

A twenty-ninth aspect of the present disclosure may include the twenty-eighth aspect, wherein the inner clad layer and the outer clad layer may cooperate to completely enclose the core layer.

A thirtieth aspect of the present disclosure may include the twenty-eighth or twenty-ninth aspects, wherein completely enclosing the core layer within the clad layer may isolate the core layer from external sources of surface damage.

A thirty-first aspect of the present disclosure may include any of the twenty-eighth to thirtieth aspects, wherein the exposed portion of the core layer may be disposed at an axial surface of the working end of the laminated glass tubing prior to remediating the exposed portion of the core layer.

A thirty-second aspect of the present disclosure may include any of the twenty-eighth through thirty-first aspects, wherein the inner glass composition and the outer glass composition may be different than the core glass composition.

A thirty-third aspect of the present disclosure may include any of the twenty-eighth through thirty-second aspects, wherein remediating the exposed portion of the core layer may include coupling a glass sheet to a surface of the laminated glass tubing, wherein the glass sheet may be positioned to cover the exposed portion of the core layer.

A thirty-fourth aspect of the present disclosure may include the thirty-third aspect, wherein the inner clad layer, the outer clad layer, and the glass sheet may cooperate to isolate the exposed portion of the core layer from external sources of surface damage.

A thirty-fifth aspect of the present disclosure may include the thirty-third or thirty-fourth aspects, wherein the glass sheet may include a glass ring.

A thirty-sixth aspect of the present disclosure may include any of the thirty-third through thirty-fifth aspects, wherein the glass sheet may have a thickness of greater than or equal to 75 micrometers.

A thirty-seventh aspect of the present disclosure may include any of the thirty-third through thirty-sixth aspects, wherein the glass sheet may include a glass composition that is the same as at least one of the inner glass composition and the outer glass composition.

A thirty-eighth aspect of the present disclosure may include any of the thirty-third through thirty-seventh aspects, wherein the glass sheet may include a glass composition that is different than at least one of the inner glass composition and the outer glass composition.

A thirty-ninth aspect of the present disclosure may include any of the thirty-third through thirty-eighth aspects, wherein coupling the glass sheet to the surface of the laminated glass tubing may include heating the surface of the laminated glass tubing, and contacting the glass sheet with the heated surface.

A fortieth aspect of the present disclosure may include the thirty-ninth aspect, wherein the surface of the laminated glass tubing may be heated to a temperature at which a viscosity of the glass at the surface of the laminated glass tubing is less than or equal to 100 kilopoise.

A forty-first aspect of the present disclosure may include the thirty-ninth or fortieth aspects, wherein coupling the glass sheet to the surface of the laminated glass tubing may include thermally polishing the glass sheet and the surface, wherein thermal polishing may integrate the glass sheet into the surface of the laminated glass tubing, thereby bonding the glass sheet to the inner clad layer, the outer clad layer, or both.

A forty-second aspect of the present disclosure may include any of the twenty-eighth through forty-first aspects, wherein remediating the exposed portion of the core layer may include moving glass from the inner clad layer, the outer clad layer, or both to completely enclose the core layer.

A forty-third aspect of the present disclosure may include the forty-second aspect, wherein moving glass from the inner clad layer, the outer clad layer, or both to completely enclose the core layer may include heating the inner clad layer, the outer clad layer, or both proximate the exposed portion of the core layer, wherein heating reduces a viscosity of the inner glass composition, the outer glass composition, or both to enable deforming of the inner clad layer, the outer clad layer, or both. Moving the glass may further include deforming the inner clad layer, the outer clad layer, or both into contact with the exposed portion of the core layer.

A forty-fourth aspect of the present disclosure may include the forty-third aspect, wherein deforming may include contacting the inner clad layer, the outer clad layer, or both with one or a plurality of forming tools.

A forty-fifth aspect of the present disclosure may include any of the forty-second or forty-third aspects, wherein moving glass from the inner clad layer, the outer clad layer, or both to completely enclose the core layer may include separating a glass piece from the working end of the laminated glass tubing.

A forty-sixth aspect of the present disclosure may include the forty-fifth aspect, wherein separating a glass piece from the working end of the laminated glass tubing may include heating a trimming region of the laminated glass tubing, wherein the trimming region is spaced apart axially from the working end of the laminated glass tubing, and converging an inner trimming tool and an outer trimming tool into close contact at the trimming region of the laminated glass tubing, wherein converging the inner trimming tool and the outer trimming tool into close contact deforms the inner clad layer, the outer clad layer, or both until the inner clad layer and the outer clad layer are contacted at the trimming region and separates the glass piece from the working end of the laminated glass tubing.

A forty-seventh aspect of the present disclosure may include the forty-sixth aspect, wherein converging the inner trimming tool and the outer trimming tool to deform the inner clad layer and the outer clad layer into contact in the trimming region may completely enclose the core layer within the inner clad layer and the outer clad layer at a new working end of the laminated glass tubing.

In a forty-eighth aspect of the present disclosure, a system for maintaining the integrity of laminated glass tubing during conversion of the laminated glass tubing into a plurality of glass articles may include a holder operable to secure the laminated glass tubing. The glass tubing may include at least a core layer, an inner clad layer, and an outer clad layer. The core layer may be under tension and at least one of the inner clad layer and the outer clad layer may be under compression. The system may further include a separator operable to separate a glass article from a working end of the laminated glass tubing. Separation of the glass article from the working end of the laminated glass tubing may expose a portion of the core layer at the working end of the laminated glass tubing. The system may further include a re-cladding station operable to remediate the exposed portion of the core layer and completely enclose the core layer from external sources of surface damage.

A forty-ninth aspect of the present disclosure may include the forty-eighth aspect, wherein the re-cladding station may include a preheater operable to heat the laminated glass tubing at a working end or a trimming region of the laminated glass tubing.

A fiftieth aspect of the present disclosure may include the forty-ninth aspect, wherein the preheater may include a gas torch or a laser.

A fifty-first aspect of the present disclosure may include any of the forty-eighth through fiftieth aspects, wherein the re-cladding station may include a glass sheet holder and the re-cladding station is operable to contact a glass sheet disposed in the glass sheet holder with a surface of the laminated glass tubing.

A fifty-second aspect of the present disclosure may include any of the forty-eighth through fifty-first aspects, wherein the re-cladding station may include a trimming station that includes an inner trimming tool and an outer trimming tool, wherein the trimming station may be operable to progressively bring the inner trimming tool and the outer trimming tool into close contact.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2A schematically depicts an embodiment of a separator for thermally separating an article from a working end of the laminated glass tubing of FIG. 1A, according to one or more embodiments shown and described herein;

FIG. 2B schematically depicts the separator of FIG. 2A following thermal separation of the article from the working end of the laminated glass tubing, according to one or more embodiments shown and described herein;

FIG. 3A schematically depicts a side cross-sectional view of a working end of laminated glass tubing immediately following separation of an article from the laminated glass tubing by the separator of FIG. 2A, according to one or more embodiments shown and described herein;

FIG. 3B schematically depicts a side cross-sectional view of an article separated from the working end of the laminated glass tubing by the separator of FIG. 2A, according to one or more embodiments shown and described herein;

DETAILED DESCRIPTION

Figure 1A:
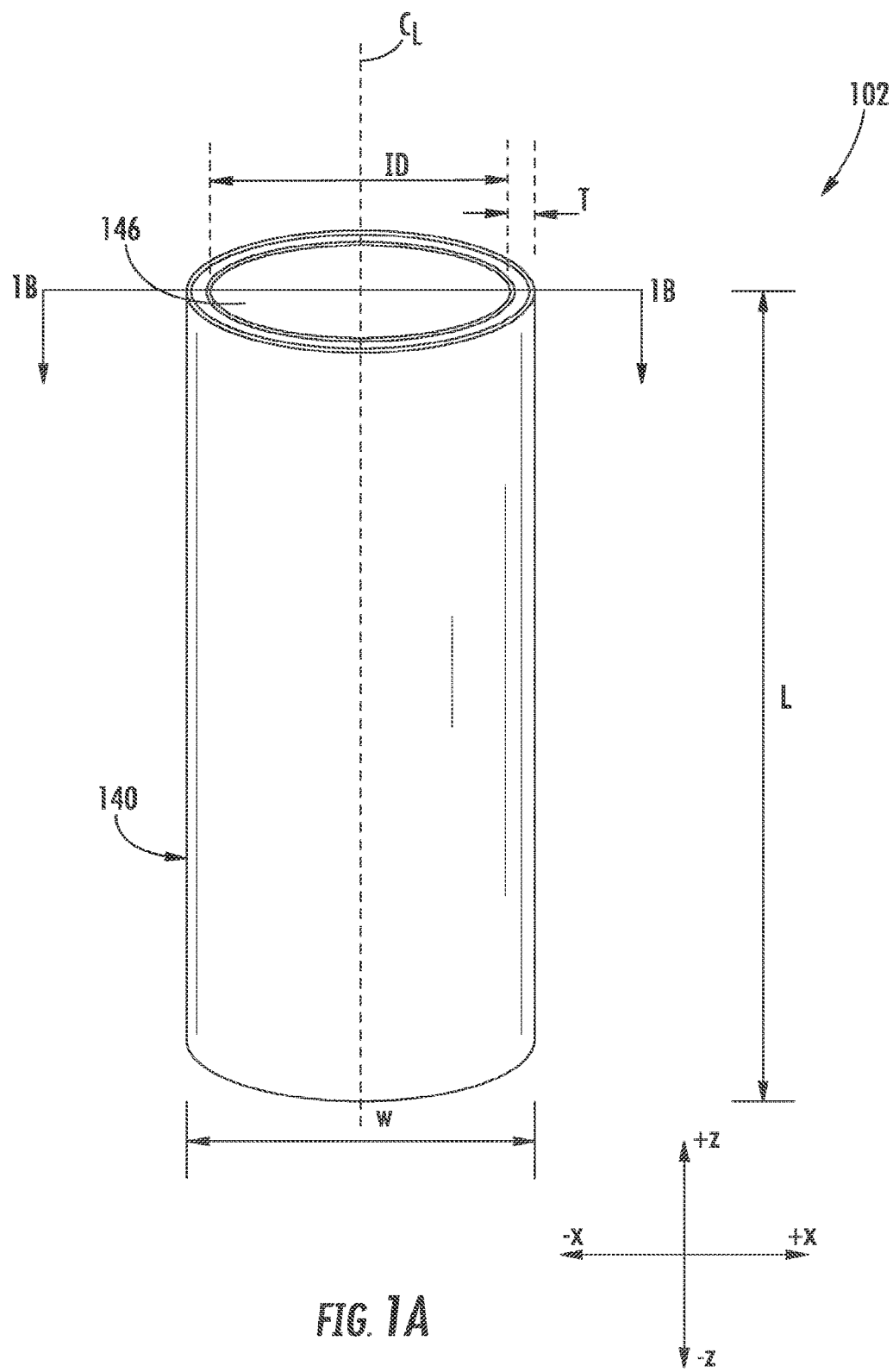
FIG. 1A schematically depicts a perspective view of an embodiment of laminated glass tubing, according to one or more embodiments shown and described herein.

Reference will now be made in detail to embodiments of glass articles produced from laminated glass tubing, and systems and methods for producing glass articles from laminated glass tubing. Whenever possible, the same reference numerals will be used throughout the drawings to refer to the same or like parts.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tubing is the end of the glass tubing which may be shaped into one or more features of the glass articles made from the glass tubing. When using a converter to produce the glass articles, the working end of the glass tubing may be oriented towards the processing stations of the converter relative to the holder, and the "non-working end" of the glass tubing is the end of the glass tubing oriented away from the processing stations.

As used herein, the term "features" refers to structural areas of the glass article in which the glass of the laminated glass tubing 102 has been deformed from its original tubular shape into a different shape. For example, "features" of the glass article 103 may include, but are not limited to, necks, shoulders, flanges, bottoms, ridges, ribs, nozzles, channels, depressions, surface textures, or other structural shapes.

As used herein, "axial" refers to the +/−Z direction of the coordinate axis provided in the figures and refers to surfaces or structures that are generally perpendicular to the center axis $C_L$ of the glass tubing.

Pharmaceutical containers may be made of glass because of its hermeticity, optical clarity, and excellent chemical durability relative to other materials. Some glass articles and glass sheets, such as those including aluminosilicate glass compositions, may be chemically strengthened by ion exchange. In the ion exchange strengthening process, ions in the surface layer of the glass are replaced by—or exchanged with—larger ions having the same valence or oxidation state. In some glass compositions capable of being ion-exchanged, the ions in the surface layer of the glass composition and the larger ions may be monovalent alkali metal cations, such as $Li^+$, $Na^+$, $K^+$, $Rb^+$, and $Cs^+$. Due to the presence of alkali metal ions in the glass matrix of aluminosilicate glass compositions, aluminosilicate glasses may be easily chemically tempered through ion exchange processes. However, some glass compositions, such as borosilicate glasses for example, do not contain alkali metal ions in proportions sufficient to enable these glass compositions to be readily and/or efficiently chemically strengthened through ion exchange. Furthermore, ion exchange strengthening, as well as other tempering processes to strengthen the glass tubing, may require additional process steps that increases the capital, material, and operating costs of producing the glass tubing.

Glass pharmaceutical packages that are classified as Type I glasses under United States Pharmacopoeia (USP) <660> are generally formed from borosilicate glasses. According to USP <660>, glasses classified as Type I glasses have a high hydrolytic resistance making them suitable for containing most parenteral and nonparenteral compositions. However, it has now been determined that Type I borosilicate glass compositions currently used for glass pharmaceutical packages may be incapable of being strengthened to achieve a central tension of greater than or equal to 13 MPa. As such, the glass pharmaceutical packages formed from such glass compositions may be susceptible to the formation of through-thickness cracks which compromise the hermeticity of the glass package.

Alternatively, glass tubing and glass articles made therefrom and having improved mechanical durability can be produced by forming laminated glass tubing and converting the laminated glass tubing into the glass articles. Laminated glass tubing may include a plurality of glass layers as describe in, for example, U.S. Pat. No. 9,034,442, the entirety of which is incorporated by reference herein. For example, in some embodiments, laminated glass tubing may include a core layer and at least one clad layer. The clad layer may include at least an inner clad layer proximate the inner portion of the core layer and an outer clad layer proximate the outer portion of the core layer. In such embodiments, if the thermal expansion coefficients (CTE) of the glass compositions of the inner clad layer and outer clad layer are different than the CTE of the glass composition used for the core layer, then the difference in thermal expansion of each of the glass layers may result in compressive stress in the inner clad layer and the outer clad layer and tensile stress in the core layer. Producing compressive stress in the clad layer may increase the mechanical durability of the glass by increasing the resistance of the outer surface of the glass to surface damage.

One of the challenges in producing glass articles from laminated glass tubing is avoiding exposure of a portion of the core layer at the surface of the glass article. For example, typical processes for converting glass tubing into glass articles include a separating process, such as thermal separation or score/break separation, in which the glass article is separated from the working end of the glass tubing. With laminated glass tubing, this separating process can result in exposure of the core layer to the atmosphere and/or external sources of surface damage at an axial surface of the working end of the laminated glass tubing. Exposing a portion of the core layer at the surface of the laminated glass tubing creates an area of the surface of the glass article that is under reduced compressive stress, or even under tensile stress. Having a portion of the surface under reduced compressive stress or under tension greatly decreases the mechanical durability of the glass article and resistance of the glass article to external sources of surface damage.

The present disclosure includes systems and methods for converting laminated glass tubing into a plurality of glass articles, the systems and methods including remediating the exposed portion of the core layer after separating the glass article from the working end of the laminated glass tubing. Remediating the exposed portion of the core layer exposed during separation results in fully enclosing the core layer, which is under tension, in a clad layer under compression, thereby isolating the core layer from the atmosphere and external sources of surface damage and flaws. The present disclosure also includes glass articles produced from laminated glass tubing, the glass articles having the core layer of the laminated glass completely surrounded or enclosed by one or a plurality of clad layers under compressive stress.

As used in this disclosure, the phrase "fully enclosed by" refers to the clad layer surrounding the core layer so that the inner surface of the clad layer encapsulates the core layer and no portion of the core layer can be contacted by any substance or source of surface damage external to the laminated glass tubing without the substance or source of surface damage first encountering the clad layer. As used in this disclosure, the phrase "completely isolating the core layer" refers to separating the core layer from substances and sources of surface damage external relative to the laminated glass tubing by interposing the clad layer between the core layer and the substances and sources of surface damage so that no portion of the core layer can be contacted by any substance or source of surface damage external to the laminated glass tubing without the substance or source of surface damage first encountering the clad layer and passing therethrough.

Figure 1C:
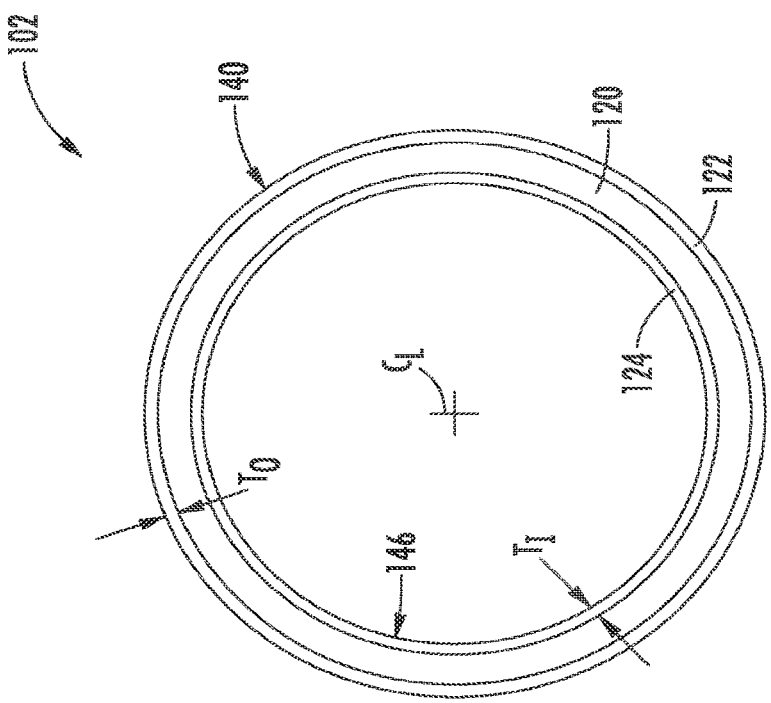
FIG. 1C schematically depicts a top cross-sectional view of the laminated glass tubing of FIG. 1B taken along reference line 1C-1C in FIG. 1B, according to one or more embodiments shown and described herein.
Figure 1B:
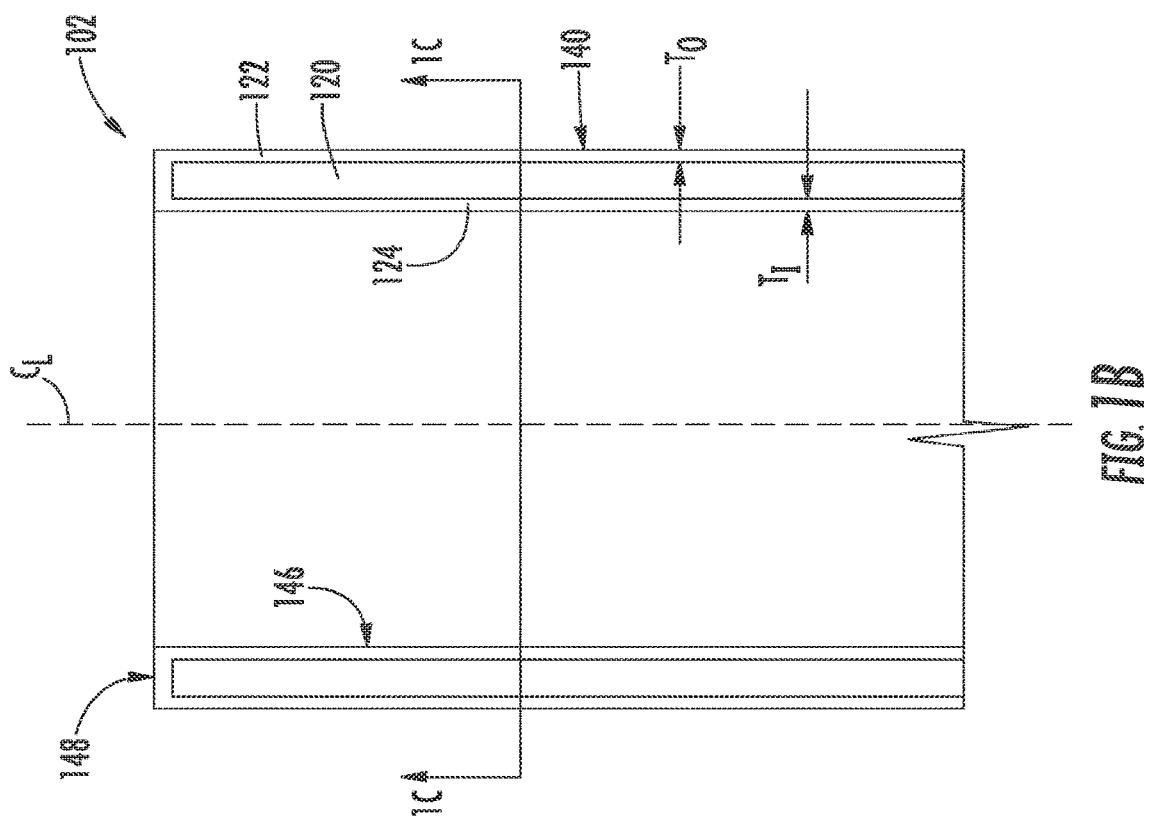
FIG. 1B schematically depicts a side cross-sectional view of the laminated glass tubing of FIG. 1A taken along reference line 1B-1B, according to one or more embodiments shown and described herein.

Referring to FIGS. 1A-1C, an embodiment of laminated glass tubing 102 is depicted prior to separating a glass article from the laminated glass tubing 102. The laminated glass tubing 102 may include a plurality of glass layers, such as 2, 3, 4, 5, 6, or more than six glass layers. For example, in some embodiments, the laminated glass tubing 102 may include at least a core layer 120 and at least one clad layer as describe in, for example, U.S. Pat. No. 9,034,442. For example, the laminated glass tubing 102 may include the core layer 120 and the clad layer may include an outer clad layer 122 and an inner clad layer 124. The outer clad layer 122 may be in contact with the outer surface of the core layer 120 and may be positioned radially outward from the core layer 120 relative to the centerline $C_L$ of the laminated glass tubing 102. The inner clad layer 124 may be in contact with the inner surface of the core layer 120 and may be positioned radially inward from the core layer 120. The outer clad layer 122 and the inner clad layer 124 cooperate to enclose the core layer 120 at the axial surface 148 of the laminated glass tubing 102. The outer clad layer 122 may be the exterior surface 140 of the laminated glass tubing 102, and the inner clad layer 124 may provide the inner surface 146 of the laminated glass tubing 102. Although the systems and methods of this disclosure are described herein in the context of laminated glass tubing 102 having 3 layers, it is understood that the laminated glass tubing may have more than three layers. For example, in some embodiments, the laminated glass tubing may have a plurality of core layers 120, a plurality of outer clad layers 122, and/or a plurality of inner clad layers 124.

The core layer 120 may include a core glass composition, the outer clad layer 122 may include an outer layer glass composition, and the inner clad layer 124 may include an inner layer glass composition. The core glass composition may be different than the outer layer glass composition, the inner layer glass composition, or both. In some embodiments, the outer layer glass composition may be the same as the inner layer glass composition. Alternatively, in other embodiments, the outer layer glass composition may be different than the inner layer glass composition.

In some embodiments, the inner glass composition of the inner clad layer 124 may be a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP <660> and EP 7, borosilicate glasses meet the Type I criteria and are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. In some embodiments, the inner layer glass composition of the inner clad layer 124 may be a glass composition that meets the performance criteria of or is otherwise classified as a Type I glass under United States Pharmacopoeia (USP) <660> and/or a glass having a hydrolytic resistance of HGA1 according to ISO 720. In some embodiments, the inner layer glass composition of the inner clad layer 124 may be a borosilicate glass or an aluminosilicate glass that meets the Type 1 performance criteria of USP <660> and/or the HGA1 performance criteria of ISO 720.

The inner layer glass composition and the outer layer glass composition may have properties different than the core glass composition, such as coefficient of thermal expansion (CTE), Young's modulus, or other property. For example, the inner layer glass composition and/or the outer layer glass composition may have CTEs that are different than the CTE of the core glass composition. As the glass compositions cool during formation of the laminated glass tubing 102, the difference in the CTE between the core glass composition and the glass compositions of the outer clad layer 122 and inner clad layer 124 produces compressive stress in the outer clad layer 122 and inner clad layer 124 and tension or tensile stress in the core layer 120. The compressive stress produced in the outer clad layer 122 and inner clad layer 124 strengthens the laminated glass tubing 102, increasing the resistance of the laminated glass tubing 102 to external sources of surface damage. These compressive stresses in the outer clad layer 122 and inner clad layer 124 must first be overcome before encapsulated flaws in the glass experience enough tension to propagate through the laminated glass tubing 102. Thus, introducing compression stress into the outer clad layer 122 and inner clad layer 124 through differences in CTE increases the mechanical durability of the laminated glass tubing 102 and the resistance of the laminated glass tubing 102 to damage from surface flaws.

The amount of compressive stress in the laminated glass tubing 102 may be adjusted by changing the core glass composition, the inner layer glass composition, and/or the outer layer glass composition to increase or decrease the difference in properties (e.g., CTE, Young's modulus, etc.) between the core glass composition and the inner layer and outer layer glass compositions. The amount and/or depth of compressive stress in the outer clad layer 122 may be adjusted by modifying the thickness $T_O$ of the outer clad layer 122. Likewise, the amount and/or depth of compressive stress in the inner clad layer 124 may be adjusted by modifying the thickness $T_I$ of the inner clad layer 124. The selection of glass compositions for the core layer 120, outer clad layer 122, and inner clad layer 124, the thickness $T_O$ of the outer clad layer 122, and the thickness $T_I$ of the inner clad layer 124 may enable the amount and depth of compressive stress in the outer clad layer 122 and/or inner clad layer 124 to be tunable for specific applications.

In some embodiments, the overall thickness T of the laminated glass tubing 102 may be from less than or equal to 6 millimeters (mm), such as less than or equal to 4 mm, less than or equal to 2 mm, less than or equal to 1.5 mm or less than or equal to 1 mm. In some embodiments, the overall thickness T of the laminated glass tubing 102 may be from 0.1 mm to 6 mm, from 0.3 mm to 4 mm, from 0.5 mm to 4 mm, from 0.5 mm to 2 mm, or from 0.5 mm to 1.5 mm. The thickness $T_O$ of the outer clad layer 122 and/or the thickness $T_I$ of the inner clad layer 124 may be from 5% to 33% of the overall thickness T of the laminated glass tubing 102, such as from 10% to 30% or 15% to 25% of the overall thickness T of the laminated glass tubing 102. In some embodiments, the thickness $T_O$ of the outer clad layer 122 and/or the thickness $T_I$ of the inner clad layer 124 may be greater than or equal to 30 micrometers (μm), such as greater than or equal to 50 μm, greater than or equal to 75 μm, greater than or equal to 100 μm, or even greater than or equal to 150 μm. In some embodiments, the thickness $T_O$ of the outer clad layer 122 and/or the thickness $T_I$ of the inner clad layer 124 may be from 30 μm to 1 mm, such as from 50 μm to 0.75 mm, from 75 µm to 0.5 mm, from 100 µm to 0.5 mm, or even from 150 µm to 0.5 mm.

In some embodiments, the outer clad layer 122 and/or the inner clad layer 124 of the laminated glass tubing 102 may be under a compressive stress sufficient to provide mechanical durability to the laminated glass tubing 102. For example, in some embodiments, the outer clad layer 122 and/or the inner clad layer 124 may be under a compressive stress of greater than or equal to 50 megapascals (MPa), greater than or equal to 75 MPa, greater than or equal to 100 MPa, or even greater than or equal to 150 MPa. For example, in some embodiments, the outer clad layer 122 and/or the inner clad layer 124 of the laminated glass tubing 102 may be under a compressive stress of from 50 MPa to 700 MPa, from 50 MPa to 500 MPa, from 50 MPA to 400 MPa, from 75 MPa to 750 MPa, from 75 MPa to 500 MPa, from 75 MPa to 400 MPa, from 100 MPa to 700 MPa, from 100 MPa to 500 MPa, or even from 100 MPa to 400 MPa. In some embodiments, the core layer 120 of the laminated glass tubing 102 may be under a tensile stress of from 10 MPa to 50 MPa, such as from 10 MPa to 40 MPa, from 10 MPa to 30 MPa, from 15 MPa to 50 MPa, from 15 MPa to 40 MPa, or from 15 MPa to 30 MPa. The compressive stress in the clad layers 122, 124 and tensile stress in the core layer 120 of the glass articles 103 made from the laminated glass tubing 102 may be similar to the compressive stress and tensile stress of the laminated glass tubing 102.

The laminated glass tubing 102 may be produced using a Vello Process, such as the process described in U.S. Pat. No. 4,023,953. Other processes, such as the Danner Process for example, may be used to produce the laminated glass tubing 102.

Referring to FIGS. 2A and 2B, the laminated glass tubing 102 may be converted into a plurality of glass articles 103, such as bottles, vials, syringes, ampoules, cartridges, and other glass articles for pharmaceutical applications. The laminated glass tubing 102 may also be converted into glass articles 103 for use outside of pharmaceutical applications, such as food packaging for example. In some embodiments, the laminated glass tubing 102 may be converted into these glass articles 103 using a converter comprising a plurality of processing stations. The processing stations may include heating stations, forming stations, separating stations, and piercing stations, among other types of processing stations. In general, during the converting process, the working end 150 of the laminated glass tubing 102 is reformed into one or more features of the glass article 103. Once the features of the glass article 103 are formed, the glass article 103 is separated from the working end 150 of the laminated glass tubing 102. The converter and converting process will subsequently be described in further detail relative to FIGS. 14 and 15.

Referring to FIGS. 2A and 2B, the glass article 103 may be separated from the working end 150 of the laminated glass tubing 102 by thermal separation, mechanical scoring and breaking, laser cutting, or other separation method. FIGS. 2A-2B illustrate a separating station 206 in which the glass article 103 is separated from the working end 150 of the laminated glass tubing 102 through thermal separation. In FIG. 2A, the working end 150 of the laminated glass tubing 102 has been reformed to include a plurality of features, such as a shoulder 142, flange 144, and neck 145 for example, for producing a vial. Although the glass article 103 is shown as being a vial in FIG. 2A, it is understood that the glass article 103 could have features characteristic of an ampoule, syringe, cartridge, bottle, or other article. For thermal separation, the separating station 206 may include a separating torch 252 positioned a distance $L_A$ from the working end 150 of the laminated glass tubing 102. The distance $L_A$ may be selected to produce the desired length dimension in the glass article 103. The separating torch 252 heats the laminated glass tubing 102 in a separation region of the laminated glass tubing 102 as the laminated glass tubing 102 is rotated by the holder 130 relative to the separating torch 252. As the temperature of the glass in the separation region of the laminated glass tubing 102 increases, the viscosity of the glass decreases. At temperatures above the transition temperature of the glass, the glass in the separation region becomes flowable, which enables the glass article 103 to be separated from the working end 150 of the laminated glass tubing 102. Thermal separation produces a meniscus 156 of glass over the new working end 152 of the laminated glass tubing 102. The meniscus 156 can be reopened by a piercing step subsequent to the thermal separation step. Thermal separation may generally be used in producing vials, bottles, ampoules, and other closed-bottom containers or articles because a meniscus 160 of glass produced across the end of the glass article 103 separated from the laminated glass tubing 102 forms the bottom of the glass article 103. In some embodiments, thermal separation may be accomplished in the separating station 206 using a laser instead of the separating torch 252.

In some embodiments, the glass article 103 may be separated from the laminated glass tubing 102 by mechanically scoring the interior surface 146, exterior surface 140, or both of the laminated glass tubing 102 in the separation region of the laminated glass tubing 102 with a scoring tool (not shown) or scribing tool (not shown) and breaking the article 103 off from the working end 150 of the laminated glass tubing 102. The score/break method of separating the glass article 103 from the laminated glass tubing 102 may be used for glass articles 103 having at least one open end, such as cartridges, syringes or other glass articles having an at least one open end. In some embodiments, mechanically separating the glass article 103 from the laminated glass tubing 102 may include a subsequent fire polishing step to reshape the axial ends of the article 103 to remove sharp edges.

Referring to FIG. 3A, the working end 150 of the laminated glass tubing 102 after separation of the glass article 103 from the laminated glass tubing 102 in the separating station 206 is depicted. Separation of the glass article 103 from the laminated glass tubing 102 by thermal or mechanical separation exposes a portion of the core layer 120 at the axial surface 148 of the laminated glass tubing 102. The exposed portion 126 of the core layer 120 is not clad in the glass composition of the outer clad layer 122 or the inner clad layer 124 and is, thus, exposed to potential sources of surface damage.

Figure 4:
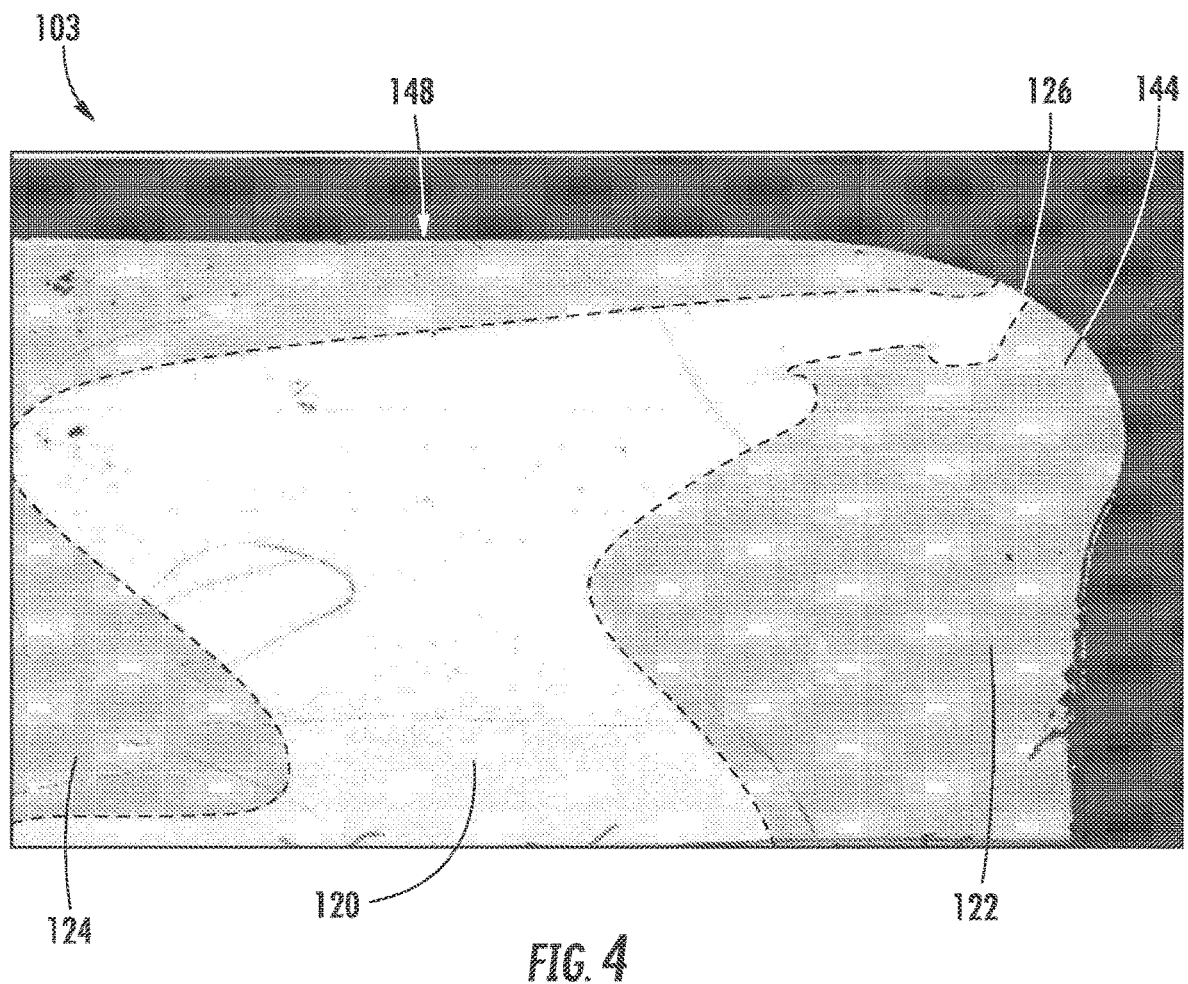
FIG. 4 is a photograph of a flange formed on a working end of a laminated glass tubing having an exposed portion of the core layer, according to one or more embodiments shown and described herein.

Referring now to FIG. 3B, the working end 150 of the laminated glass tubing 102 is schematically depicted after reforming the working end 150 of the laminated glass tubing 102 into the features for a vial, which features include the shoulder 142, flange 144, and neck 145. In some embodiments, after reforming the working end 150 of the laminated glass tubing 102, the axial surface 148 of the laminated glass tubing 102 may still exhibit the exposed portion 126 of the core layer 120. FIG. 4 is a photograph of one example depicting part of the flange 144 of a glass article 103 produced from the laminated glass tubing 102. As shown in FIG. 4, the exposed portion 126 of the core layer 120 at the axial surface 148 of the laminated glass tubing 102 can persist throughout the reforming process and be present in the final glass article 103. During the reforming process, some glass from the outer clad layer 122 or inner clad layer 124 may be moved to cover a part of the exposed portion 126 of the core layer 120. However, a portion of the exposed portion 126 of the core layer 120 remains unclad in the finished glass article 103. Thus, FIG. 4 shows that the exposed portion 126 of the core layer 120, once produced in the separating station 206 of a conventional converter, is at least partially maintained throughout the conventional converting process so that it remains present in the finished glass article 103.

Figure 5A:
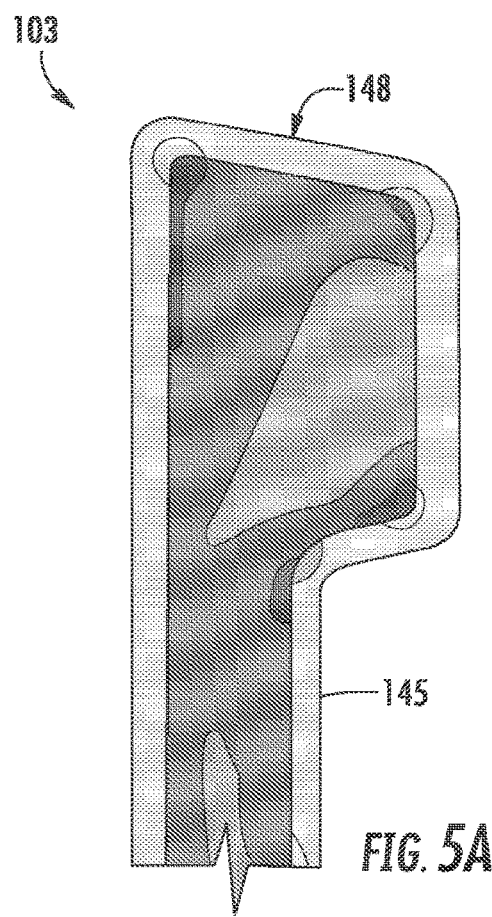
FIG. 5A graphically depicts a 2-dimensional stress profile for a stress model developed for a flange of a vial having no exposed portion of the core layer, according to one or more embodiments shown and described herein.

Referring now to FIG. 5A, a stress model is depicted for the cross-section of the flange 144 and neck 145 of a glass article 103 after converting. The stress model was developed for a glass article 103 in FIG. 5A that does not have an exposed portion 126 of the core layer 120 at the axial surface 148 of the glass article 103. The relative stress within the glass of each layer is indicated by shades of gray, with lighter gray indicating compressive stress and darker gray indicating tensile stress. The lightest gray color indicates the highest magnitude of compressive stress, and the darkest gray indicates the highest magnitude of tensile stress. The clad layer surrounding the core layer 120 includes the outer clad layer 122 and the inner clad layer 124. The clad layer is under compressive stress as indicated by the lighter shades of gray in the outer clad layer 122 and inner clad layer 124 regions of FIG. 5A. The core layer 120 is under central tension as indicated by the darker shades of gray in the core layer 120 regions of FIG. 5A.

Figure 5B:
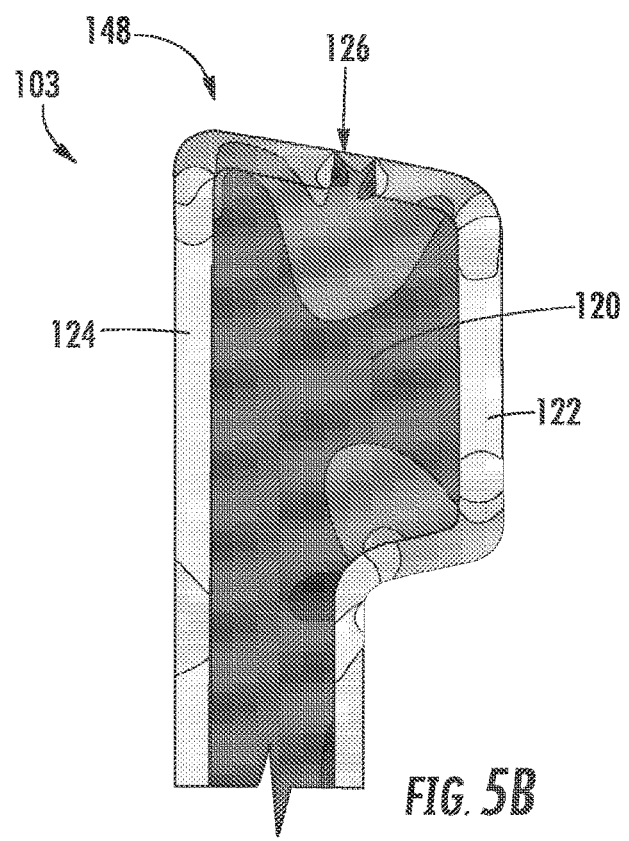
FIG. 5B graphically depicts a 2-dimensional stress profile for a stress model developed for a flange of a vial having an exposed portion of the core layer, according to one or more embodiments shown and described herein.

Referring now to FIG. 5B, the stress model is shown for the cross-section of the flange 144 and neck 145 of the glass article 103 having an exposed portion 126 of the core layer 120 at the axial surface 148 of the glass article 103. All parameters of the stress model other than the presence of the exposed portion 126 of the core layer 120 were consistent between the stress model of FIG. 5A and the stress model of FIG. 5B. As with FIG. 5A, the lighter shades of gray in FIG. 5B indicate compressive stress and the darker shades of gray indicate tensile stress. As shown in FIG. 5B, introduction of the exposed portion 126 of the core layer 120 at the axial surface 148 of the glass article 103 increases the tensile stress in the core layer 120 as indicated by the darker gray of the core layer 120 in FIG. 5B compared to the core layer 120 in FIG. 5A. Additionally, introduction of the exposed portion 126 of the core layer 120 to the axial surface 148 of the glass article 103 reduces the compressive stress in the clad layer at the axial surface 148 of the glass article 103, as indicated by the dark gray regions in the clad layer along the axial surface 148. Portions of the clad layer along the axial surface 148 are even shown as being under tension instead of compression. The reduced compressive and even tension present in the clad layer along the axial surface 148 indicates a decrease in the mechanical durability and resistance to surface damage of the glass article 103 along the axial surface 148.

The present disclosure is directed to systems and methods for remediating the exposed portion 126 of the core layer 120. The converting process may include a re-cladding step or re-cladding station inserted after separation of the glass article 103 from the laminated glass tubing 102 and before thermal reforming of the working end 150 of the laminated glass tubing 102. In the re-cladding step, a glass composition may be added to the exposed portion 126 of the core layer 120 or glass may be moved from the outer clad layer 122 or the inner clad layer 124 to the exposed portion 126 of the core layer 120 to re-clad the exposed portion 126 of the core layer 120. For example, in some embodiments, a sheet of glass, such as an annular wafer of glass, may be coupled to the axial surface 148 of the laminated glass tubing 102 to re-clad the exposed portion 126 of core layer 120. Alternatively, in other embodiments, glass from the outer clad layer 122 and/or the inner clad layer 124 may be transitioned to a molten state and moved by one or more forming tools or trimming tools to the exposed portion 126 of the laminated glass tubing 102 to re-clad the exposed portion 126. Re-cladding the exposed portion 126 of the core layer 120 may fully enclose the core layer 120 and eliminate the exposed portion 126 of the core layer 120. After re-cladding, the core layer 120 of the laminated glass tubing 102 is completely isolated from the atmosphere and from sources of surface damage by the outer clad layer 122, the inner clad layer 124, and, in some embodiments, the glass composition that has been re-clad over the exposed portion 126 of the core layer 120 in the re-cladding step. The glass composition re-clad over the exposed portion 126 of the core layer 120 may be maintained and the core layer 120 isolated from external sources of damage throughout the forming operations of the converting process, and the glass article 103 produced from the laminated glass tubing 102 may be free of any exposed portion 126 of the core layer 120. The glass article 103 may have the core layer 120 that is completely isolated from the atmosphere and/or external sources of surface damage.

Figure 6A:
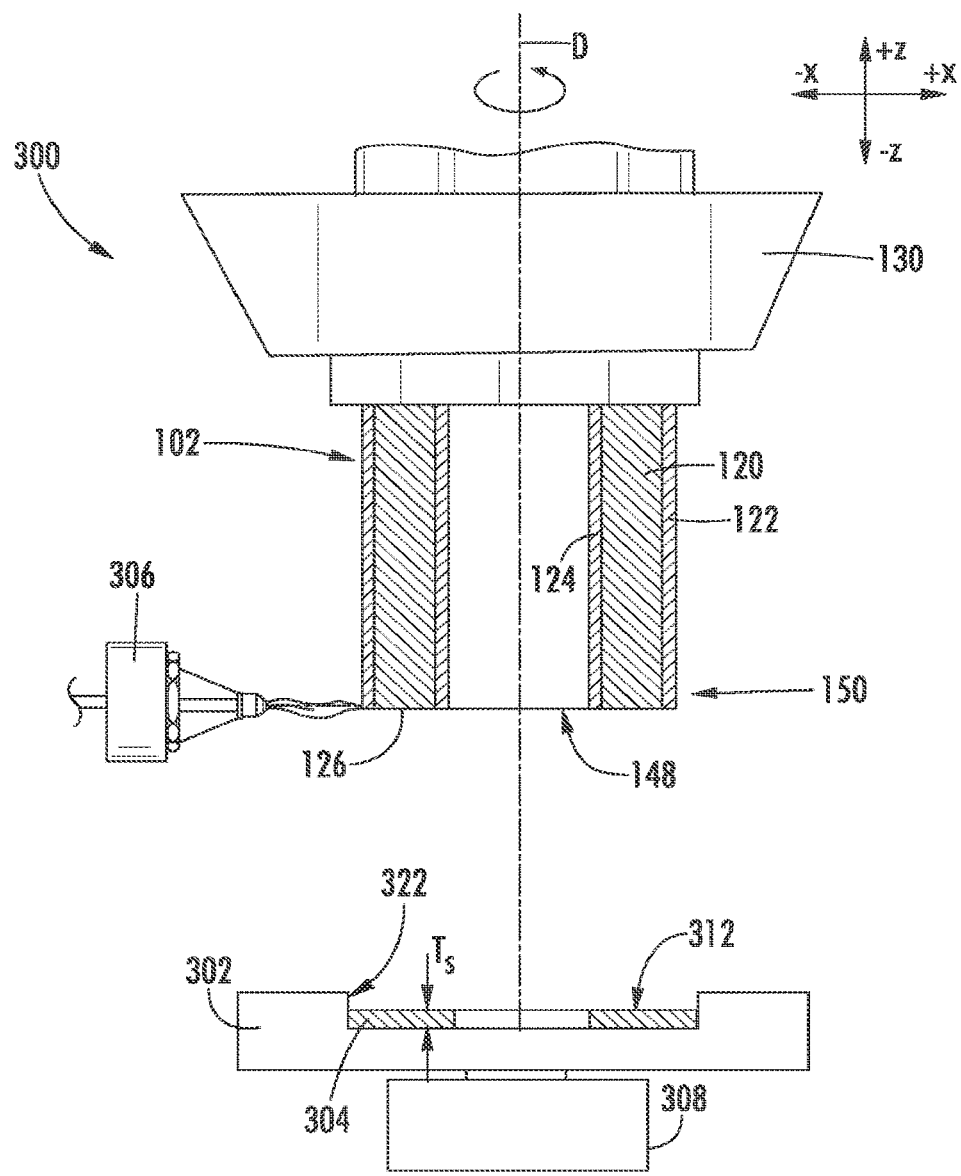
FIG. 6A schematically depicts a re-cladding station, according to one or more embodiments shown and described herein.
Figure 6B:
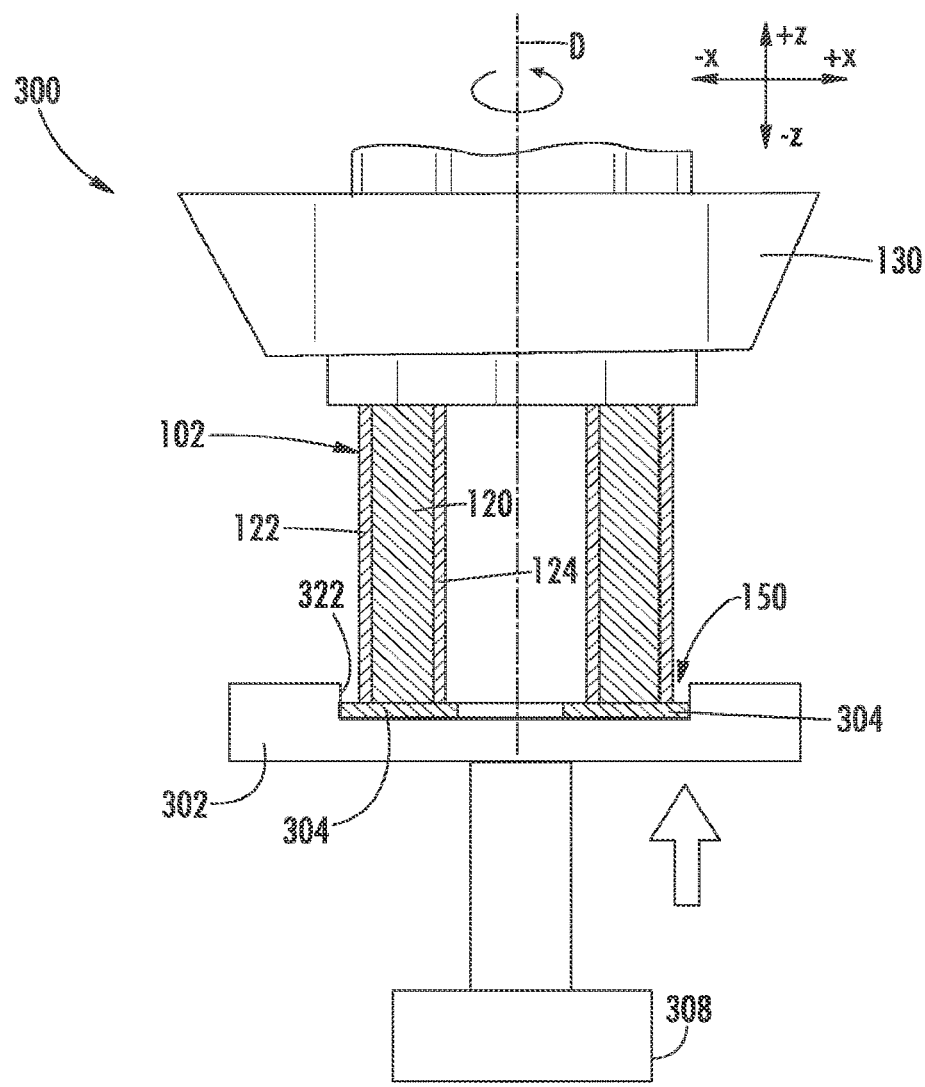
FIG. 6B schematically depicts the re-cladding station of FIG. 6A in which a glass sheet holder of the cladding station is engaged with a working end of the laminated glass tubing, according to one or more embodiments shown and described herein.

Referring to FIG. 6A-6B, a converter for converting the laminated glass tubing 102 into a plurality of the glass article 103 may include a re-cladding station 300. In some embodiments, the re-cladding station 300 may be operable to re-clad the exposed portion 126 of the core layer 120 by coupling a glass sheet 304 to the axial surface 148 of the laminated glass tubing 102, thereby re-cladding the exposed portion 126 of the core layer 120 with the glass sheet 304.

The glass sheet 304 may be formed from any conventional glass sheet forming process, such as but not limited to, a fusion downdraw process, a slot draw process, a redraw process, a float process, or other glass sheet forming process. The glass sheet 304 may have a thickness $T_S$ sufficient to re-clad the exposed portion 126 of the core layer 120. In some embodiments, the glass sheet 304 may have a thickness $T_S$ that enables the glass sheet 304 to form a compression layer over the exposed portion 126 of the core layer 120 sufficient to protect the core layer 120 from external sources of surface damage. In some embodiments, the thickness $T_S$ of the glass sheet 304 may be greater than or equal to 50 microns (μm). For example, in some embodiments, the thickness $T_S$ of the glass sheet 304 may be greater than or equal to 75 μm, greater than or equal to 100 μm, greater than or equal to 125 μm, or even greater than or equal to 150 μm. The thickness $T_S$ of the glass sheet 304 may be less than or equal to 250 μm, such as less than or equal to 225 μm, less than or equal to 200 μm, less than or equal to 175 μm, or less than or equal to 150 μm. In some embodiments, the thickness $T_S$ of the glass sheet 304 may be from 50 μm to 250 μm, from 75 μm to 225 μm, from 100 μm to 200 μm, of from 125 μm to 175 μm. The thickness $T_S$ of the glass sheet 304 may be adjusted to modify the depth of the compressive stress layer and the magnitude of the compressive stress in the compressive stress layer formed by the glass sheet 304, thereby modifying the amount of reinforcement of the re-cladding covering the exposed portion 126 of the core layer 120.

Once the glass for the glass sheet has been formed, the glass may be cut into the discrete glass sheets 304. The glass may be cut into the discrete glass sheets 304 by laser cutting, mechanical scoring, or other glass cutting process. Each of the discrete glass sheets 304 may have a shape that conforms to a cross-sectional shape of the axial surface 148 of the laminated glass tubing 102. For example, in some embodiments, the glass sheet 304 may be an annular wafer or ring sized to completely cover the axial surface 148 of the laminated glass tubing 102. In some embodiments, the glass sheet 304 may be flat ring sized to cover the exposed portion 126 of the core layer 120. In some embodiments, the glass sheet 304 may be a ring or a disc with a central opening. Although shown and described in this disclosure as an annular disc, it is understood that the glass sheet 304 may have any other shape capable of covering the cross-sectional shape of the laminated glass tubing 102. For example, the glass sheet 304 may have a shape that may be, but is not limited to, square, triangular, polygonal, circular, elliptical, or irregular-shaped, with or without a central opening. In some embodiments, the glass sheet 304 may have dimensions, such as an inner diameter and/or an outer diameter sufficient to completely cover the exposed portion 126 of the core layer 120. In some embodiments, the glass sheet 304 may have dimensions, such as an inner dimeter and/or an outer diameter sufficient to completely cover the axial surface 148 of the laminated glass tubing 102.

The glass sheet 304 may include a re-clad glass composition that is different than the core glass composition of the core layer 120. The re-clad glass composition of the glass sheet 304 may have properties, such as CTE, Young's modulus, or other properties, that are different than the core glass composition of the core layer 120. For example, the re-clad glass composition of the glass sheet 304 may have a CTE that is different than the CTE of the core glass composition. The difference in the CTE between the core glass composition and the re-clad glass composition of the glass sheet 304 may produce compressive stress in the glass sheet 304 coupled to the axial surface 148 of the laminated glass tubing 102. After the glass article 103 is finished and cooled, the compressive stress produced in the re-clad glass composition of the glass sheet 304 may provide greater mechanical durability (i.e., greater resistance to surface damage, such as impact damage, scratches, etc.) compared to glass articles having an exposed portion 126 of the core layer 120. In some embodiments, the re-clad glass composition of the glass sheet 304 may be the same as the inner layer glass composition of the outer clad layer 122, the outer layer glass composition of the inner clad layer 124, or both. Alternatively, in other embodiments, the re-clad glass composition of the glass sheet 304 may be different than the inner layer glass composition for the outer clad layer 122, the outer layer glass composition of the inner clad layer 124, or both.

Referring to FIG. 6A, the re-cladding station 300 may include a glass sheet holder 302 operable to hold the glass sheet 304 and a holder 130 operable to hold the laminated glass tubing 102. In some embodiments, the holder 130 may be configured to removably secure each laminated glass tubing 102 relative to the re-cladding station 300. The holders 130 may be clamps, chucks, or other holding devices, or combinations of holding devices. In some embodiments, the holders 130 may position each laminated glass tubing 102 in a generally vertical orientation (i.e., in the +/−Z direction of the coordinate axis of FIG. 6A) with the working end 150 of the laminated glass tubing 102 oriented vertically downward in the −Z direction. Although described in this specification in the context of a vertically oriented converter, it should be understood that the holder 130 may position the laminated glass tubing 102 horizontally or at an angle. In some embodiments, the holder 130 may position the laminated glass tubing 102 relative to the re-cladding station 300. The holder 130 may be rotatable relative to the re-cladding station 300 about holder axis D, which may be coexistent with the centerline $C_L$ (FIGS. 1A-1C) of the laminated glass tubing 102. Each of the holders 130 may be operatively coupled to a motor (not shown), continuous drive belt, or other drive mechanism for rotation of each of the holders 130 relative to the re-cladding station 300. Rotation of the holders 130 allows for rotation of the laminated glass tubing 102 relative to heating elements, forming tools, cooling nozzles, or other features of the re-cladding station 300 and/or the converter. In some embodiments, the holder 130 may be translated into and out of the re-cladding station 300, such as by a converter that transports the holder 130 and the laminated glass tubing 102 through a plurality of processing stations.

Figure 7A:
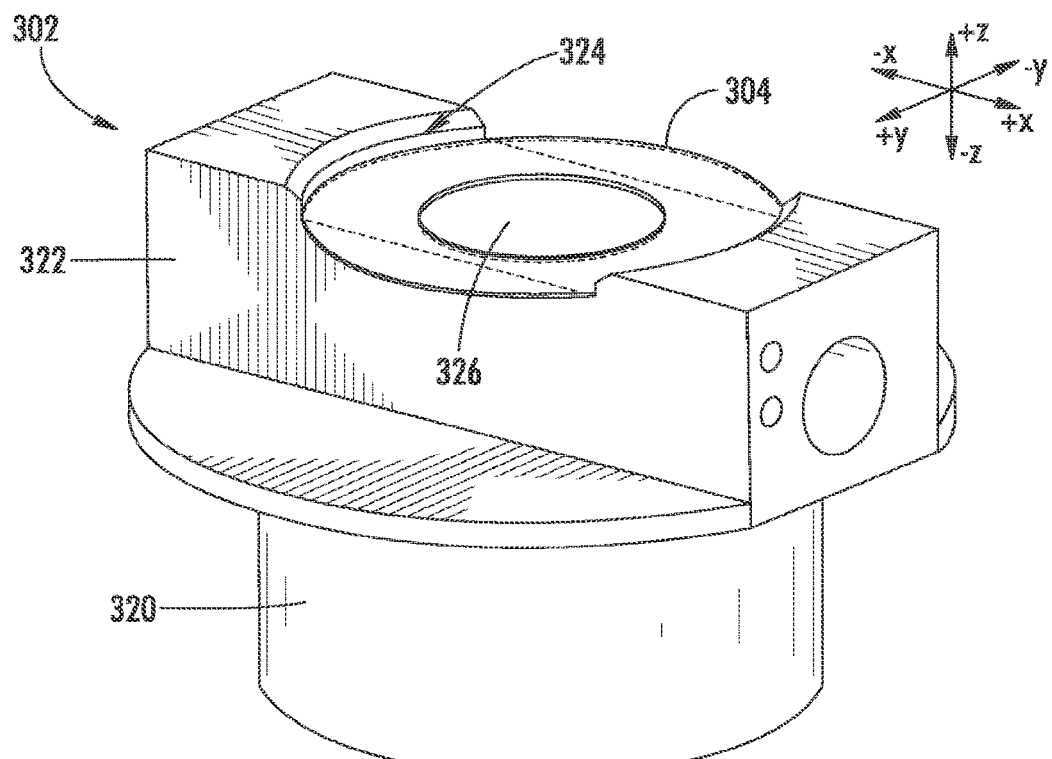
FIG. 7A schematically depicts a perspective view of a glass sheet holder of the cladding station of FIG. 6A, according to one or more embodiments shown and described herein.
Figure 7B:
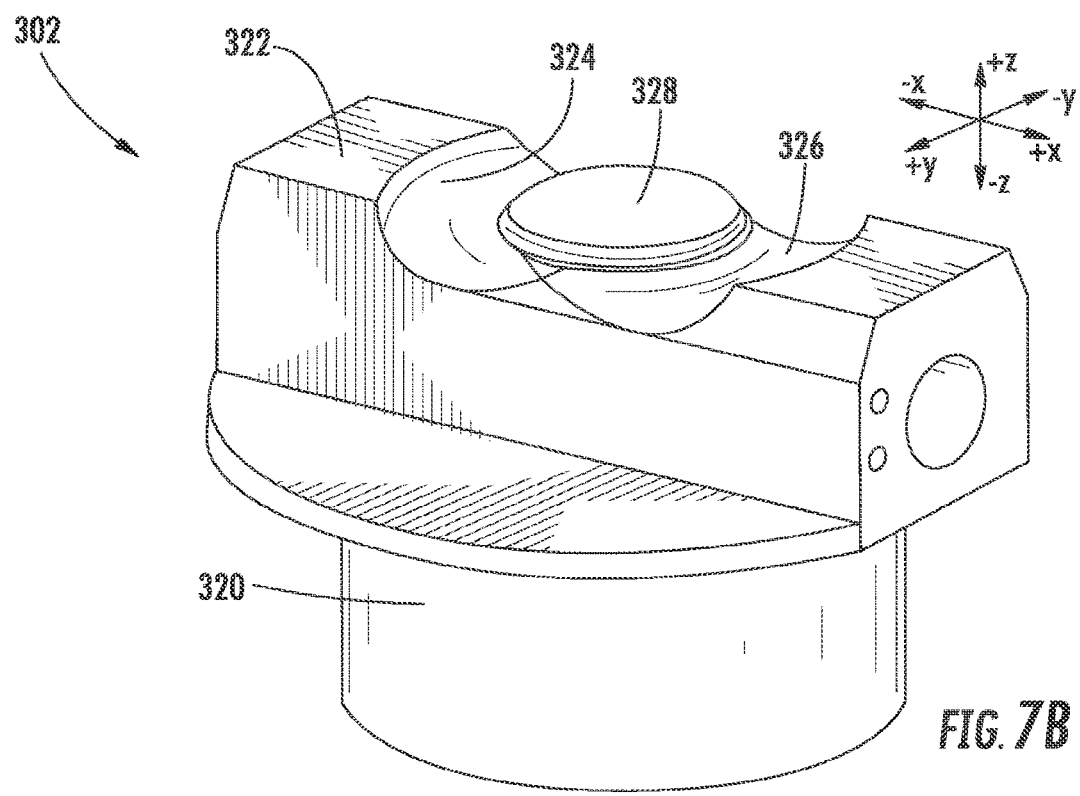
FIG. 7B schematically depicts a perspective view of another embodiment of a glass sheet holder of the cladding station of FIG. 6A, according to one or more embodiments shown and described herein.

As shown in FIG. 6A, the re-cladding station 300 may also include a glass sheet holder 302 configured to receive and hold the glass sheet 304. Referring to FIGS. 7A and 7B, the glass sheet holder 302 may include a cradle 322 having a shape at least partially conforming to a shape of the glass sheet 304. The cradle 322 may include an inner surface 324 and a bottom surface 326. The inner surface 324 and the bottom surface 326 may cooperate to define a cavity shaped to receive the glass sheet 304. The inner surface 324 may have a contour shaped to conform to an outer shape of the glass sheet 304. Referring to FIG. 7A, in some embodiments, the bottom surface 326 may be a flat surface. Referring to FIG. 7B, in other embodiments, the bottom surface 326 may be a curved surface, such as a concave surface, for example. The bottom surface 326 that is concave, such as the bottom surface 326 in FIG. 7B, may enable the glass sheet 304 to be formed around the rounded working end 150 of the laminated glass tubing 102 during re-cladding of the exposed portion 126 of the core layer 120. Referring to FIG. 7B, in some embodiments, the cradle 322 may include a central positioner 328 configured to extend through a central opening of the glass sheet 304 when the glass sheet 304 is seated in the cavity of the cradle 322.

Referring still to FIGS. 7A and 7B, the glass sheet holder 302 may include a holder base 320, and the cradle 322 may be coupled to the holder base 320. In some embodiments, the holder base 320 may be operatively coupled to the actuator 308 operable to translate the glass sheet holder 302 vertically (i.e., in the +/−Z direction of the coordinate axis in FIG. 7A) relative to the holder 130. In other embodiments, the holder base 320 may be fixedly coupled to the base of the converter.

Referring again to FIG. 6A, when the holder 130 positions the laminated glass tubing 102 in the re-cladding station 300, the glass sheet holder 302 may be positioned vertically below (i.e., in the −Z direction of the coordinate axis of FIG. 6A) the working end 150 of the laminated glass tubing 102. In some embodiments, the glass sheet holder 302 may be positioned directly vertically below the working end 150 of the laminated glass tubing 102 when the holder 130 positions the laminated glass tubing 102 in the re-cladding station 300. In some embodiments, the glass sheet holder 302 may be positioned so that the glass sheet 304 received in the cradle 322 is vertically aligned (i.e., in the +/−Z direction of the coordinate axis of FIG. 6A) with the axial surface 148 of the laminated glass tubing 102. When the glass sheet 304 is vertically aligned with the axial surface 148 of the laminated glass tubing 102, the glass sheet 304 may completely cover the exposed portion 126 of the core layer 120 at the axial surface 148 of the laminated glass tubing 102.

Referring again to FIGS. 6A-6C, the re-cladding station 300 may include an actuator 308 operatively coupled to the glass sheet holder 302 or the holder 130 for vertical translation (i.e., translation in the +/−Z direction of the coordinate axis of FIG. 6B) of the glass sheet holder 302 or the holder 130. In some embodiments, the actuator 308 may be operatively coupled to the glass sheet holder 302 and may be operative to vertically translate the glass sheet holder 302 relative to the holder 130, which is maintained at a fixed vertical position (i.e., fixed in the +/−Z direction). Alternatively, in other embodiments, the actuator 308 may be operatively coupled to the holder 130 and may be operative to vertically translate the holder 130 relative to the glass sheet holder 302, which is maintained at a fixed vertical position (i.e., the +/−Z direction). The actuator 308 may include, but is not limited to, one or more pneumatic actuators, electric actuators, hydraulic actuators, magnetic actuators, servo motors, gear systems, or other actuators. In some embodiments, the actuator 308 may include a positioning stage coupled to the glass sheet holder 302 or the holder 130 and a servo motor operable to move the glass sheet holder 302 or the holder 130 along the positioning stage. In some embodiments, both the holder 130 and the glass sheet holder 302 may be operatively coupled to actuators so that the holder 130 may be translated vertically downward (i.e., −Z direction) towards the glass sheet holder 302 while simultaneously translating the glass sheet holder 302 vertically upward (i.e., in the +Z direction) towards the holder 130.

In some embodiments, the re-cladding station 300 may include a glass sheet feeder (not shown) configured to deliver a glass sheet 304 to the cradle 322 for each laminated glass tubing 102 introduced to the re-cladding station 300. In some embodiments, each glass sheet 304 may be manually supplied to the cradle 322 by an operator.

Referring still to FIG. 6A, the re-cladding station 300 may optionally include a preheater 306 positioned to deliver heat to the axial surface 148 of the laminated glass tubing 102. The preheater 306 may be positioned proximate the working end 150 of the laminated glass tubing 102. In some embodiments, the preheater 306 may be operable to deliver sufficient heat to the working end 150 of the laminated glass tubing 102 to reduce the viscosity of the glass at the axial surface 148 of the laminated glass tubing 102 to a viscosity less than or equal to 100 kilopoise (kP). In other embodiments, the preheater 306 may be operable to reduce the viscosity of the glass at the axial surface 148 of the laminated glass tubing 102 to a viscosity less than or equal to 75 kP, less than or equal to 50 kP, less than or equal to 25 kP, or even less than or equal to 10 kP. The preheater 306 may include a gas torch (i.e., flame burner), a laser, a radiant heater, or other heat source capable of heating the glass at the axial surface 148 of the laminated glass tubing 102 to a temperature at which the viscosity of the glass is less than or equal to 100 kP. In some embodiments, the preheater 306 may be a gas torch.

Figure 6C:
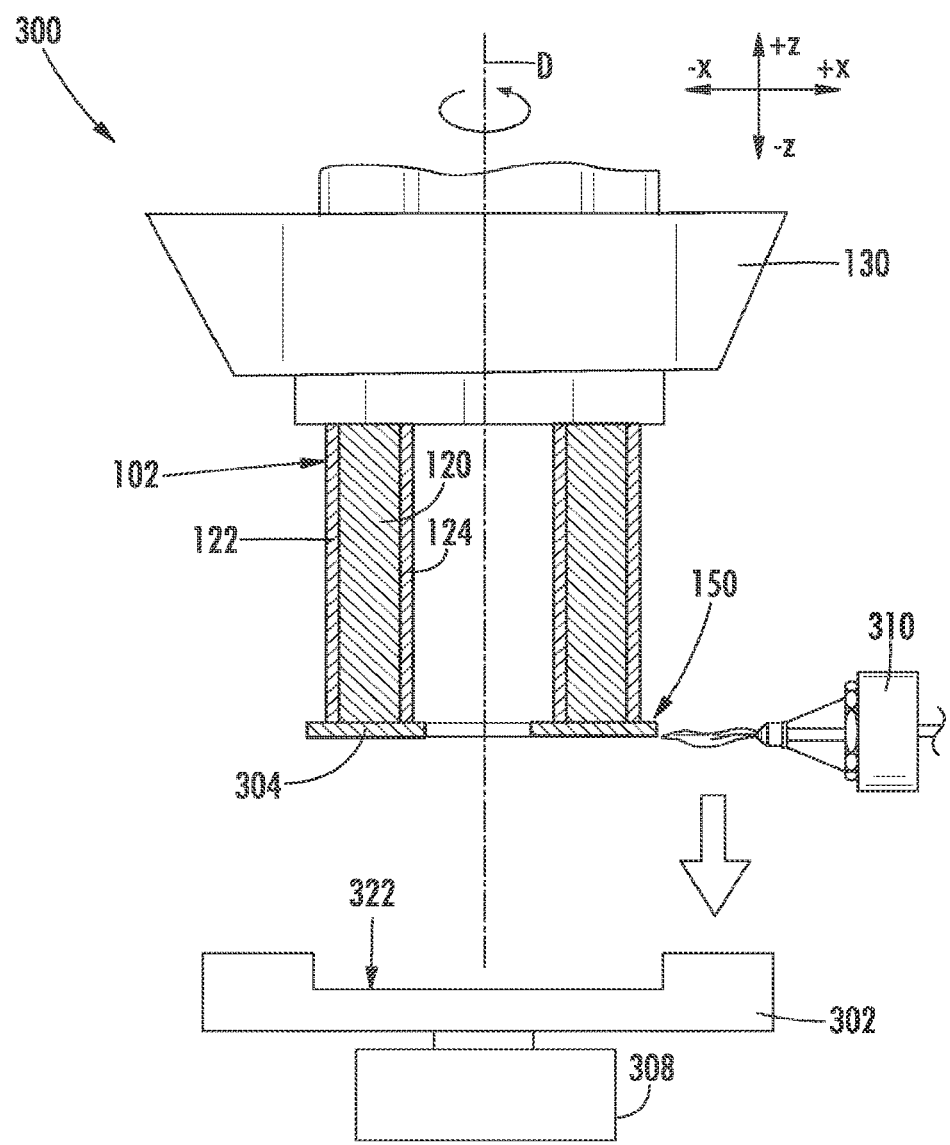
FIG. 6C schematically depicts the re-cladding station of FIG. 6A in which the glass sheet holder is disengaged from the working end of the laminated glass tubing, according to one or more embodiments shown and described herein.

Referring not to FIG. 6C, in some embodiments, the re-cladding station 300 may optionally include a finish heater 310. The finish heater 310 may be positioned proximate to the working end 150 of the laminated glass tubing 102. The finish heater 310 may be operable to melt the glass sheet 304 to the outer clad layer 122 and the inner clad layer 124 of the laminated glass tubing 102. The finish heater 310 may include a gas torch (i.e., flame burner), a laser, a radiant heat source, or other heat source capable of heating the glass at the axial surface 148 of the laminated glass tubing 102 to a temperature at which the glass sheet 304, the outer clad layer 122, and the inner clad layer 124 melt together. In some embodiments, the finish heater 310 may be a gas torch, such as a fire-polishing torch, operable to flame polish the working end 150 of the laminated glass tubing 102 after the glass sheet 304 is coupled to the axial surface 148 of the laminated glass tubing 102. Alternatively, in other embodiments, the finish heater 310 may be a laser heater operable to laser finish the working end 150 of the laminated glass tubing 102 after the glass sheet 304 is coupled to the axial surface 148 of the laminated glass tubing 102. In yet other embodiments, the glass sheet holder 302 may itself be heated which, in turn, causes the glass sheet 304, the outer clad layer 122, and the inner clad layer 124 melt together. In these embodiments, the glass sheet holder may be heated by a burner, inductively heated, or the like.

Referring to FIG. 6A, in operation of the re-cladding station 300, the working end 150 of the laminated glass tubing 102, in particular the axial surface 148 of the laminated glass tubing 102, may be preheated to a temperature sufficient to reduce the viscosity of the glass at the axial surface 148 of the laminated glass tubing 102 to enable the glass sheet 304 to adhere to the axial surface 148 of the laminated glass tubing 102. In some embodiments, the working end 150 of the laminated glass tubing 102 may be preheated in a processing station immediately before the re-cladding station 300. For example, in some embodiments, the re-cladding station 300 may be immediately preceded by a heating station operable to heat the working end 150 of the laminated glass tubing 102. In other examples, the re-cladding station 300 may be positioned immediately after a thermal separation station or a flame piercing station, and heating of the working end 150 of the laminated glass tubing 102 during thermal separation or piercing may be sufficient to reduce the viscosity of glass at the working end 150 of the laminated glass tubing 102.

Alternatively, in other embodiments, the working end 150 of the laminated glass tubing 102 may be preheated in the re-cladding station 300, such as by positioning the preheater 306 proximate to the working end 150 of the laminated glass tubing 102 and rotating the laminated glass tubing 102. The glass at the working end 150 of the laminated glass tubing 102 may be preheated to a temperature sufficient to reduce the viscosity to less than or equal to 100 kP, such as less than or equal to 75 kP, less than or equal to 50 kP, less than or equal to 25 kP, or less than or equal to 10 kP. For example, in some embodiments, the glass at the working end 150 of the laminated glass tubing 102 may be preheated to a temperature at or above which the viscosity of the glass is from 1 kP to 100 kP, from 1 kP to 75 kP, from 1 kP to 50 kP, from 1 kP to 25 kP, from 1 kP to 10 kP, from 5 kP to 100 kP, from 5 kP to 75 kP, from 5 kP to 50 kP, from 5 kP to 25 kP, from 5 kP to 10 kP, or from 10 kP to 100 kP.

Referring still to FIG. 6A, a glass sheet 304 may be placed in the cradle 322 of the glass sheet holder 302. In some embodiments, the glass sheet 304 may be manually placed in the cradle 322 of the glass sheet holder 302. Alternatively, in other embodiments, the glass sheet 304 may be automatically placed in the cradle 322 of the glass sheet holder 302 by a feed mechanism. The laminated glass tubing 102 may be translated into the re-cladding station 300 by the holder 130, thereby positioning the laminated glass tubing 102 in the re-cladding station 300. In some embodiments, the laminated glass tubing 102 may be translated into the re-cladding station 300 after preheating the working end 150 of the laminated glass tubing 102. Alternatively, in other embodiments, the laminated glass tubing 102 may be translated into the re-cladding station 300 before preheating the working end 150 of the laminated glass tubing 102.

Referring to FIG. 6B, once the laminated glass tubing 102 has been translated into the re-cladding station 300 and the axial surface 148 has been preheated to reduce the viscosity of the glass at the axial surface 148 of the laminated glass tubing 102, the upper surface 312 of the glass sheet 304 may be contacted with the axial surface 148 of the laminated glass tubing 102. In some embodiments, the upper surface 312 of the glass sheet 304 may be contacted with the axial surface 148 of the laminated glass tubing 102 by translating the glass sheet holder 302 vertically upward (i.e., in the +Z direction of the coordinate axis of FIG. 6B) until the upper surface 312 of the glass sheet 304 contacts the axial surface 148 of the laminated glass tubing 102. In these embodiments, the holder 130 and laminated glass tubing 102 may be maintained at a fixed vertical position. Alternatively in other embodiments, the holder 130 may be translated vertically downward (i.e., −Z direction of the coordinate axis of FIG. 6B) towards the glass sheet holder 302, while the glass sheet holder 302 is maintained at a fixed vertical position. In still other embodiments, the glass sheet holder 302 may be translated vertically upward, and the holder 130 may be translated vertically downward such that the glass sheet holder 302 and the laminated glass tubing 102 are both translated towards each other.

In some embodiments, the upper surface 312 of the glass sheet 304 and the axial surface 148 of the laminated glass tubing 102 may be contacted under compression. Contacting the upper surface 312 of the glass sheet 304 and the axial surface 148 of the laminated glass tubing 102 under compression may ensure intimate and full contact between the upper surface 312 of the glass sheet 304 and the axial surface 148 of the laminated glass tubing 102. The compression is related to the position of the glass sheet holder 302 relative to the position of the holder 130. As used herein, the term "zero position" of the glass sheet holder 302 relative to the holder 130 refers to the position of the glass sheet holder 302 relative to the holder 130 at which the upper surface 312 of the glass sheet 304 first contacts the axial surface 148 of the laminated glass tubing 102. Moving the glass sheet holder 302 and the holder 130 closer together relative to the zero position increases the compression force exerted on the upper surface 312 of the glass sheet 304 and the axial surface 148 of the laminated glass tubing 102. As used in this disclosure, the term "compression" of the glass sheet 304 and the laminated glass tubing 102 refers to the distance between the glass sheet holder 302 and the holder 130 at the zero position minus the distance between the glass sheet holder 302 and the holder 130 at the final position of the glass sheet holder 302 relative to the holder 130. In some embodiments, the compression of the glass sheet 304 and the laminated glass tubing 102 may be from 50 μm to 500 μm, such as from 50 μm to 400 μm, from 50 μm to 300 μm, from 50 μm to 200 μm, from 50 μm to 100 μm, from 100 μm to 500 μm, from 100 μm to 400 μm, from 100 μm to 300 μm, or from 100 μm to 200 μm.

Contact of the upper surface 312 of the glass sheet 304 with the axial surface 148 of the laminated glass tubing 102, which has been preheated, causes heat to be directly transferred from the axial surface 148 of the laminated glass tubing 102 to the upper surface 312 of the glass sheet 304. The heat transfer from the axial surface 148 of the laminated glass tubing 102 may cause the temperature of the upper surface 312 of the glass sheet 304 to increase, thereby reducing the viscosity of the glass composition at the upper surface 312 of the glass sheet 304. The heat transfer from the axial surface 148 of the laminated glass tubing 102 may be sufficient to reduce the viscosity of the glass at the upper surface 312 of the glass sheet 304 to less than or equal to 100 kP, such as less than or equal to 75 kP, less than or equal to 50 kP, less than or equal to 25 kP, or even less than or equal to 10 kP. Reducing the viscosity of the glass at the upper surface 312 of the glass sheet 304 enables the upper surface 312 of the glass sheet 304 to initially adhere (i.e., "stick") to the axial surface 148 of the laminated glass tubing 102. Further heat transfer from the axial surface 148 of the laminated glass tubing 102 to the glass sheet 304 may increase the adhesion of the upper surface 312 of the glass sheet 304 to the axial surface 148 of the laminated glass tubing 102 and eventually integrate the glass sheet 304 into the working end 150 of the laminated glass tubing 102 to fully clad the axial surface 148 of the laminated glass tubing 102.

In some embodiments, the upper surface 312 of the glass sheet 304 may be preheated to reduce the viscosity of the glass at the upper surface 312 of the glass sheet 304 prior to contact with the axial surface 148 of the laminated glass tubing 102. The upper surface 312 of the glass sheet 304 may be preheated by any external preheater. For example, the upper surface 312 of the glass sheet 304 may be preheated by a gas torch (i.e., flame burner), laser, radiant heater, or other heat source capable of heating the upper surface 312 of the glass sheet 304 to reduce viscosity of the glass. In some embodiments, the upper surface 312 of the glass sheet 304 may be preheated to reduce the viscosity of the glass at the upper surface 312 of the glass sheet 304 to less than or equal to 100 kP, such as less than or equal to 75 kP, less than or equal to 50 kP, less than or equal to 25 kP, or even less than or equal to 10 kP. In some embodiments, the upper surface 312 of the glass sheet 304 may be preheated to reduce the viscosity of the glass at the upper surface 312 of the glass sheet 304 to from 1 kP to 100 kP, from 1 kP to 75 kP, from 1 kP to 50 kP, from 1 kP to 25 kP, from 1 kP to 10 kP, from 5 kP to 100 kP, from 5 kP to 75 kP, from 5 kP to 50 kP, from 5 kP to 25 kP, from 5 kP to 10 kP, or from 10 kP to 100 kP.

In some embodiments, the bottom surface 326 of the glass sheet holder 302 may be contoured (e.g., such as being concave). Upon contact of the glass sheet 304 with the axial surface 148 of the laminated glass tubing 102, the heat transfer from the axial surface 148 of the laminated glass tubing 102 to the glass sheet 304 may reduce the viscosity of the glass of the glass sheet 304, which may causes the glass sheet 304 to soften and become pliable. As the glass sheet 304 is maintained in contact with the axial surface 148 of the laminated glass tubing 102 by the glass sheet holder 302, the contour of the bottom surface 326 of the glass sheet holder 302 may cause portions of the glass sheet 304 to deform around the working end 150 of the laminated glass tubing 102 to completely cover the working end 150 of the laminated glass tubing 102.

Referring now to FIG. 6C, once the glass sheet 304 adheres to the axial surface 148 of the laminated glass tubing 102, the glass sheet holder 302, the holder 130, or both may be translated out of engagement, leaving the glass sheet 304 coupled to the axial surface 148 of the laminated glass tubing 102. The working end 150 of the laminated glass tubing 102 may then be thermally polished to fully melt the glass sheet 304 to the working end 150 of the laminated glass tubing 102. Thermal polishing may include subjecting the glass sheet 304 and working end 150 of the laminated glass tubing 102 to a gas torch or other heating device. In some embodiments, the re-cladding station 300 may include a finish heater 310 operable to thermally polish the working end 150 of the laminated glass tubing 102 in the re-cladding station 300. Alternatively, in other embodiments, the laminated glass tubing 102 may be translated by the holder 130 to a downstream heating station operable to thermally polish the working end 150 of the laminated glass tubing 102.

After thermal polishing, the laminated glass tubing 102 may undergo subsequent converting operations including one or more heating steps and one or more reforming operations to produce the final shape and dimensions of the glass article 103. During processing of the laminated glass tubing 102 downstream of the re-cladding station 300, the cladding provided by the glass sheet 304 coupled to the axial surface 148 of the laminated glass tubing 102 is maintained so that the finished glass article 103 is free of any exposed portion 126 of the core layer 120.

Figure 8:
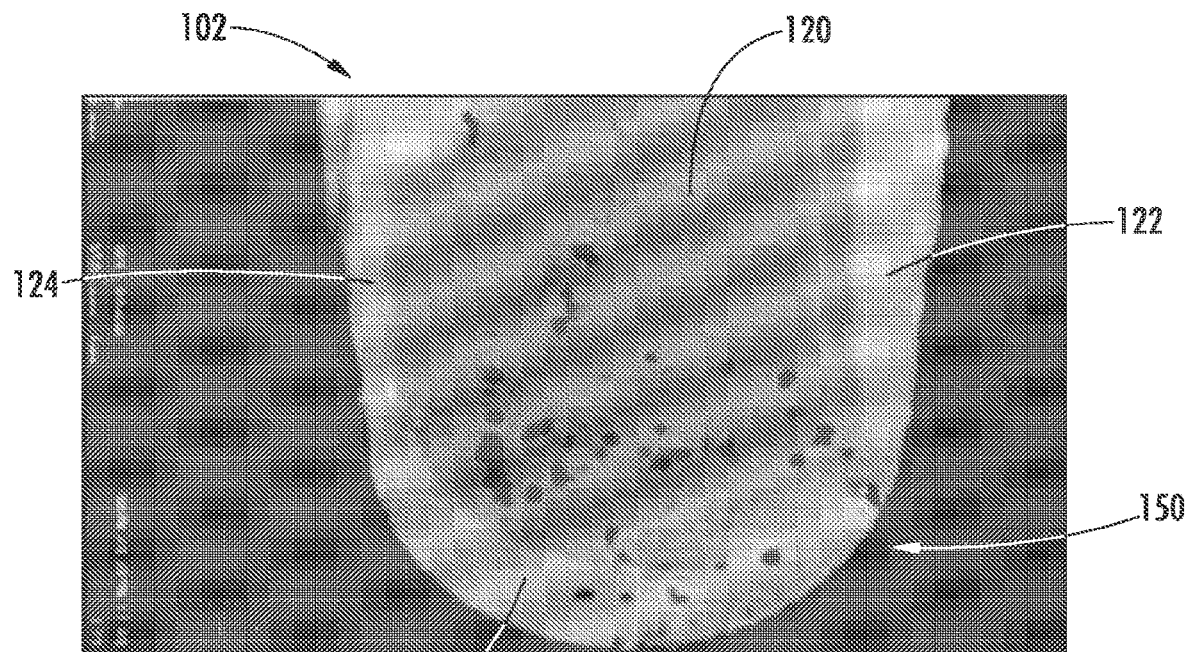
FIG. 8 is a photograph of a working end of a laminated glass tube for which an exposed portion of the core layer has been clad with a glass sheet having a glass composition the same as an inner clad layer and an outer clad layer of the laminated glass tube, according to one or more embodiments shown and described herein.
Figure 9:
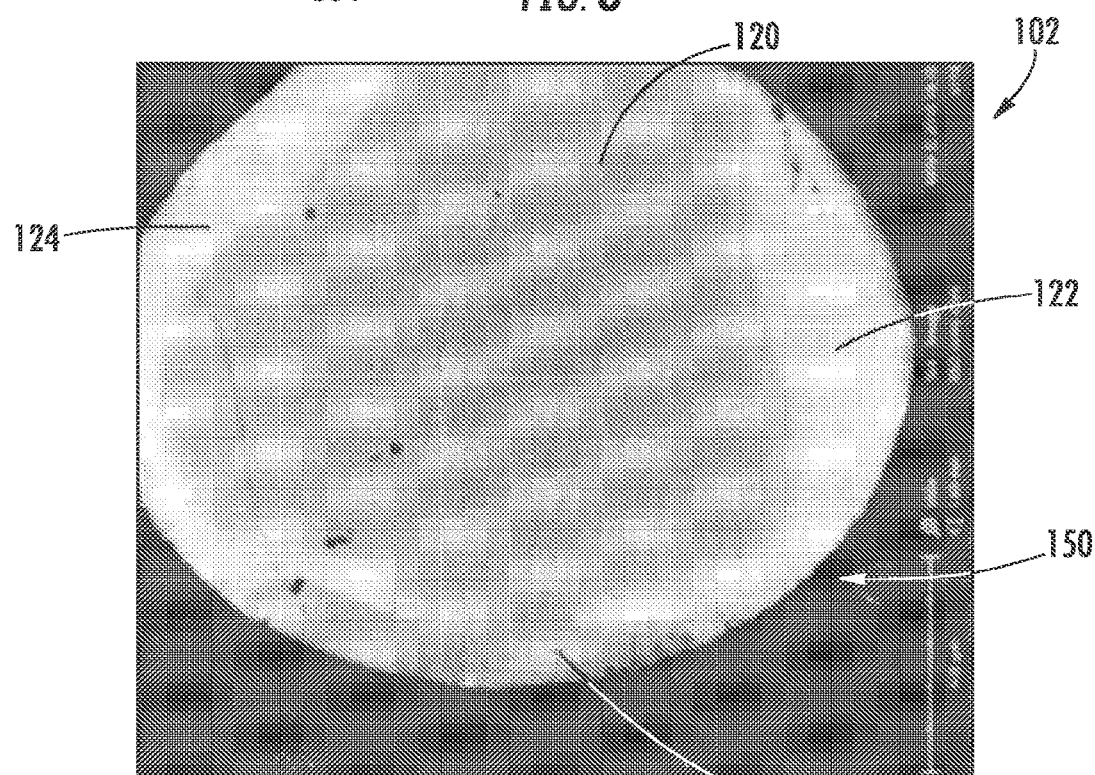
FIG. 9 is a photograph of a working end of a laminated glass tube for which an exposed portion of the core layer has been clad with a glass sheet having a glass composition different than an inner clad layer and an outer clad layer of the laminated glass tube, according to one or more embodiments shown and described herein.

Referring now to FIG. 8, a photograph of the working end 150 of the laminated glass tubing 102 after re-cladding the axial surface 148 of the laminated glass tubing 102 with the glass sheet 304 is shown. For the laminated glass tubing 102 depicted in FIG. 8, the glass sheet 304 included a re-clad glass composition that was the same as the inner layer glass composition of the inner clad layer 124 and the outer layer glass composition of the outer clad layer 122. As shown in FIG. 8, the outer clad layer 122, the inner clad layer 124, and the glass sheet 304 may cooperate to produce a continuous clad layer completely surrounding and enclosing the core layer 120. The outer clad layer 122, inner clad layer 124, and glass sheet 304 may cooperate to form a continuous compression layer surrounding and enclosing the core layer 120. Referring now to FIG. 9, a photograph of the working end 150 of another laminated glass tubing 102 after re-cladding the axial surface 148 of the laminated glass tubing 102 with the glass sheet 304 is shown. For the laminated glass tubing 102 depicted in FIG. 9, the glass sheet 304 included a re-clad glass composition that was different than the inner layer glass composition of the inner clad layer 124, the outer layer glass composition of the outer clad layer 122, and the core glass composition of the core layer 120. As shown in FIG. 9, the outer clad layer 122, the inner clad layer 124, and the glass sheet 304 cooperate to produce a continuous clad layer completely surrounding and enclosing the core layer 120, despite the differences in glass compositions.

As an alternative to coupling a sheet or piece of glass to the axial surface 148 of the laminated glass tubing 102, the re-cladding station may be operable to move glass from the outer clad layer 122 and/or the inner clad layer 124 to cover the exposed portion 126 of the core layer 120. For example, in some embodiments, the re-cladding station may include one or a plurality of forming tools operable to deform molten glass from the outer clad layer 122 and/or the inner clad layer 124 to cover the exposed portion 126 of the core layer 120. Alternatively, in other embodiments, the re-cladding station may include trimming tools to "trim" a piece of glass from the working end 150 of the laminated glass tubing 102. During the process of trimming, the outer clad layer 122 and the inner clad layer 124 of the laminated glass tubing 102 are brought into contact with each other by the trimming tools in the region of the laminated glass tubing 102 at which the piece of glass is separated from working end 150 of the laminated glass tubing 102. Thus, in a trimming process, the exposed portion 126 of the core layer 120 is removed by removing the piece of glass with the exposed portion 126 from the working end 150 of the laminated glass tubing 102 and deforming glass from the outer clad layer 122 and the inner clad layer 124 to cover the core layer 120 at the new working end of the laminated glass tubing 102.

Referring now to FIGS. 10A-10E, a re-cladding station in the form of trimming station 400 is depicted. In the trimming station 400 of FIGS. 10A-10E, the exposed portion 126 of the core layer 120 is eliminated by deforming the laminated glass tubing 102 in a manner that brings the outer clad layer 122 into contact with the inner clad layer 124 to form a continuous clad layer that completely surrounds and fully encloses the core layer 120. The trimming station 400 may include the holder 130, an inner trimming tool 402, an outer trimming tool 404, and optionally a preheater 406. The holder 130 was previously described in relation to the re-cladding station 300. The holder 130 may be operable to hold the laminated glass tubing 102 and rotate the laminated glass tubing 102 about holder axis D.

Figure 11A:
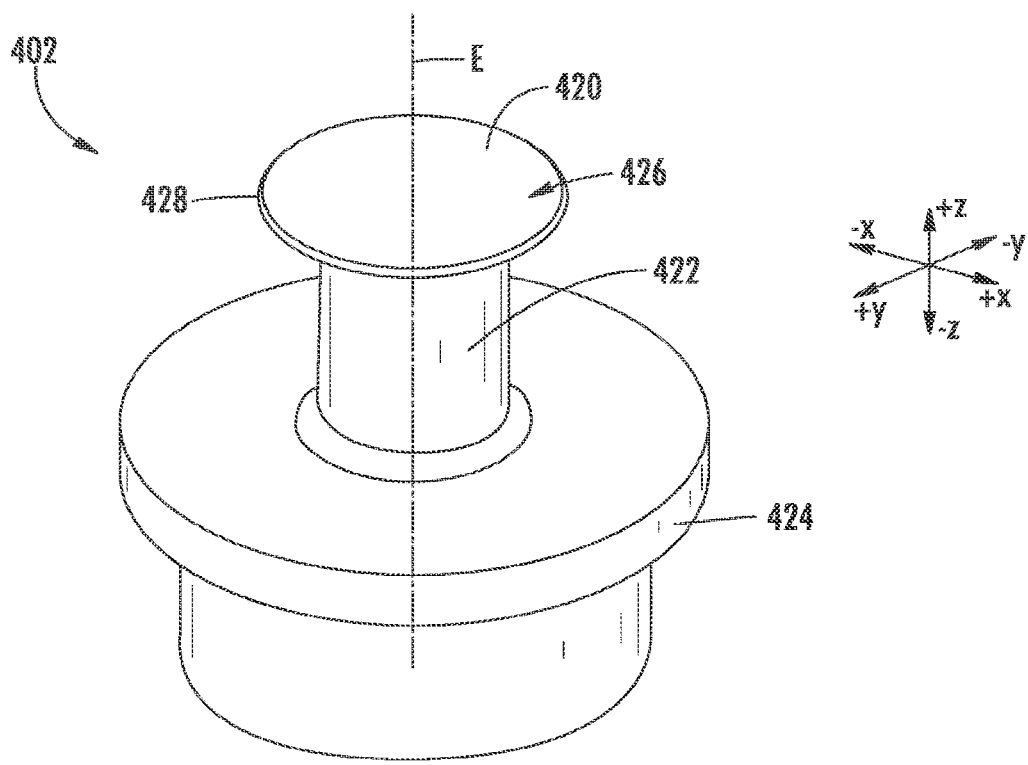
FIG. 11A schematically depicts a perspective view of an embodiment of the inner trimming tool of the trimming station of FIG. 10A, according to one or more embodiments shown and described herein.
Figure 11B:
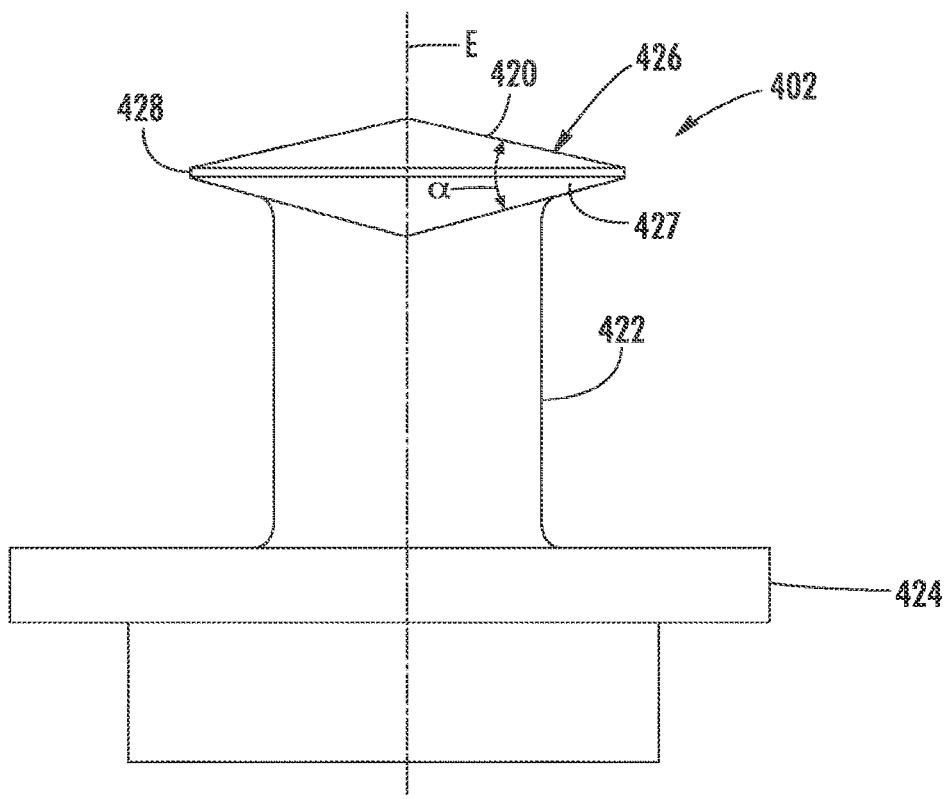
FIG. 11B schematically depicts a cross-sectional view of the inner trimming tool of FIG. 11A, according to one or more embodiments shown and described herein.

Referring to FIGS. 11A and 11B, the inner trimming tool 402 may include a tool head 420 coupled to a shaft 422. The shaft 422 may be coupled to an inner tool base 424. The tool head 420 may have any shape suitable for deforming the laminated glass tubing 102. In some embodiments, the tool head 420 may include an upper surface 426 and a lower surface 427, each of the upper surface 426 and the lower surface 427 extending outward from a center axis E of the inner trimming tool 402. The upper surface 426 and the lower surface 427 may converge at a contacting portion 428, which forms an outer periphery of the tool head 420. For example, in some embodiments, the upper surface 426 and the lower surface 427 may be conical in shape so that an axial distance between the upper surface 426 and the lower surface 427 decreases moving outward from the center axis E of the tool head 420. The upper surface 426 and the lower surface 427 may define an angle α therebetween. In some embodiments, the angle α between the upper surface 426 and the lower surface 427 may be modified to change the degree to which the tool head 420 manipulates and deforms the glass of the laminated glass tubing 102 during the trimming process. In some embodiments, the upper surface 426 and/or the lower surface 427 may have a constant slope. Alternatively, in other embodiments, the upper surface 426 and/or the lower surface 427 may be curved, such as having a concave or convex shape, such that the upper surface 426 and/or the lower surface 427 have a variable slope.

Referring to FIG. 11B, the contacting portion 428 may extend from the upper surface 426 to the lower surface 427 around the periphery of the tool head 420. In some embodiments, the contacting portion 428 may be a flat surface, which may be generally parallel to the center axis E of the inner trimming tool 402 or at a non-zero angle relative to the center axis E of the inner trimming tool 402. Alternatively, in other embodiments, the contacting portion 428 may be curved (e.g., convex) between the upper surface 426 and the lower surface 427. In still other embodiments, the upper surface 426 and the lower surface 427 may converge to an intersection such that the contacting portion 428 comprises a sharp edge at the intersection of the upper surface 426 and the lower surface 427. The tool head 420 may have any other shape suitable for deforming the interior surface 146 of the laminated glass tubing 102.

In some embodiments, the tool head 420 may be freely rotatable relative to the inner tool base 424. Free rotation of the tool head 420 relative to the inner tool base 424 may enable the tool head 420 to rotate with the laminated glass tubing 102 through contact of the contacting portion 428 with the interior surface 146 of the laminated glass tubing 102. In some embodiments, the inner trimming tool 402 may include a bearing or other mechanical system operable to enable the tool head 420 to freely rotate. Alternatively, in some embodiments, rotation of the tool head 420 may be driven at a rotational speed that may be the same or different than the rotational speed of the laminated glass tubing 102.

Referring again to FIGS. 10A-10E, in some embodiments, the inner trimming tool 402 may be vertically translatable (i.e., in the +/−Z direction of the coordinate axis in FIG. 10A) relative to the working end 150 of the laminated glass tubing 102. Vertical translation of the inner trimming tool 402 may enable the tool head 420 of the inner trimming tool 402 to be inserted into the internal volume of the laminated glass tubing 102 so that the contacting portion 428 may contact the interior surface 146 of the laminated glass tubing 102. When the holder 130 moves the laminated glass tubing 102 into the trimming station 400, the inner trimming tool 402 may be translated vertically upward (i.e., +Z direction) until the tool head 420 is positioned within the internal volume of the laminated glass tubing 102. When the tool head 420 is positioned within the laminated glass tubing 102, a vertical distance (i.e., a distance measured in the +/−Z direction) between the axial surface 148 of the laminated glass tubing 102 to the contacting portion 428 of the inner trimming tool 402 may be a distance from the axial surface 148 of the laminated glass tubing 102 at which the outer clad layer 122 and the inner clad layer 124 proximate to the contacting portion 428 includes sufficient glass to be deformed over the core layer 120 to form a continuous clad layer enclosing the core layer 120. In some embodiments, the vertical distance from the axial surface 148 of the laminated glass tubing 102 to the contacting portion 428 of the tool head 420 when the tool head 420 is inserted into the laminated glass tubing 102 may be from 1 millimeter (mm) to 10 mm, such as from 1 mm to 7 mm, from 1 mm to 5 mm, from 2 mm to 7 mm, from 2 mm to 5 mm, from 3 mm to 10 mm, from 3 mm to 7 mm, or from 3 mm to 5 mm.

After trimming is complete, the inner trimming tool 402 may be translated vertically downward (i.e., −Z direction) so that the holder 130 can move the laminated glass tubing 102 out of the trimming station 400. In some embodiments, the inner trimming tool 402 may include a vertical actuator 410 operable to translate the inner trimming tool 402 in the vertical direction. The vertical actuator 410 may be any type of actuator capable of translating the inner trimming tool 402 into and out of engagement with the laminated glass tubing 102. The vertical actuator 410 may include, but is not limited to, one or more pneumatic actuators, electric actuators, hydraulic actuators, magnetic actuators, servo motors, gear systems, or other actuators. In some embodiments, the vertical actuator 410 may include a positioning stage coupled to the inner trimming tool 402 and a servo motor operable to move the inner trimming tool 402 along the positioning stage. Alternatively, in some embodiments, the inner trimming tool 402 may be fixed vertically (i.e., +/−Z direction) and the holder 130 may be operable to translate the laminated glass tubing 102 vertically downward (i.e., in the −Z direction) to position the laminated glass tubing 102 over the inner trimming tool 402. In still other embodiments, both the holder 130 and the inner trimming tool 402 may be translatable in the vertical direction (i.e., in the +/−Z direction).

Figure 10A:
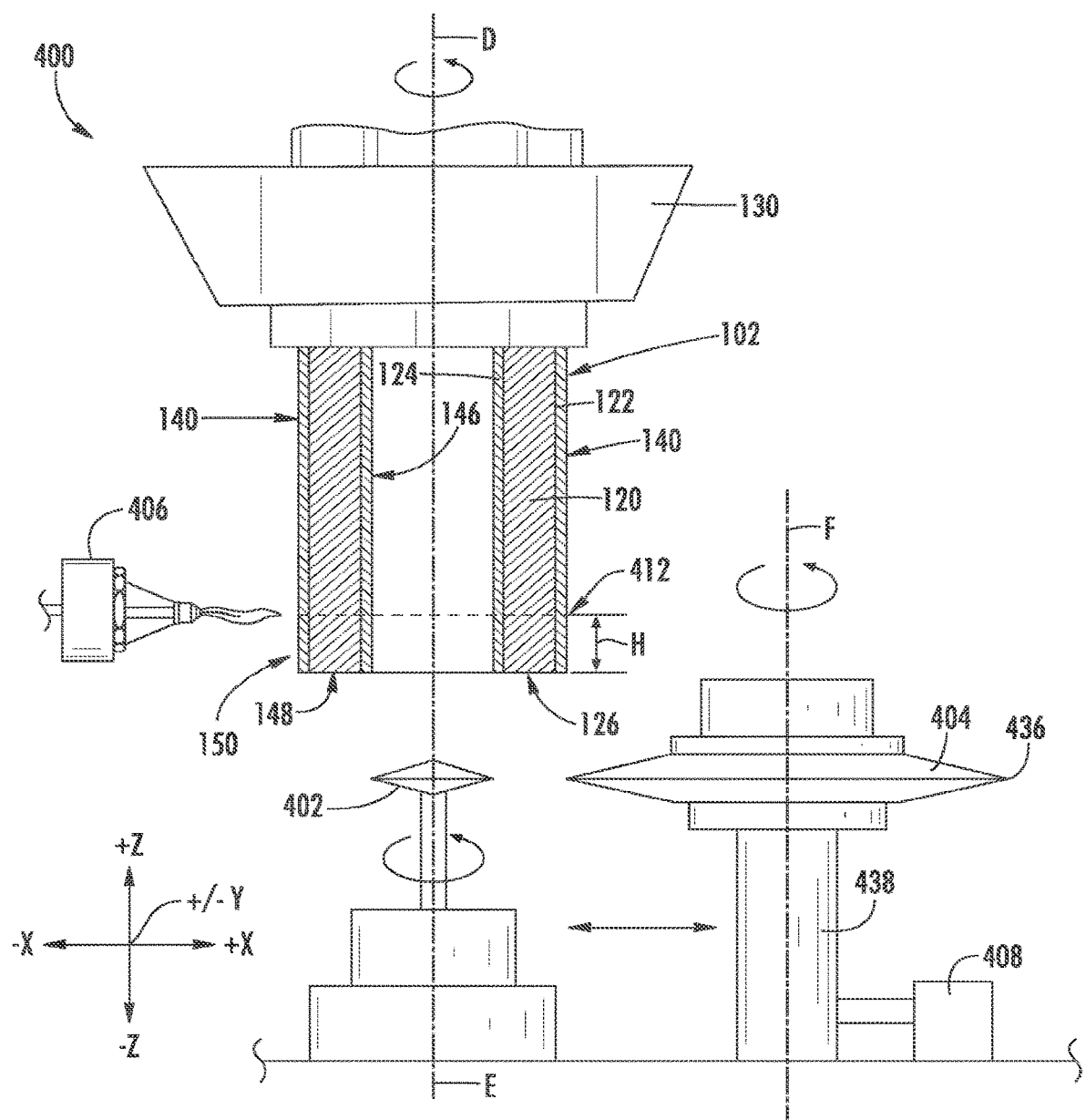
FIG. 10A schematically depicts a trimming station including an inner trimming tool and an outer trimming tool, according to one or more embodiments shown and described herein.

In some embodiments, the inner trimming tool 402 may be maintained in a fixed horizontal position (i.e., at a fixed position in the X/Y plane perpendicular to the +/−Z axis of the coordinate axis in FIG. 10A). Alternatively, the inner trimming tool 402 may be horizontally translatable relative to the laminated glass tubing 102. The inner trimming tool 402 may be horizontally translated relative to the holder 130 and laminated glass tubing 102 by another actuator (not shown), such as any of the actuators previously described for vertical translation of the inner trimming tool 402.

Figure 12A:
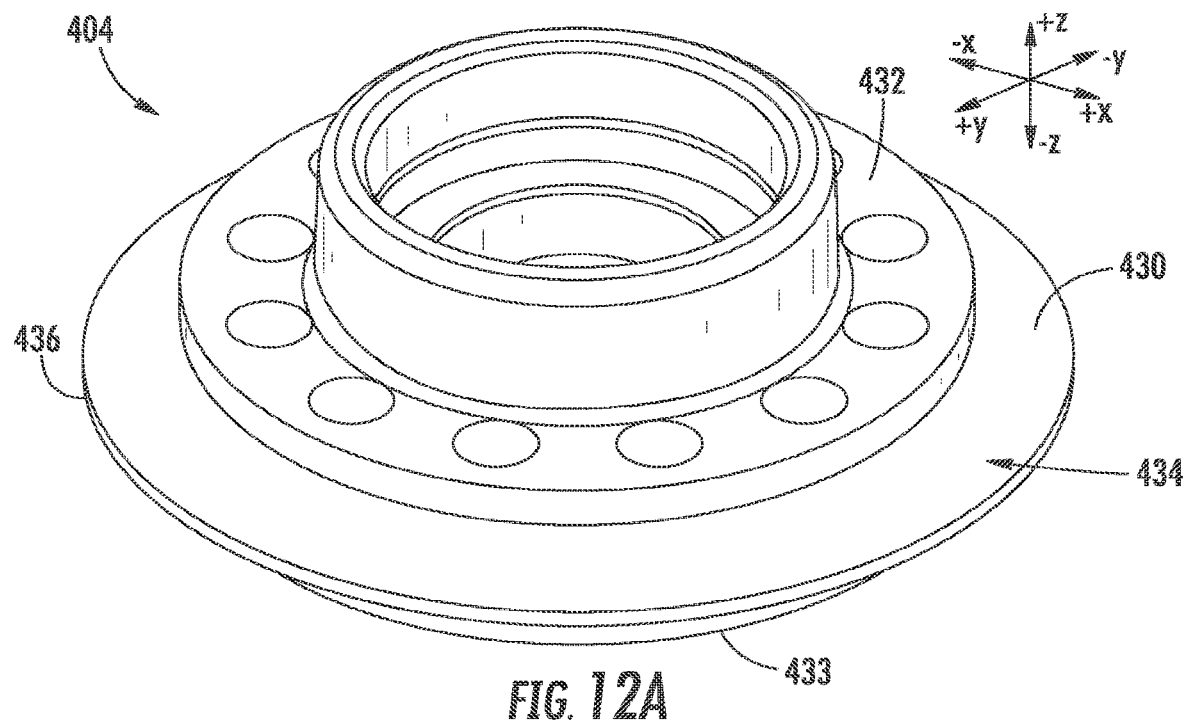
FIG. 12A schematically depicts a perspective view of an embodiment of the outer trimming tool of the trimming station of FIG. 10A, according to one or more embodiments shown and described herein.
Figure 12B:
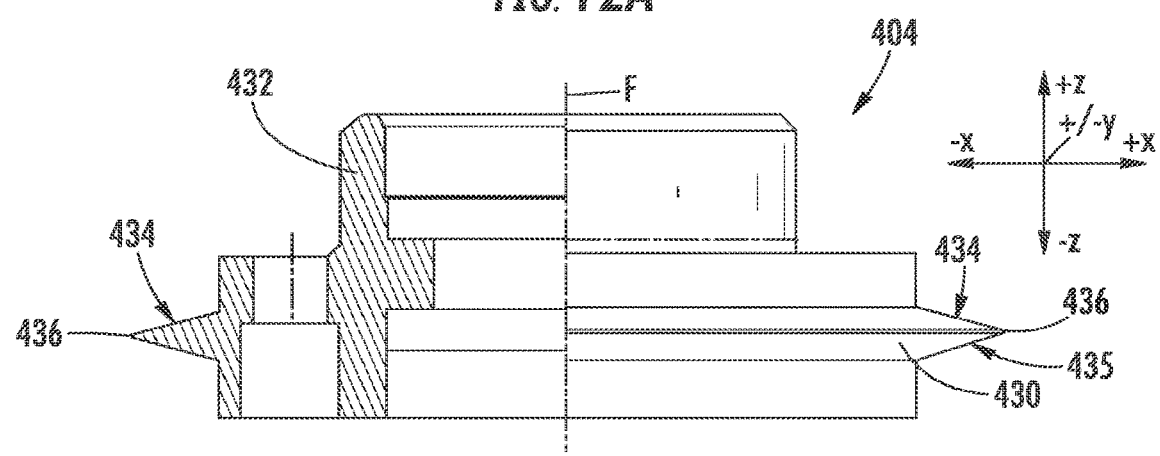
FIG. 12B schematically depicts a side view in partial cross-section of the outer trimming tool of FIG. 12A, according to one or more embodiments shown and described herein.
Figure 12C:
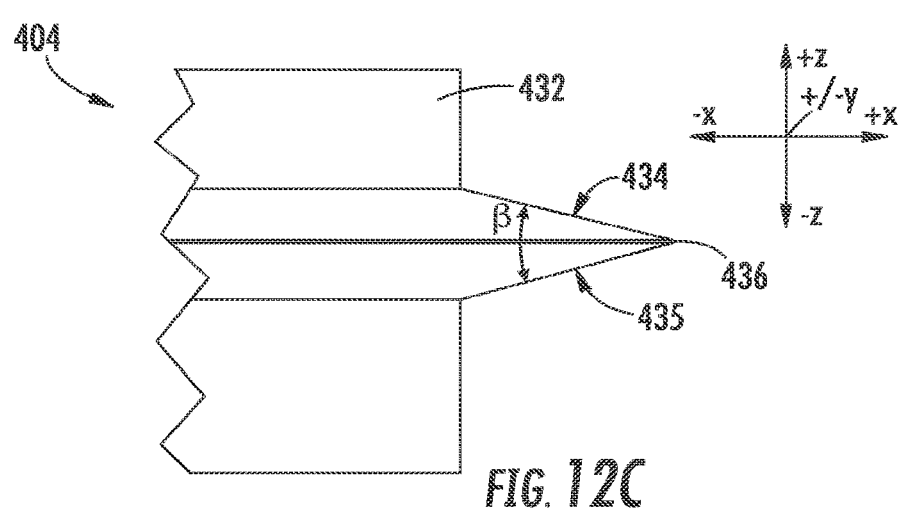
FIG. 12C schematically depicts a side view of a portion of a contacting ring of the outer trimming tool in FIG. 12A, according to one or more embodiments shown and described herein.

Referring now to FIGS. 12A-12C, the outer trimming tool 404 may have any shape suitable for deforming the laminated glass tubing 102. For example, in some embodiments, the outer trimming tool 404 may include a contacting ring 430, an upper flange 432, and a lower flange 433. The contacting ring 430 may be disposed between the upper flange 432 and the lower flange 433. The contacting ring 430 may include an upper surface 434 and a lower surface 435, each of the upper surface 434 and the lower surface 435 extending outward from the upper flange 432 and lower flange 433, respectively. The upper surface 434 and the lower surface 435 may converge at a contact surface 436 that forms an outer periphery of the outer trimming tool 404. For example, in some embodiments, the upper surface 434 and the lower surface 435 may be generally frustoconical in shape so that a distance between the upper surface 434 and the lower surface 435 decreases moving radially outward in a direction away from the center axis F of the outer trimming tool 404. Referring to FIG. 12C, the upper surface 434 and the lower surface 435 may define an angle β therebetween. In some embodiments, the angle β between the upper surface 434 and the lower surface 435 may be modified to change the degree to which the outer trimming tool 404 manipulates and deforms the glass of the laminated glass tubing 102 during the trimming process. In some embodiments, the upper surface 434 and/or the lower surface 435 may have a constant slope. Alternatively, in other embodiments, the upper surface 434 and/or the lower surface 435 may be curved, such as having a concave or convex shape, such that the upper surface 434 and/or the lower surface 435 have a variable slope.

Referring to FIG. 12B, the contact surface 436 may extend from the distal end of the upper surface 434 to the distal end of the lower surface 435 around the periphery of the contacting ring 430. In some embodiments, the contact surface 436 may be a flat surface, which may be generally parallel to the center axis F of the outer trimming tool 404 or at a non-zero angle relative to the center axis F of the outer trimming tool 404. Alternatively, in other embodiments, the contact surface 436 may be curved (e.g., convex) between the upper surface 434 and the lower surface 435. In still other embodiments, the upper surface 434 and the lower surface 435 may converge to an intersection such that the contact surface 436 comprises a sharp edge at the intersection of the upper surface 434 and the lower surface 435. The upper surface 434, the lower surface 435, and the contact surface 436 may cooperate to form any shape suitable for deforming the laminated glass tubing 102.

Referring again to FIGS. 10A-10E, in some embodiments, the outer trimming tool 404 may be coupled to an outer tool base 438. The outer trimming tool 404 may be rotatable relative to the outer tool base 438. In some embodiments, the outer trimming tool 404 may be freely rotatable relative to the base so that contact of the contact surface 436 of the outer trimming tool 404 with the exterior surface 140 of the laminated glass tubing 102 may cause the outer trimming tool 404 to rotate with the laminated glass tubing 102 at the rotational speed of the laminated glass tubing 102. In some embodiments, the outer trimming tool 404 or the outer tool base 438 may include a bearing or other mechanical system operable to enable the outer trimming tool 404 to freely rotate. Alternatively, in other embodiments, outer trimming tool 404 may be driven to rotate relative to the outer tool base 438.

Figure 10B:
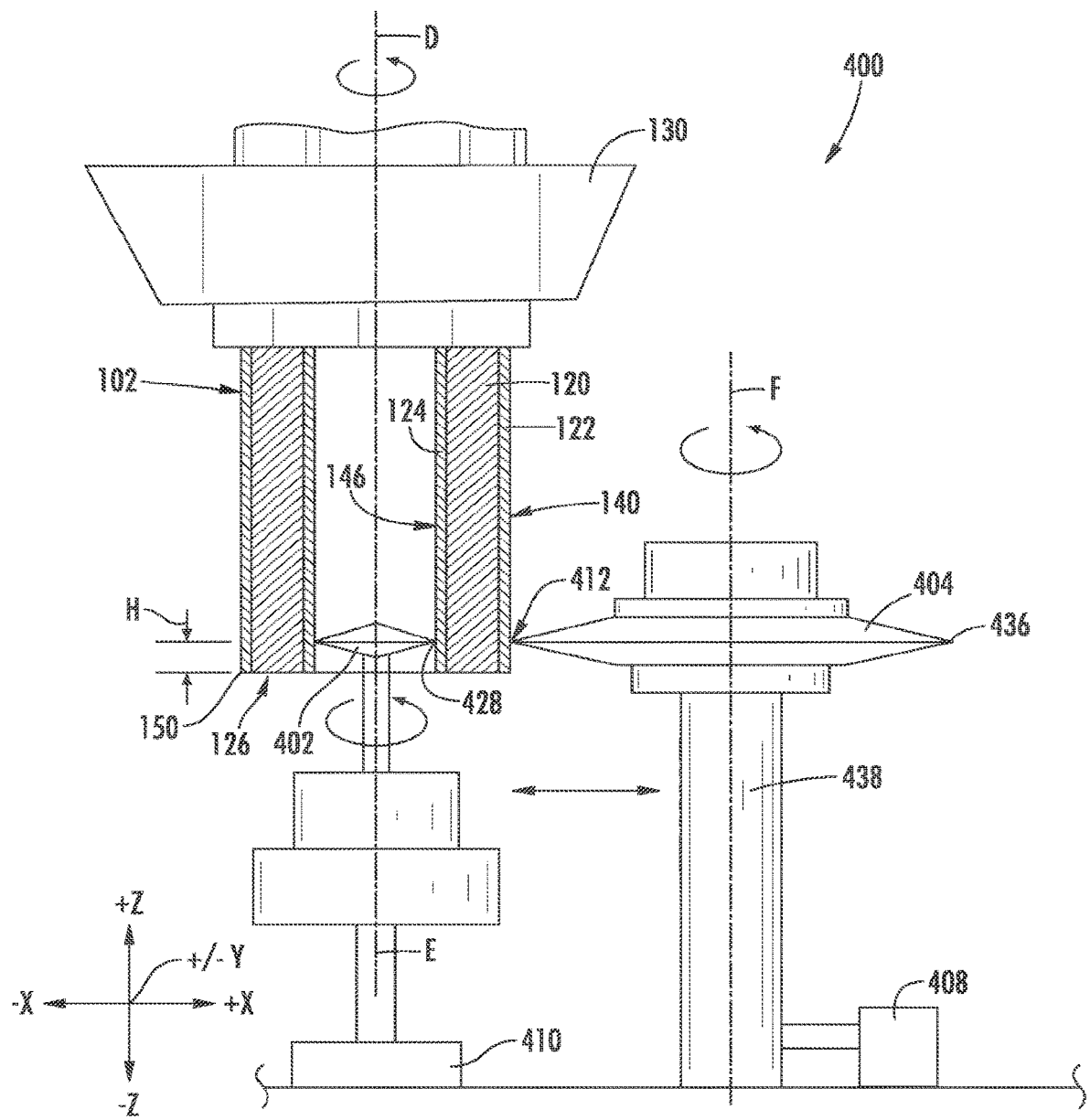
FIG. 10B schematically depicts the trimming station of FIG. 10A in which the inner trimming tool and the outer trimming tool are engaged with a working end of a laminated glass tube, according to one or more embodiments shown and described herein.

Referring to FIG. 10B, the outer trimming tool 404 and/or the outer tool base 438 may be operatively coupled to an outer tool actuator 408. The outer tool actuator 408 may be operable to translate the outer trimming tool 404 and/or the outer tool base 438 horizontally (i.e., in the X-Y plane of the coordinate axis in FIGS. 10A-10E) relative to the inner trimming tool 402, which may be stationary in the X-Y plane of the coordinate axis of FIGS. 10A-10E. For example, the outer tool actuator 408 may be operable to translate the outer trimming tool 404 radially towards and away from the inner trimming tool 402 to bring the outer trimming tool 404 into and out of engagement with the exterior surface 140 of the laminated glass tubing 102. The outer tool actuator 408 may be any type of actuator capable of translating the outer trimming tool 404 into and out of engagement with the exterior surface 140 of the laminated glass tubing 102. The outer tool actuator 408 may include, but is not limited to, one or more pneumatic actuators, electric actuators, hydraulic actuators, magnetic actuators, servo motors, gear systems, or other actuators. In some embodiments, the outer tool actuator 408 may include a positioning stage coupled to the outer trimming tool 404 and/or the outer tool base 438 and a servo motor operable to move the outer trimming tool 404 and/or the outer tool base 438 along the positioning stage.

Referring to FIG. 10B, in some embodiments, the outer trimming tool 404 may be vertically positioned (i.e., positioned in the +/−Z direction of the coordinate axis of FIGS. 10A-10E) so that the contact surface 436 of the outer trimming tool 404 is vertically aligned with the contacting portion 428 of the inner trimming tool 402. In these embodiments, when the outer trimming tool 404 and the inner trimming tool 402 are progressively brought closer together, the contact surface 436 of the outer trimming tool 404 and the contacting portion 428 of the inner trimming tool 402 may converge, thereby pinching the laminated glass tubing 102 between the contact surface 436 of the outer trimming tool 404 and the contacting portion 428 of the inner trimming tool 402. Pinching of the laminated glass tubing 102 between the contact surface 436 of the outer trimming tool 404 and the contacting portion 428 of the inner trimming tool 402 may bring the outer clad layer 122 into contact with the inner clad layer 124, thereby covering the core layer 120 at the new working end of the laminated glass tubing 102.

Alternatively, in other embodiments, the outer trimming tool 404 may be vertically positioned so that the contact surface 436 of outer trimming tool 404 is vertically offset (i.e., offset in the +/−Z direction of the coordinate axis of FIGS. 10A-10E) from the contacting portion 428 of the inner trimming tool 402. In some embodiments, the outer trimming tool 404 may be vertically positioned so that the contact surface 436 of the outer trimming tool 404 is vertically higher than the contacting portion 428 of the inner trimming tool 402 (i.e., the contact surface 436 of the outer trimming tool 404 has a Z position greater than the Z position of the contacting portion 428 of the inner trimming tool 402). Alternatively, in other embodiments, outer trimming tool 404 may be vertically positioned so that the contact surface 436 of the outer trimming tool 404 is vertically lower than the contacting portion 428 of the inner trimming tool 402 (i.e., the contact surface 436 of the outer trimming tool 404 has a Z position less than the Z position of the contacting portion 428 of the inner trimming tool 402). When the contact surface 436 of the outer trimming tool 404 is vertically offset from the contacting portion 428 of the inner trimming tool 402, translating the outer trimming tool 404 towards the inner trimming tool 402 may produce a scissoring effect, which may bring the outer clad layer 122 into contact with the inner clad layer 124, thereby covering the core layer 120 at the new working end of the laminated glass tubing 102.

The inner trimming tool 402 and outer trimming tool 404 described in conjunction with FIGS. 11A, 11B, 12A, 12B, and 12C represent one approach to trimming tools that may be used to trim the working end 150 of the laminated glass tubing 102. However, other types and shapes of trimming tools may also be used in trimming station 400 to similar effect. For example, any combination or shape of tooling having at least two converging contacting surfaces operable to deform the glass of the laminated glass tubing 102 may be suitable for use in the trimming station 400.

Referring to FIG. 10A, in some embodiments, the trimming station 400 may include a preheater 406 operable to locally heat the exterior surface 140 of the laminated glass tubing 102 at a trimming region 412 of the trimming region 412. The preheater 406 may be vertically positioned (i.e., in the +/−Z direction of the coordinate axis of FIG. 10A) to locally heat the trimming region 412 of the laminated glass tubing 102. The preheater 406 may be operable to deliver sufficient heat to the trimming region 412 of the laminated glass tubing 102 to reduce the viscosity of the glass in the trimming region 412 to less than or equal to 100 kilopoise (kP). In other embodiments, the preheater 406 may be operable to reduce the viscosity of the glass in the trimming region 412 to less than or equal to 75 kP, less than or equal to 50 kP, less than or equal to 25 kP, or even less than or equal to 10 kP. The preheater 406 may be operable to locally heat the trimming region 412 so that the heating effect of the preheater 406 is localized to within a few millimeters of the trimming region 412, such as within less than 5 mm, less than 4 mm, less than 3 mm, or even less than 2 mm from the trimming region 412 measured axially from the trimming region 412. The preheater 406 may include a gas torch (i.e., flame burner), a laser, a radiant heater, or other heat source capable of heating the glass to reduce the viscosity of the glass. In some embodiments, the preheater 406 may be a gas torch. Alternatively, in other embodiments, the preheater 406 may be a laser, which may be operable to provide more targeted and narrow heating of the laminated glass tubing 102 compared to a gas torch.

In some embodiments, the trimming station 400 may optionally include a finishing heater to ensure that the outer clad layer 122 and the inner clad layer 124 are melted together to fully and completely cover the exposed portion 126 of the core layer 120.

Referring still to FIG. 10A, in operation of trimming station 400, the laminated glass tubing 102 may be locally heated at a trimming region 412 of the laminated glass tubing 102 located proximate to the working end 150 of the laminated glass tubing 102. The trimming region 412 may be a vertical distance H (i.e., distance in the +/−Z direction of the coordinate axis of FIG. 10A) from the axial surface 148 of the laminated glass tubing 102, the vertical distance H being a distance at which the outer clad layer 122 and/or the inner clad layer 124 include sufficient glass to be deformed over the core layer 120 to form a continuous clad layer enclosing the core layer 120. In some embodiments, the vertical distance H from the axial surface 148 of the laminated glass tubing 102 to the trimming region 412 may be from 1 millimeter (mm) to 10 mm, such as from 1 mm to 7 mm, from 1 mm to 5 mm, from 2 mm to 7 mm, from 2 mm to 5 mm, from 3 mm to 10 mm, from 3 mm to 7 mm, or from 3 mm to 5 mm.

The laminated glass tubing 102 at the trimming region 412 may be preheated to a temperature sufficient to reduce the viscosity of the glass at the trimming region 412 of the laminated glass tubing 102 to enable the glass of the core layer 120, outer clad layer 122, and/or inner clad layer 124 to be deformed by the inner trimming tool 402 and outer trimming tool 404. In some embodiments, the trimming region 412 of the laminated glass tubing 102 may be preheated in a processing station immediately before the trimming station 400. For example, in some embodiments, the trimming station 400 may be immediately preceded by a heating station operable to heat the trimming region 412 of the laminated glass tubing 102. Alternatively, in other embodiments, the trimming region 412 of the laminated glass tubing 102 may be preheated in the trimming station 400, such as by positioning the preheater 406 proximate to the trimming region 412 and rotating the laminated glass tubing 102. The glass at the trimming region 412 may be preheated to a temperature sufficient to reduce the viscosity to less than or equal to 100 kP, such as less than or equal to 75 kP, less than or equal to 50 kP, less than or equal to 25 kP, or less than or equal to 10 kP. For example, in some embodiments, the glass at the trimming region 412 may be preheated to a temperature at or above which the viscosity of the glass is from 1 kP to 100 kP, from 1 kP to 75 kP, from 1 kP to 50 kP, from 1 kP to 25 kP, from 1 kP to 10 kP, from 5 kP to 100 kP, from 5 kP to 75 kP, from 5 kP to 50 kP, from 5 kP to 25 kP, from 5 kP to 10 kP, or from 10 kP to 100 kP.

Referring now to FIG. 10B, the inner trimming tool 402 and the outer trimming tool 404 may be positioned relative to the trimming region 412. The inner trimming tool 402 may be translated vertically (i.e., in the +Z direction of the coordinate axis of FIG. 4) into a position in which the tool head 420 of the inner trimming tool 402 is positioned inside the internal volume of the laminated glass tubing 102 with the contacting portion 428 of the tool head 420 proximate to the interior surface 146 of the laminated glass tubing 102. The contacting portion 428 of the tool head 420 may be aligned with the trimming region 412. The outer trimming tool 404 may be positioned vertically relative to the tool head 420 of the inner trimming tool 402 so that the contact surface 436 is aligned with the contacting portion 428 or vertically offset from the contacting portion 428.

Figure 10C:
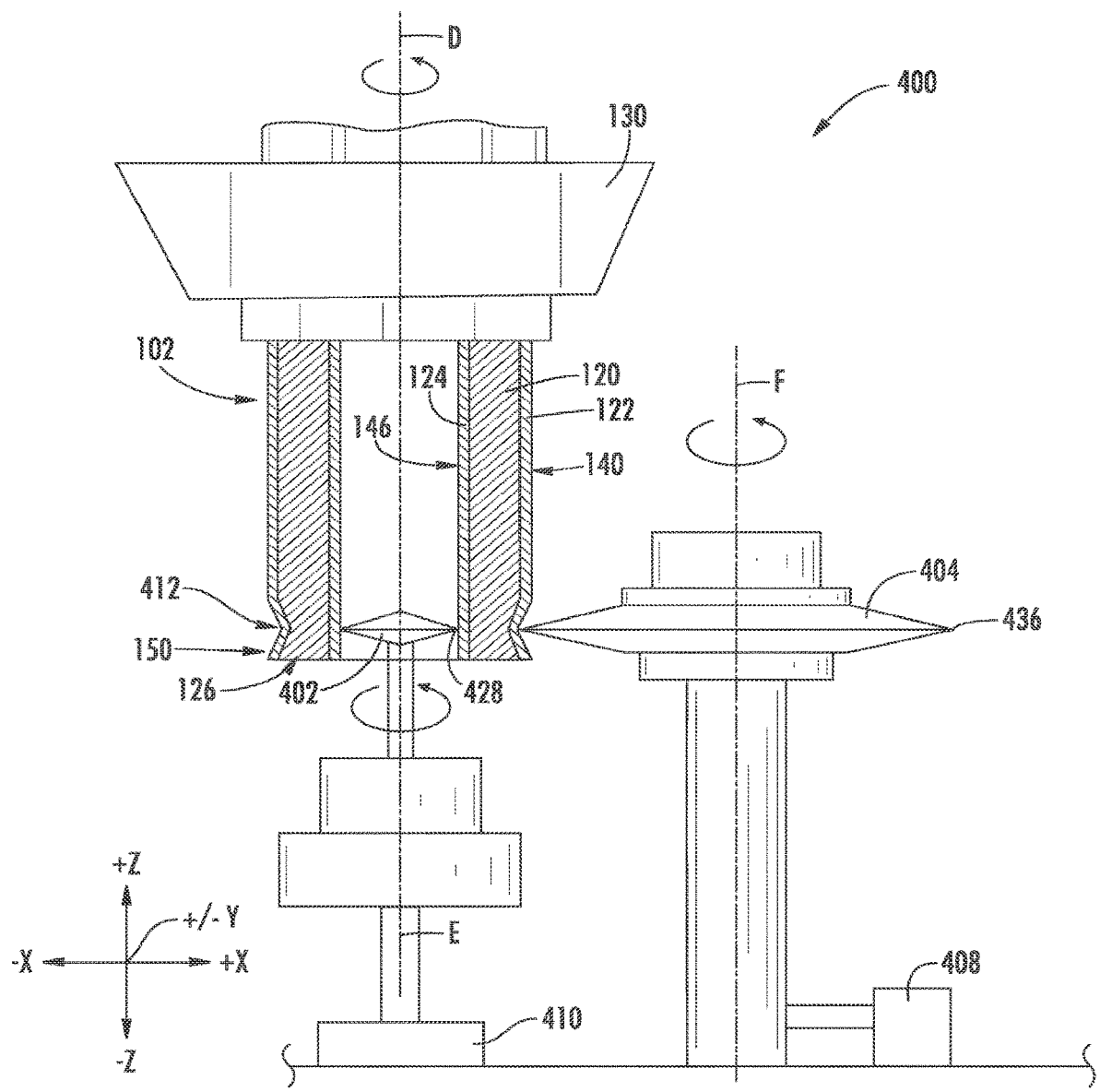
FIG. 10C schematically depicts the trimming station of FIG. 10B in which the outer trimming tool is translated towards the inner trimming tool, according to one or more embodiments shown and described herein.
Figure 10D:
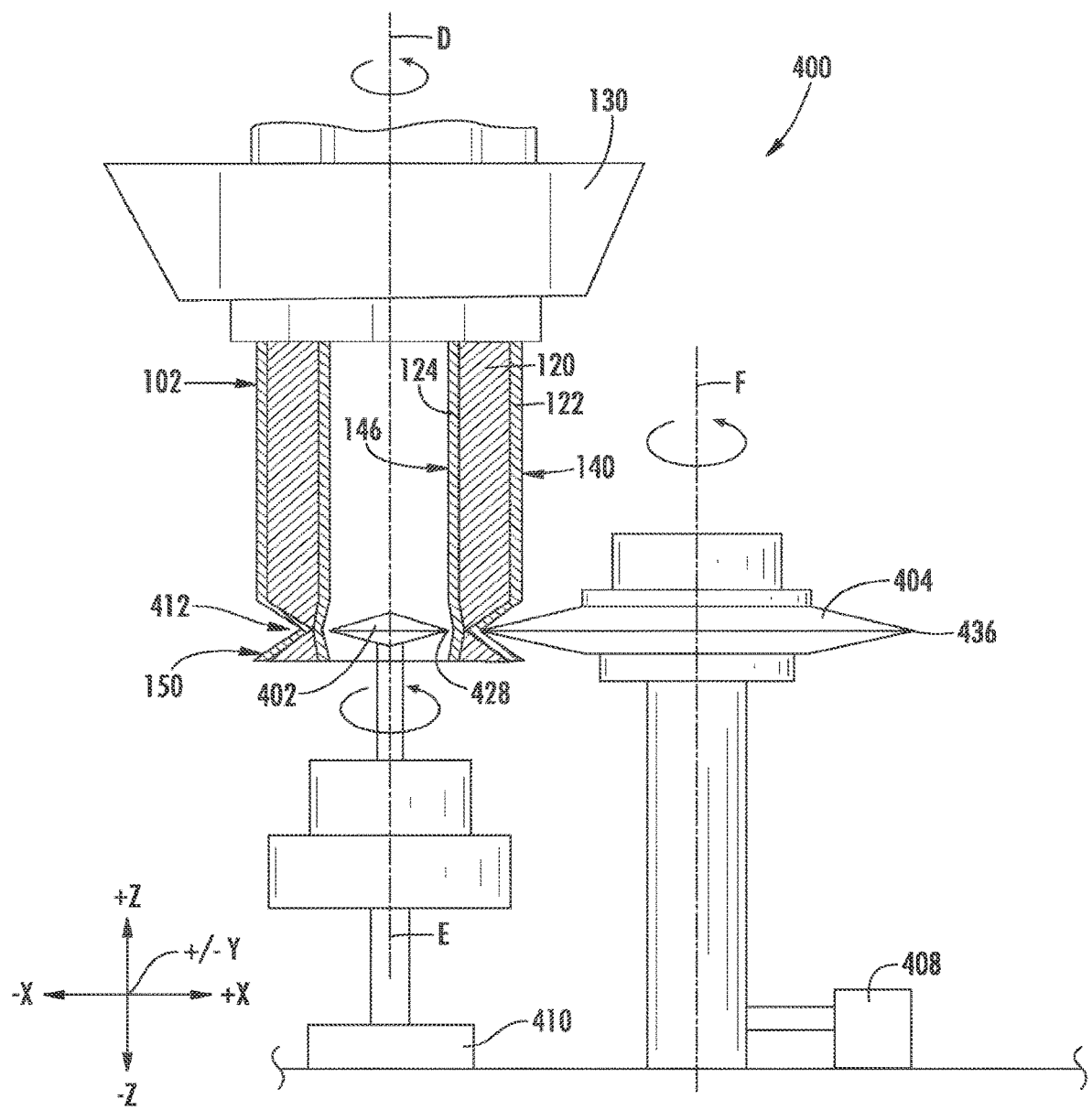
FIG. 10D schematically depicts the trimming station of FIG. 10C in which the outer trimming tool is translated further towards the inner trimming tool, according to one or more embodiments shown and described herein.

Referring now to FIGS. 10C and 10D, the outer trimming tool 404 and the inner trimming tool 402 may be progressively brought into close contact. The inner trimming tool 402, the outer trimming tool 404, or both may be translated radially to bring the inner trimming tool 402 and the outer trimming tool 404 into close contact. For example, in some embodiments, the inner trimming tool 402 may be maintained in a fixed horizontal position (i.e., fixed position in the X-Y plane of the coordinate axis in FIGS. 10C-10D) and the outer trimming tool 404 may be horizontally translated progressively towards the inner trimming tool 402. Alternatively, in other embodiments, both the inner trimming tool 402 and the outer trimming tool 404 may be horizontally translatable, and each of the inner trimming tool 402 and the outer trimming tool 404 may be progressively translated towards each other to bring the inner trimming tool 402 and the outer trimming tool 404 into close contact. As used herein, the term "close contact" refers to a relative position of the inner trimming tool 402 and outer trimming tool 404 in which the inner trimming tool 402 and outer trimming tool 404 contact each other or are close enough to separate the glass piece 414 (FIG. 10E) from the laminated glass tubing 102 at the trimming region 412.

The laminated glass tubing 102 may be rotated in place by the holder 130 while the inner trimming tool 402 and the outer trimming tool 404 are progressively brought into contact. In some embodiments, contact of the inner trimming tool 402 and the outer trimming tool 404 with the rotating laminated glass tubing 102 may cause the inner trimming tool 402 and the outer trimming tool 404 to freely rotate with rotation of the laminated glass tubing 102. Alternatively, in other embodiments, the inner trimming tool 402, the outer trimming tool 404, or both may be mechanically rotated by a drive system. In some embodiments, the inner trimming tool 402, the outer trimming tool 404, or both may be driven to rotate at a rotational speed equal to the rotational speed of the laminated glass tubing 102 rotated by the holder 130.

A rate at which the inner trimming tool 402 and the outer trimming tool 404 are brought into close contact may be great enough to separate the glass piece 414 from the working end 150 of the laminated glass tubing 102 during the dwell time of the converter. In some embodiments, the rate at which the inner trimming tool 402 and the outer trimming tool 404 are brought into close contact may be slow enough to reduce forces exerted on the laminated glass tubing 102 to avoid breaking the laminated glass tubing 102. The rate of bringing the inner trimming tool 402 and the outer trimming tool 404 into close contact may result in a trimming time required to separate the glass piece 414 from the laminated glass tubing 102. This trimming time is measured from the start of translating the inner trimming tool 402, the outer trimming tool 404, or both until the time the glass piece 414 is fully separated from the laminated glass tubing 102. In some embodiments, the trimming time may be less than or equal to 10 seconds, less than or equal to 5 seconds, less or equal to 3 seconds, or less than or equal to 1 second. In some embodiments, the trimming time may be from 0.1 seconds to 10.0 seconds, from 0.1 seconds to 5.0 seconds, from 0.1 seconds to 3.0 seconds, from 0.1 seconds to 1.0 second, 0.5 seconds to 10.0 seconds, 0.5 seconds to 5.0 seconds, 0.5 seconds to 3.0 seconds, from 0.5 seconds to 1.0 seconds, or even from 0.2 seconds to 1.0 seconds. In some embodiments, the trimming time may depend on the overall thickness of the tube, the converter setup, the type of glass, or other property of the glass tube 102 or the converter 100. Additionally, in some embodiments, the inner trimming tool 402, the outer trimming tool 404, or both may be operatively coupled to a force limiting system (not shown) operative to limit a trimming force exerted on the laminated glass tubing 102 to a maximum value of the trimming force. Trimming force in excess of the maximum value of the trimming force may damage to the laminated glass tubing 102 or one or more components of the trimming station 400.

In some embodiments, a lubricant, such as an oil lubricant for example, may be disposed on the inner trimming tool 402 and the outer trimming tool 404 to reduce friction between the inner trimming tool 402 and the interior surface 146 of the laminated glass tubing 102 and between the outer trimming tool 404 and the exterior surface 140 of the laminated glass tubing 102. The oil may also reduce generation of flaws that may result from contact of the inner trimming tool 402 and outer trimming tool 404 with the hot-glass at the trimming region 412. In some embodiments, the inner trimming tool 402, the outer trimming tool 404, or both may be optionally preheated to a temperature not exceeding 600° C., such as a tooling temperature of from 100° C. to 600° C., from 200° C. to 600° C., or from 300° C. to 600° C. At tooling temperatures greater than about 600° C., the glass of the laminated glass tubing 102 may stick or adhere to the inner trimming tool 402 and/or the outer trimming tool 404.

Referring to FIGS. 10C and 10D, during the trimming step, the glass of the laminated glass tubing 102 is locally thinned at the trimming region 412 by the progressive convergence of the inner trimming tool 402 and the outer trimming tool 404. In particular, local thinning of the laminated glass tubing 102 at the trimming region 412 may result from contact of the contacting portion 428 of the inner trimming tool 402 with the interior surface 146 of the laminated glass tubing 102 and contact of the contact surface 436 of the outer trimming tool 404 with the exterior surface 140 of the laminated glass tubing 102. The thinning of the laminated glass tubing 102 at the trimming region 412 may be realized mostly on the core layer 120 so that at some point during progressive convergence of the inner trimming tool 402 and the outer trimming tool 404, the outer clad layer 122 and the inner clad layer 124 are brought into contact, as schematically illustrated in FIG. 10D.

Figure 13:
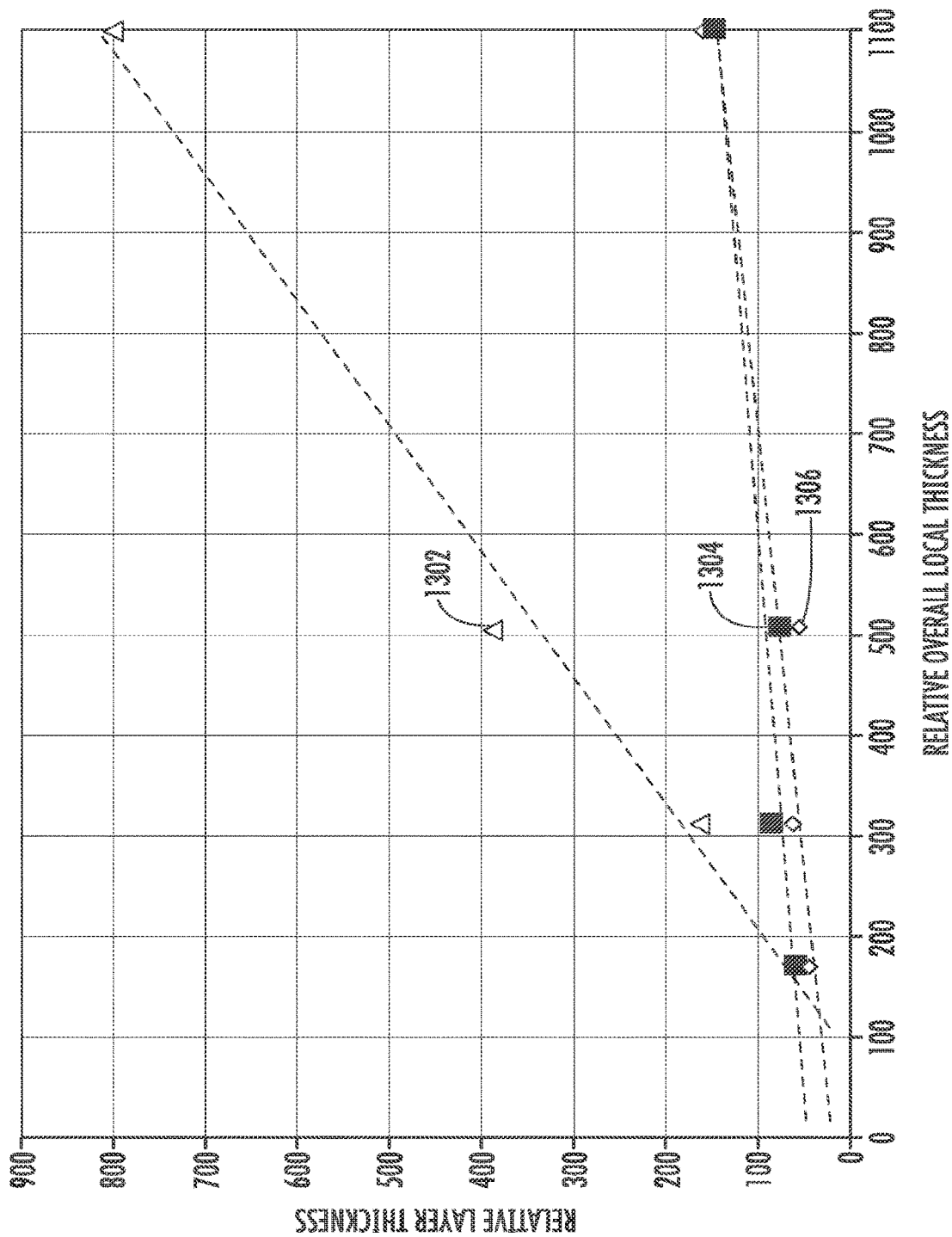
FIG. 13 graphically depicts a relative layer thickness (y-axis) of each layer of the laminated glass tubing in FIGS. 10A-10E as a function of overall local thickness of the laminated glass tubing at the trimming region during trimming of the laminated glass tubing, according to one or more embodiments shown and described herein.

Referring now to FIG. 13, the relative layer thickness for each of the core layer 120, the outer clad layer 122, and inner clad layer 124 are graphically plotted as a function of the relative overall local thickness of the laminated glass tubing 102 during the trimming process. As shown in FIG. 13, the slope of the thickness of the core layer 1302 as a function of the overall local thickness of the laminated glass tubing 102 is substantially greater than the slope of the thickness of the inner clad layer 1304 as a function of the overall local thickness and the slope of the thickness of the outer clad layer 1306 as a function of the overall local thickness. Therefore, FIG. 13 shows that the thickness of the core layer 1302 decreases faster with decreasing overall local thickness compared to the thickness of the inner clad layer 1304 and the thickness of the outer clad layer 1306.

Not intending to be bound by theory, it is believed that the difference in the change in layer thickness per change in overall local thickness for the core layer 120 compared to the outer clad layer 122 and the inner clad layer 124 may be caused by a difference in viscosity of the core layer 120 compared to the outer clad layer 122 and the inner clad layer 124. It is believed that the viscosities of the outer clad layer 122 and the inner clad layer 124 may be reduced through contact with the outer trimming tool 404 and the inner trimming tool 402, respectively, which may be maintained at a lesser temperature than the laminated glass tubing 102. The lesser temperature of the outer trimming tool 404 and the inner trimming tool 402 compared to the laminated glass tubing 102 may produce a cooling effect on the outer clad layer 122 and the inner clad layer 124, respectively, thereby decreasing the temperature of the outer clad layer 122 and inner clad layer 124 and increasing the viscosity of the outer clad layer 122 and the inner clad layer 124. The viscosity difference between the core layer 120 and the outer clad layer 122 and inner clad layer 124 may be manipulated by changing the temperature of the inner trimming tool 402 and the outer trimming tool 404 or by changing the glass compositions of the core layer 120, the outer clad layer 122, and the inner clad layer 124. For example, the glass compositions for the outer clad layer 122 and the inner clad layer 124 may be selected to have a greater viscosity at a given temperature than the glass composition selected for the core layer 120.

Figure 10E:
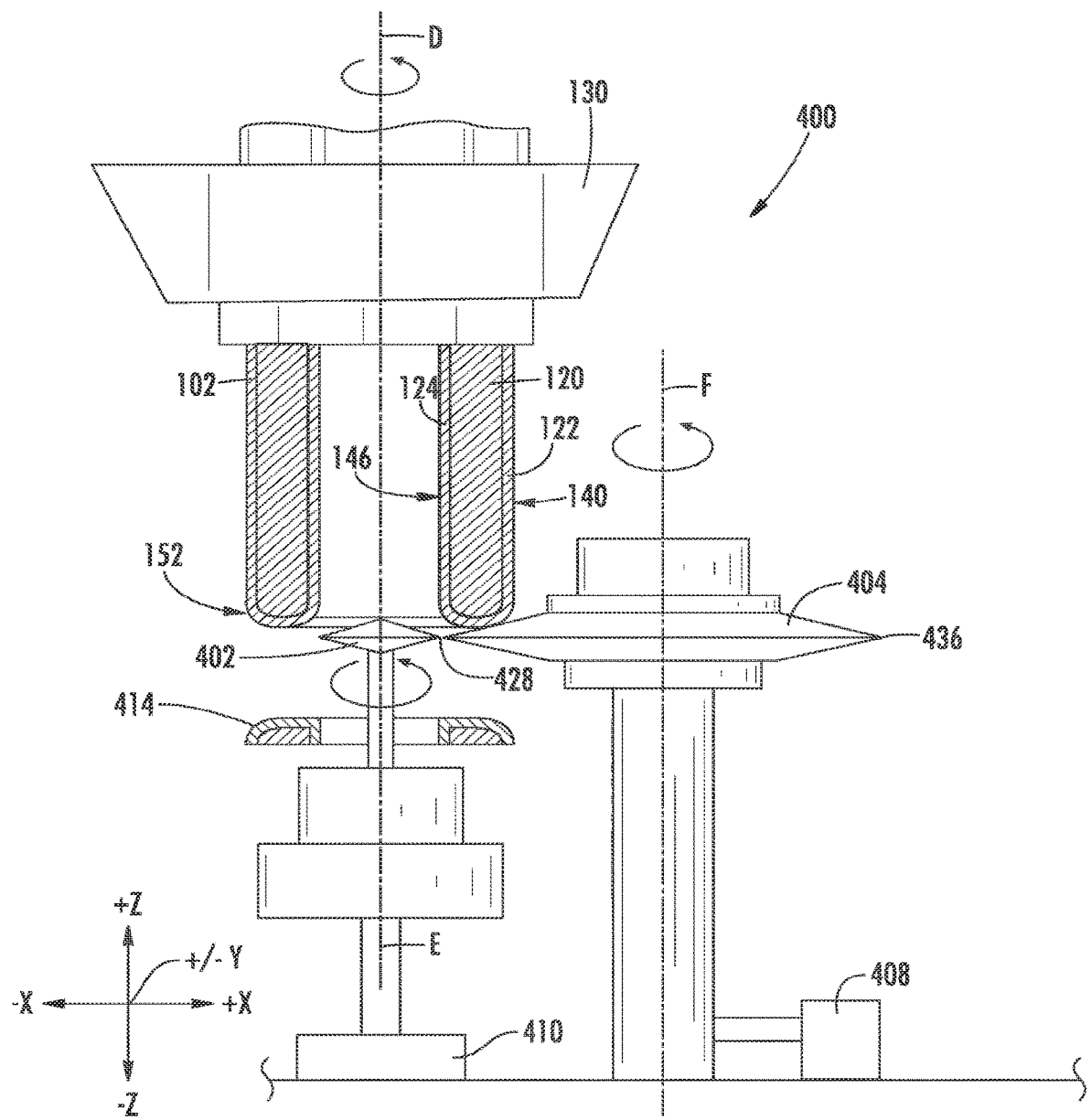
FIG. 10E schematically depicts the trimming station of FIG. 10D in which the outer trimming tool is translated even further towards the inner trimming tool to separate a segment of the laminated glass tube from the working end of the laminated glass tube, according to one or more embodiments shown and described herein.

Referring to FIG. 10E, as the inner trimming tool 402 and the outer trimming tool 404 continue to progressively converge into close contact, a thickness of the laminated glass tubing 102 between the inner trimming tool 402 and the outer trimming tool 404 may reach a minimum threshold thickness of the laminated glass tubing 102, at which the glass piece 414 at the working end 150 of the laminated glass tubing 102 may separate naturally from the laminated glass tubing 102. This separation of the glass piece 414 from the laminated glass tubing 102 may occur without any further mechanical assistance. Contact of the outer clad layer 122 and inner clad layer 124 through thinning the laminated glass tubing 102 at the trimming region 412 with the inner trimming tool 402 and the outer trimming tool 404 may result in a continuous clad layer covering and completely enclosing the core layer 120 at the new working end 152 of the laminated glass tubing 102. The new working end 152 of the laminated glass tubing 102 may exhibit the core layer 120 completely covered and enclosed by a combination of the outer clad layer 122 and the inner clad layer 124.

In some instances, the minimum threshold thickness may occur before the core layer 120 has been fully covered and enclosed in the outer clad layer 122 and the inner clad layer 124, a condition referred to herein as "fragile separation." Fragile separation may result in formation of another exposed portion 126 of the core layer 120 at the new working end 152 of the laminated glass tubing 102. Fragile separation may be avoided or delayed by increasing preheating of the tools (i.e., increasing the tooling temperature), reducing the thermal effusivity of the material from which the tooling is made, reducing the surface area of contact between the laminated glass tubing 102 and the inner trimming tool 402 and/or outer trimming tool 404, or accelerating the trimming step. Reducing the surface area of contact between the laminated glass tubing 102 and the inner trimming tool 402 and/or the outer trimming tool 404 may be accomplished by reducing the width of the contacting portion 428 of the inner trimming tool 402 or the contact surface 436 of the outer trimming tool 404 (i.e., using sharper tools). Accelerating the trimming step may refer to increasing the rate at which the inner trimming tool 402 and the outer trimming tool 404 are progressively translated into close contact or to decreasing the trimming time required to bring the inner trimming tool 402 and the outer trimming tool 404 into close contact.

In some embodiments, fragile separation may be reduced or eliminated by performing the trimming step in two consecutive steps. For example, the trimming process may include preheating the trimming region 412 of the laminated glass tubing 102, partially trimming the laminated glass tubing 102 by bringing the inner trimming tool 402 and the outer trimming tool 404 part way into close contact, reheating the trimming region 412 of the laminated glass tubing 102, and finishing trimming by translating the inner trimming tool 402 and the outer trimming tool 404 the remaining distance into close contact with each other.

After trimming in the trimming station 400, the laminated glass tubing 102 may undergo subsequent converting operations including one or more heating steps and one or more reforming operations to produce the final shape and dimensions of the glass article 103. During processing of the laminated glass tubing 102 downstream of the trimming station 400, the clad layer formed over the core layer 120 of the laminated glass tubing 102 produced during the trimming process in the trimming station 400 may be maintained so that the finished glass article 103 is free of any exposed portion 126 of the core layer 120.

Figure 14:
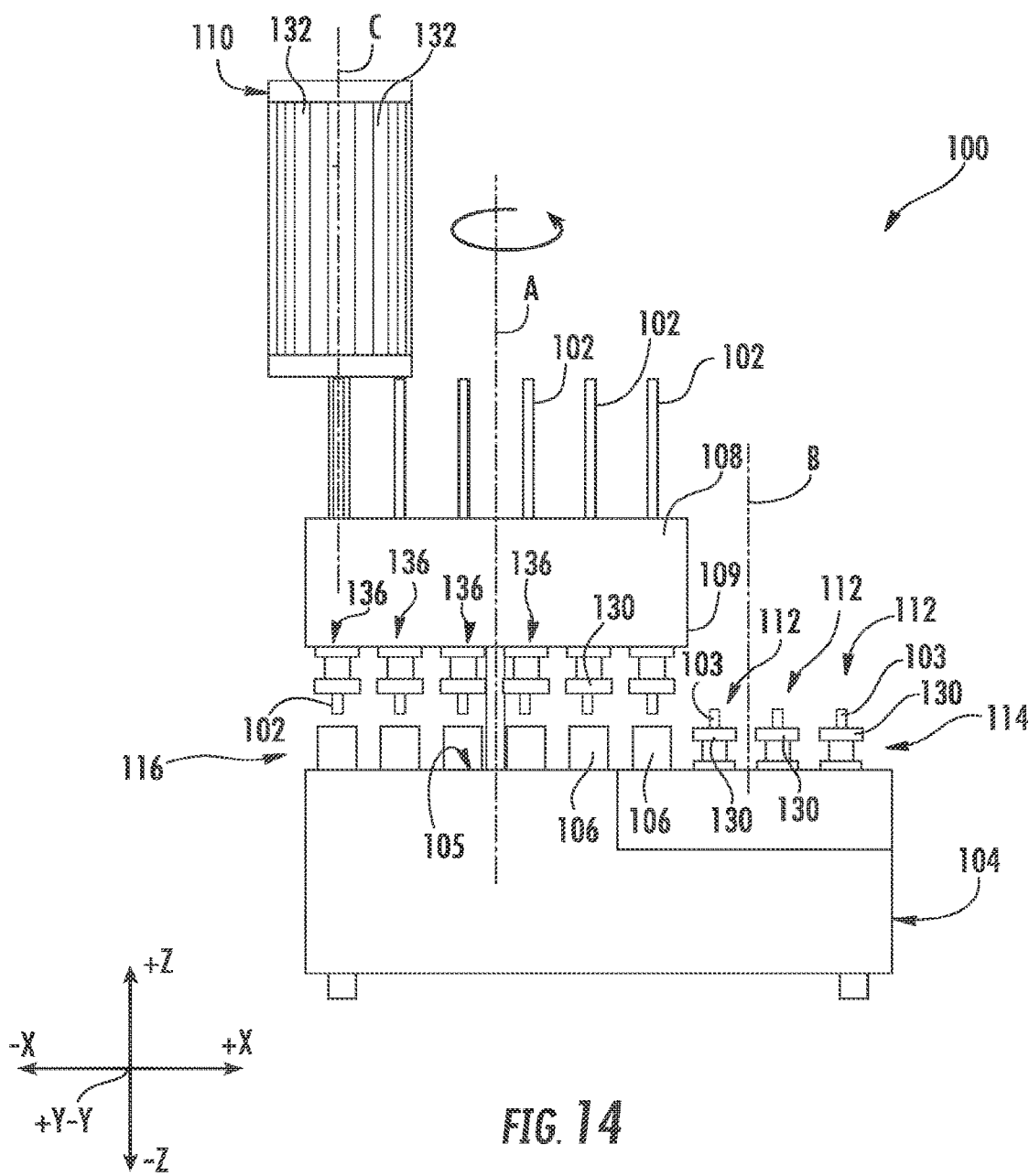
FIG. 14 schematically depicts an embodiment of a converter for producing glass articles from the laminated glass tubing of FIG. 1A, according to one or more embodiments shown and described herein.

The re-cladding station 300 and/or the trimming station 400 may be implemented on a converter for converting glass tubing into a plurality of glass articles 103. Referring now to FIG. 14, a converter 100 for producing glass articles 103 from the laminated glass tubing 102 is schematically depicted. The converter 100 may be used to convert laminated glass tubing 102 into a plurality of glass articles, such as, but not limited to, vials, syringes, cartridges, ampoules, or other glass articles. The converter 100 includes a base 104 having a plurality of processing stations 106, a main turret 108 positioned above the base 104 and rotatable relative to the base 104 about the central axis A, and a glass tube loading turret 110 positioned above the main turret 108 for feeding the laminated glass tubing 102 to the main turret 108. The converter 100 may also include a plurality of secondary processing stations 112 on the base 104 and a secondary turret 114, which is rotatable relative to the base 104.

As schematically depicted in FIG. 14, the base 104 of the converter 100 is stationary and the processing stations 106 may be coupled to an upper portion 105 of the base 104. The plurality of processing stations 106 are spaced apart from one another and arranged in a main circuit 116. In one or more embodiments, the main circuit 116 may be circular so that the main turret 108 may index the laminated glass tubing 102 through the plurality of processing stations 106 by rotation of the main turret 108 about the central axis A. Alternatively, in other embodiments, the main circuit 116 may be linear. Although described herein in reference to a circular-shaped layout of processing stations 106, it is understood that the subject matter disclosed herein may apply equally well to converters having other arrangements of the processing stations 106.

The type and/or shape of the article to be made from the laminated glass tubing 102 may influence the number of processing stations 106 coupled to the base 104. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, re-cladding, trimming, measuring, feeding, or discharge stations or other processing stations for producing the glass articles from the laminated glass tubing 102. The type and/or shape of the article to be made from the laminated glass tubing 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 includes a plurality of holders 130, which are configured to removably secure each laminated glass tubing 102 to the main turret 108. The holders 130 may be clamps, chucks, or other holding devices, or combinations of holding devices. The holders 130 may orient each piece of laminated glass tubing 102 so that the laminated glass tubing 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 extends from a bottom portion 109 of the main turret 108 in a direction towards the base 104 (i.e., in the −Z direction relative to the coordinate axis in FIG. 14). Each holder 130 is oriented to position the laminated glass tubing 102 in or proximate to each of the successive processing stations 106 of the main circuit 116 of the base 104 as the main turret 108 is indexed about the central axis A. Vertical orientation of the laminated glass tubing 102 allows a downward protruding portion of the laminated glass tubing 102 to be cycled progressively through the processing stations 106 of the main circuit 116. Each holder 130 may be individually rotatable relative to the main turret 108 about holder axis D, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the laminated glass tubing 102 relative to stationary burners, forming tools, trimming tools, glass sheet holders, heating elements, cooling nozzles, or other features of the processing stations 106.

Figure 15:
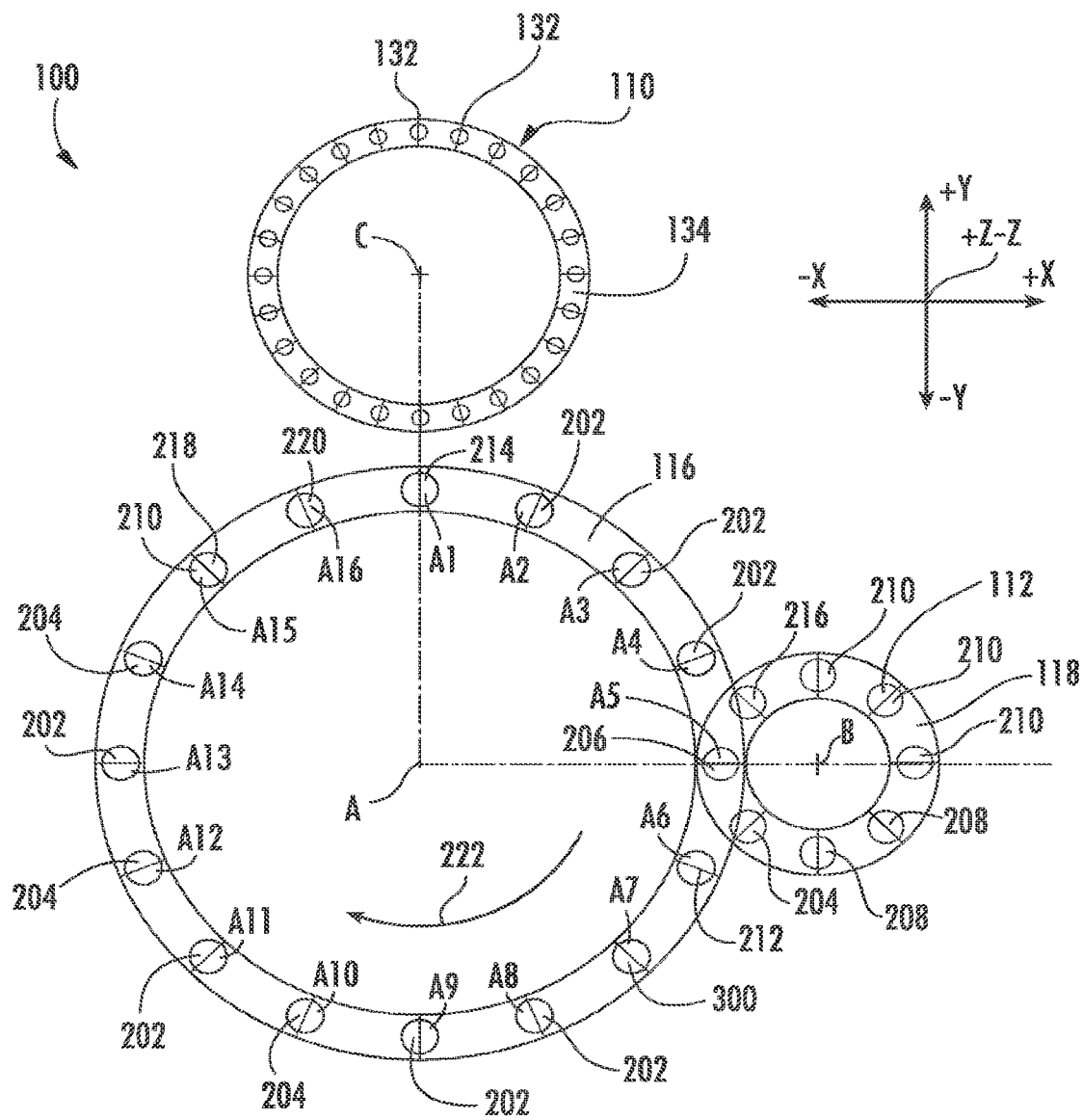
FIG. 15 schematically depicts a top view of a main turret, secondary turret, and feed turret of the converter of FIG. 14, according to one or more embodiments shown and described herein.

Referring to FIGS. 14 and 15, the converter 100 may have a plurality of secondary processing stations 112, which are also spaced apart and arranged in a secondary circuit 118 (FIG. 15), and a secondary turret 114 (FIG. 14) for indexing the glass articles 103 (FIG. 14), which have been separated from the laminated glass tubing 102, through the plurality of secondary processing stations 112. The secondary turret 114 may be rotatable about a second axis B relative to the base 104. The second axis B may be generally parallel to central axis A of the main turret 108. The secondary turret 114 also includes a plurality of holders 130 to hold the glass articles 103 and position the glass articles 103 to engage with each of the secondary processing stations 112 in succession. The secondary turret 114 may receive the articles 103 from a separating station 206 (FIG. 15) of the main turret 108, index the glass articles 103 through the plurality of secondary processing stations 112 through rotation of the secondary turret 114, and discharge the finished articles from the converter 100.

The glass tube loading turret 110 may be positioned above the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 14 and 15, in some embodiments, the glass tube loading turret 110 may include a plurality of loading channels 132 arranged in a circular circuit 134 and configured to hold lengths of the laminated glass tubing 102. The glass tube loading turret 110 may be positioned to orient one of the loading channels 132 into vertical alignment (i.e., aligned in a direction parallel to the central axis A of the main turret 108 and/or parallel to the Z axis of FIG. 14) with a processing station 106 of the main circuit 116 of the converter 100 and the corresponding holders 130 on the main turret 108 that are indexed through the processing station 106 of the main circuit 116. In one or more embodiments, the processing station 106 aligned with the glass tube loading turret 110 may be a tube loading station 214 (FIG. 15). When the converter 100 has converted all or at least a portion of a length of the laminated glass tubing 102 at a specific holder position 136 into one or more glass articles 103, the glass tube loading turret 110 may deliver a new length of laminated glass tubing 102 through the top of the main turret 108 to the holder 130 at the holder position 136, when the holder position 136 indexes into alignment with the tube loading station 214 of the main circuit 116.

Referring to FIG. 15, as previously described, the plurality of processing stations 106 of the converter 100 may include one or more heating stations 202, forming stations 204, separating stations 206, polishing stations 208, cooling stations 210, piercing stations 212, tube loading stations 214, discharge stations 216, measuring stations 218, tube length drop stations 220, re-cladding stations 300, trimming stations 400 (FIG. 10A), or other stations and/or combinations of these stations. FIG. 15 schematically depicts the arrangement of the processing stations 106 for a converter 100 having a main circuit 116 of sixteen processing stations 106 and a secondary circuit 118 of eight secondary processing stations 112. As described, the processing stations 106 of the main circuit 116 are evenly spaced apart and evenly distributed about a circular circuit and the secondary processing stations 112 of the secondary circuit 118 are also evenly spaced apart and evenly distributed about a circular circuit. FIG. 15 also schematically depicts the glass tube loading turret 110 having a plurality of loading channels 132. In FIG. 15, the glass tube loading turret 110 is shown in a position spaced apart from the main circuit 116 for purposes of illustration.

The main circuit 116 of the converter schematically depicted in FIG. 15 may include one or more heating stations 202, a separating station 206, a piercing station 212, a re-cladding station 300 or trimming station 400 (FIG. 10A), one or more forming stations 204, one or more cooling stations 210, a measuring station 218, a tube length drop station 220, and a tube loading station 214. Although FIG. 15 depicts the main circuit 116 as having a circular arrangement of the processing stations 106, as previously discussed, the main circuit 116 may have the processing stations 106 positioned in other-shaped arrangements, such as linear, polygonal, or other arrangements. With respect to the direction of indexing 222 of the main turret 108, the heating stations 202 may be positioned before the separating stations 206 and each of the forming stations 204 to preheat target regions of the laminated glass tubing 102 to a target temperature at which the target region of the laminated glass tubing 102 becomes plastically deformable and may effectively be shaped or separated without cracking or shattering the glass. At the separating station 206, the formed glass article 103 (FIG. 14) may be separated from the laminated glass tubing 102 (FIG. 14). The separating station 206 may also be the processing station 106 at which the partially formed glass article 103, once separated, is transferred to the secondary turret 114 (FIG. 14) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus of glass formed over the working end 150 of the laminated glass tubing 102 in the separating station 206 is pierced, thereby reopening the working end 150 of the laminated glass tubing 102.

The re-cladding station 300 may be positioned after (i.e., downstream of) the separating station 206 and/or the piercing station 212. As previously discussed herein, the re-cladding station 300 may be operable to re-clad the exposed portion 126 of the core layer 120 at the axial surface 148 of the laminated glass tubing 102 resulting from thermal or mechanical separation of the glass article 103 from the laminated glass tubing 102. Although the converter 100 is shown in FIG. 15 as including the re-cladding station 300, it is understood that the converter 100 could instead include a trimming station, such as trimming station 400, or other processing station operable to move molten glass from the outer clad layer 122 and inner clad layer 124 of the laminated glass tubing 102 to cover the exposed portion 126 of the core layer 120. In some embodiments, the converter 100 may include a heating station 202 positioned immediately before the re-cladding station 300 or the trimming station 400, such as between the re-cladding station 300 or trimming station 400 and the separating station 206 and/or the piercing station 212. In some embodiments, the converter 100 may include a polishing station 208 positioned immediately after the re-cladding station 300 or trimming station 400.

The forming stations 204 of the main turret 108 may be positioned downstream of the re-cladding station 300 or trimming station 400 in the direction of indexing 222. At the forming stations 204, the working end 150 of the laminated glass tubing 102 may be iteratively shaped into the desired features of the finished glass article 103. As noted above, one or more heating stations 202 may be positioned before each of the forming stations 204 to preheat target regions of the laminated glass tubing 102 to a temperature at which the laminated glass tubing 102 may be formed. The forming stations 204 of the main turret 108 shape the working end 150 of the laminated glass tubing 102 to form one end of the glass articles 103, and the forming stations 204 of the secondary turret 114 may shape the other end of the glass articles 103 after the glass article 103 has been separated from the laminated glass tubing 102. In one or more embodiments, the converter 100 may be used to produce vials from the laminated glass tubing 102, and the forming stations 204 of the converter 100 may include one or more shoulder forming stations, one or more flange forming stations, and one or more flange finishing stations, with one or more heating stations 202 positioned before and between each of the forming stations 204. The main circuit 116 may further include a measuring station 218, at which a dimensioning system (not shown) may be used to measure one or more dimensions of the laminated glass tubing 102, such as the diameter and thickness for example, and one or more dimensions of the features formed by the forming stations 204.

Still referring to FIG. 15, one or more cooling stations 210 may be positioned after the forming stations 204 in the direction of indexing 222 of the main turret 108. A tube length drop station 220 may be positioned after the forming stations 204, between the forming stations 204 and the separating station 206, to drop down the laminated glass tubing 102 with the features of the glass article 103 formed thereon, thereby positioning the laminated glass tubing 102 for separating the glass article 103 from the laminated glass tubing 102 at the separating station 206. The main circuit 116 may also include a tube loading station 214 for loading a new length of the laminated glass tubing 102 from the glass tube loading turret 110 to the main turret 108 (FIG. 14). In one or more embodiments, the tube loading station 214 may be incorporated into a cooling station 210. The tube loading station 214 may be positioned between the last forming station 204 and the separating station 206.

The forming stations 204 of the main turret 108 may form features at a first end of the glass article 103. Once the glass article 103 is separated from the laminated glass tubing 102 at the separating station 206, the glass article 103 may be transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103.

The secondary processing stations of the secondary circuit may include one or more heating stations 202, forming stations 204, polishing stations 208, cooling stations 210, discharge stations 216, or other stations or combinations of secondary processing stations 112. Although FIG. 15 depicts the secondary circuit as having a circular arrangement of the secondary processing stations 112, as previously discussed, the secondary circuit may have the secondary processing stations 112 positioned in other-shaped arrangements, such as linear, polygonal, or other arrangements. In one or more embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the laminated glass tubing 102. However, it is understood that more or fewer processing stations 106 and secondary processing stations 112 may be utilized to make vials having different shapes or other glass articles, such as cartridges, syringes, ampoules, or other glass articles. Additionally, it is understood that the processing stations 106 and secondary processing stations 112 may be arranged in any of a number of different orders and/or configurations in order to produce differently shaped glass articles.

Referring again to FIG. 15, in operation, the main turret 108 indexes the laminated glass tubing 102, which is secured in the holder 130, into a processing station 106. A specific operation, such as heating, forming, piercing, separating, re-cladding, trimming, cooling, dropping, feeding, etc., is performed on the laminated glass tubing 102 at each of the processing stations 106. As used herein, a "dwell time" of the converter 100 refers to the time that the laminated glass tubing 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 indexes the laminated glass tubing 102 to the next processing stations 106. As used herein, the "index time" refers to the time that it takes for the main turret 108 to index the laminated glass tubing 102 from one processing station 106 to the next processing station 106 and is measured in units of time. The total time per part per station, as used in this disclosure, is the sum of the dwell time and the index time.

Examples of converters 100 for converting laminated glass tubing 102 into glass vials include the Vial Forming Machine Model RP16 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into cartridges. The cartridge converter has similar characteristics to the previously described vial converters 100 but is utilized to produce glass articles having a cartridge form factor rather than a vial.

Although described in the context of a converter 100 for producing glass vials from the laminated glass tubing 102, it should be understood that the converter 100 may be configured to produce one or more other articles, such as cartridges, syringes, ampoules, or other glass articles, by changing the forming tools used in the forming stations 204 and/or the order or configuration of processing stations 106 in the main circuit 116 or secondary processing stations 112 in one or more secondary circuits 118.

The present disclosure includes methods for producing glass articles 103 from glass tubing. In some embodiments, the method for producing glass articles 103 from glass tubing may include introducing the glass tubing to the converter 100 that comprises at least one forming station 204 and a separating station 206. The glass tubing may be laminated glass tubing 102 having a core layer 120 comprising a core glass composition and at least one clad layer comprising a clad glass composition. For example, in some embodiments, the clad layer may include an outer clad layer 122 comprising an outer glass composition, and an inner clad layer 124 comprising an inner glass composition. The core layer 120 may be under tensile stress, and at least one of the inner clad layer 124 or the outer clad layer 122 may be under compressive stress. The method of producing glass articles 103 from the glass tubing may also include forming at least one feature of the glass article 103 at a working end 150 of the laminated glass tubing 102 and separating the glass article 103 from the working end 150 of the laminated glass tubing 102. Separating the glass article 103 from the laminated glass tubing 102 may expose a portion of the core layer 120 at the working end 150 of the laminated glass tubing 102. The method further includes remediating the exposed portion 126 of the core layer 120 by completely enclosing the core layer 120 in a clad layer that includes at least the inner clad layer 124 and the outer clad layer 122. The inner clad layer 124 and the outer clad layer 122 may cooperate to completely enclose the core layer 120. Completely enclosing the core layer 120 within the combination of the inner clad layer 124 and the outer clad layer 122 may isolate the core layer 120 from external sources of surface damage. In some embodiments, the exposed portion 126 of the core layer 120 may be disposed at the axial surface 148 of the working end 150 of the laminated glass tubing 102 prior to remediating the exposed portion 126 of the core layer 120.

Referring to FIGS. 6A-6C, in some embodiments of the method for producing glass articles 103 from glass tubing, remediating the exposed portion 126 of the core layer 120 may include coupling a glass sheet 304 to a surface (e.g., the axial surface 148) of the laminated glass tubing 102. The glass sheet 304 may be positioned to cover the exposed portion 126 of the core layer 120. The inner clad layer 124, the outer clad layer 122, and the glass sheet 304 adhered thereto may cooperate to isolate the exposed portion 126 of the core layer 120 from external sources of surface damage. In some embodiments, the glass sheet 304 may include a glass composition that is the same as the inner glass composition or the outer glass composition. Alternatively, in other embodiments, the glass sheet 304 may include a glass composition that is different than the inner glass composition or the outer glass composition.

In some embodiments of the method for producing glass articles 103 from glass tubing, coupling the glass sheet 304 to the surface of the laminated glass tubing 102 may include heating the surface of the laminated glass tubing 102, and contacting the glass sheet 304 with the heated surface. The surface of the laminated glass tubing 102 may be heated to a temperature at which a viscosity of the glass is less than or equal to 100 kilopoise. In some embodiments, coupling the glass sheet 304 to the surface of the laminated glass tubing 102 may further include thermally polishing the surface and the glass sheet 304, wherein thermal polishing integrates the glass sheet 304 into the surface of the laminated glass tubing 102, thereby bonding the glass sheet 304 to the inner clad layer 124 the outer clad layer 122, or both.

Referring now to FIGS. 10A-10E, in some embodiments of the method for producing glass articles 103 from glass tubing, remediating the exposed portion 126 of the core layer 120 may include moving glass from the inner clad layer 124, the outer clad layer 122, or both to completely enclose the core layer 120. Moving glass from the inner clad layer 124 and/or the outer clad layer 122 to completely enclose the core layer 120 may include heating the inner clad layer 124, the outer clad layer 122, or both proximate the exposed portion 126 of the core layer 120, wherein heating reduces a viscosity of the inner glass composition, the outer glass composition, or both to enable deforming of the inner clad layer 124, the outer clad layer 122, or both, and deforming the inner clad layer 124, the outer clad layer 122, or both into contact with the exposed portion 126 of the core layer 120. In some embodiments, deforming the inner clad layer 124, the outer clad layer 122, or both into contact with the exposed portion 126 of the core layer 120 may include contacting the inner clad layer 124, the outer clad layer 122, or both with one or a plurality of forming tools.

Alternatively, in other embodiments, moving glass from the inner clad layer 124, the outer clad layer 122, or both to completely enclose the core layer 120 may include separating a glass piece 414 from the working end 150 of the laminated glass tubing 102. Separating the glass piece 414 from the working end 150 of the laminated glass tubing 102 may include heating a trimming region 412 of the laminated glass tubing 102. The trimming region 412 may be spaced apart axially from the working end 150 of the laminated glass tubing 102. Additionally, separating the glass piece 414 from the working end 150 of the laminated glass tubing 102 may further include converging an inner trimming tool 402 and an outer trimming tool 404 into close contact at the trimming region 412 of the laminated glass tubing 102, wherein converging the inner trimming tool 402 and the outer trimming tool 404 into close contact deforms the inner clad layer 124, the outer clad layer 122, or both until the inner clad layer 124 and the outer clad layer 122 are contacted at the trimming region 412 and separates the glass piece 414 from the working end 150 of the laminated glass tubing 102. Deforming the inner clad layer 124 and/or the outer clad layer 122 into contact in the trimming region 412 completely encloses the core layer 120 at a new working end 152 of the laminated glass tubing 102.

The glass articles 103 produced from the systems and methods disclosed herein may include a laminated glass that includes the core layer 120 under a tensile stress and at least one clad layer under a compressive stress. The core layer 120 may be completely enclosed within the at least one clad layer. The glass article 103 may further include at least one feature formed in the laminated glass. The core layer of the laminated glass may be completely isolated from the atmosphere by the clad layer. For example, in some embodiments, the glass article 103 may be free from exposed portions of the core layer.

The at least one clad layer may include the inner clad layer 124 under a compressive stress and the outer clad layer 122 under a compressive stress. The inner clad layer 124 and the outer clad layer 122 may cooperate to enclose the core layer 120. In some embodiments, the inner layer glass composition of the inner clad layer 124 may be a glass composition meets the performance criteria of for or is otherwise classified as a Type I glass under United States Pharmacopoeia (USP) <660> and/or a glass having a hydrolytic resistance of HGA1 according to ISO 720. In some embodiments, the inner layer glass composition of the inner clad layer 124 may be a borosilicate glass or an aluminosilicate glass that meets the Type 1 performance criteria of USP <660> and/or the HGA1 performance criteria of ISO 720.

In some embodiments, a compressive stress in the at least one clad layer in the glass article 103 may be at least 150 MPa. For example, the compressive stress in the at least one clad layer may be greater than or equal to 50 MPa, greater than or equal to 75 MPa, greater than or equal to 100 MPa, or even greater than or equal to 150 MPa. For example, in some embodiments, the at least one clad layer of the glass article 103 may be under a compressive stress of from 50 MPa to 700 MPa, from 50 MPa to 500 MPa, from 50 MPA to 400 MPa, from 75 MPa to 750 MPa, from 75 MPa to 500 MPa, from 75 MPa to 400 MPa, from 100 MPa to 700 MPa, from 100 MPa to 500 MPa, or even from 100 MPa to 400 MPa. In some embodiments, the core layer 120 of the glass article 103 may be under a tensile stress of from 10 MPa to 50 MPa, such as from 10 MPa to 40 MPa, from 10 MPa to 30 MPa, from 15 MPa to 50 MPa, from 15 MPa to 40 MPa, or from 15 MPa to 30 MPa.

In some embodiments, the glass article 103 may have an overall thickness of less than or equal to 6 millimeters (mm), such as less than or equal to 4 mm, less than or equal to 2 mm, less than or equal to 1.5 mm or less than or equal to 1 mm. In some embodiments, the overall thickness of the glass article 103 may be from 0.1 mm to 6 mm, from 0.3 mm to 4 mm, from 0.5 mm to 4 mm, from 0.5 mm to 2 mm, or from 0.5 mm to 1.5 mm. A thickness of the clad layer, such as the inner clad layer 124 or the outer clad layer 122, of the glass article 103 may be from 5% to 33% of the overall thickness of the glass article 103, such as from 10% to 30% or 15% to 25% of the overall thickness of the glass article 103. In some embodiments, the thickness of the clad layer of the glass article 103 may be greater than or equal to 30 micrometers (μm), such as greater than or equal to 50 μm, greater than or equal to 75 μm, greater than or equal to 100 μm, or even greater than or equal to 150 μm. In some embodiments, the thickness of the clad layer may be from 30 μm to 1 mm, such as from 50 μm to 0.75 mm, from 75 μm to 0.5 mm, from 100 μm to 0.5 mm, or even from 150 μm to 0.5 mm. The glass article 103 may have any other property, characteristic, or feature described herein in relation to the laminated glass tubing 102.

In some embodiments, the glass article 103 may be a container, such as one or more of a bottle, vial, ampoule, jar, syringe, cartridge, or other container. For example, in some embodiments, the glass article 103 may be a pharmaceutical container. In some embodiments, the glass article 103 may be a container adapted to hold a pharmaceutical product, a vaccine, a biologic, a foodstuff, or a solution.

In some embodiments, the glass article 103 may be incorporated into a product that includes the glass article 103 described herein and a composition or an article contained within the glass article 103. For example, in some embodiments, a product may include a glass container (i.e., glass article) that includes a laminated glass defining an internal volume, the laminated glass comprising a core layer under a central tension and at least one clad layer under a compressive stress. The at least one clad layer may completely enclose the core layer and may isolate the core layer from the atmosphere and/or external sources of surface damage. The product may also include the composition or article disposed within the internal volume of the glass container. In some embodiments, the product may include a composition disposed within the internal volume of the glass container. For example, the product may include a pharmaceutical product, a vaccine, a biologic, a foodstuff, a solution, or other composition disposed within the internal volume of the glass container. In some embodiments, the glass container may be a bottle, vial, ampoule, syringe, or cartridge. In some embodiments, the product may further include a closure, such as a cap, lid, or other closure coupled over an open end of the glass container. In some embodiments, the closure may seal the internal volume of the glass container and isolate the internal volume of the glass container from the atmosphere, thereby preventing exposure of the composition or article contained within the glass container to the atmosphere. The glass container of the product may include any other features or attributes described herein in conjunction with the glass article 103 or the laminated glass tubing 102.

While various embodiments of the converter and systems and methods for re-cladding the exposed portion 126 of the core layer 120 at the working end 150 of the laminated glass tubing 102 and the glass articles and products made therefrom, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article comprising:
    a laminated glass defining an internal volume, the laminated glass comprising a core layer under a tensile stress, a glass sheet, and at least one clad layer, wherein at least one of the at least one clad layer is under a compressive stress, wherein the core layer is completely enclosed within the glass sheet and the at least one clad layer; and
    at least one feature formed in the laminated glass, wherein the glass sheet comprises a glass ring or disc with a central opening, the glass sheet covering a portion of the core layer within the at least one clad layer, and wherein the tensile stress in the core layer is greater than or equal to 10 MPa.

2. The glass article of claim 1, wherein the at least one clad layer comprises an inner clad layer and an outer clad layer and the inner clad layer and the outer clad layer cooperate to enclose the core layer.

3. The glass article of claim 2, wherein the inner clad layer, the outer clad layer, or both are under compressive stress.

4. The glass article of claim 2, wherein the inner clad layer comprises an inner glass composition that is classified as a Type I glass under United States Pharmacopoeia (USP) <660>.

5. The glass article of claim 2, wherein the inner clad layer comprises a borosilicate glass.

6. The glass article of claim 1, wherein the glass article is a pharmaceutical package.

7. The glass article of claim 1, wherein the glass article comprises one of a bottle, vial, ampoule, syringe, or cartridge.

8. The glass article of claim 1, wherein the glass article is a pharmaceutical package adapted to hold a pharmaceutical product, a vaccine, a biologic, or a solution.

9. The glass article of claim 1, wherein the compressive stress in the at least one clad layer is greater than or equal to 50 MPa.

10. The glass article of claim 1, wherein the tensile stress in the core layer is greater than or equal to 15 MPa.

11. The glass article of claim 1, wherein the laminated glass comprises a borosilicate glass.

12. The glass article of claim 1, wherein a thickness of the at least one clad layer is at least about 30 μm.

13. The glass article of claim 1, wherein a thickness of the at least one clad layer is from 15% to 25% of an overall thickness of the laminated glass.

14. The glass article of claim 1, wherein an overall thickness of the laminated glass is less than or equal to 6 mm.

15. The glass article of claim 1, wherein an overall thickness of the laminated glass is from 0.3 mm to 1.5 mm.

16. The glass article of claim 1, wherein the core layer comprises a core glass composition different than a glass composition of the at least one clad layer.

17. A product comprising a glass article of claim 1 and a pharmaceutical product, a vaccine, or a biologic contained within the glass article.

* * * * *